(12) United States Patent
Miyaguchi

(10) Patent No.: US 11,635,809 B2
(45) Date of Patent: Apr. 25, 2023

(54) INPUT SYSTEM AND ELECTRONIC APPARATUS

(71) Applicant: Semiconductor Energy Laboratory Co., Ltd., Atsugi (JP)

(72) Inventor: Atsushi Miyaguchi, Hadano (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 17/406,267

(22) Filed: Aug. 19, 2021

(65) Prior Publication Data
US 2022/0043512 A1    Feb. 10, 2022

Related U.S. Application Data

(63) Continuation of application No. 16/793,510, filed on Feb. 18, 2020, now Pat. No. 11,099,644, which is a
(Continued)

(30) Foreign Application Priority Data

Jan. 20, 2016 (JP) .................................. 2016-008371

(51) Int. Cl.
| | |
|---|---|
| G06F 3/01 | (2006.01) |
| G06F 3/0484 | (2022.01) |
| G06F 3/03 | (2006.01) |
| G06T 3/40 | (2006.01) |
| G09G 3/36 | (2006.01) |

(Continued)

(52) U.S. Cl.
CPC ............. *G06F 3/013* (2013.01); *G06F 3/012* (2013.01); *G06F 3/0304* (2013.01); *G06F 3/0484* (2013.01); *G06T 3/40* (2013.01); *G06F 2203/04806* (2013.01); *G09G 3/32* (2013.01); *G09G 3/3225* (2013.01); *G09G 3/36* (2013.01); *G09G 3/3648* (2013.01)

(58) Field of Classification Search
CPC ............ G06T 3/40; G06F 3/012; G06F 3/013
USPC ....................................................... 345/660
See application file for complete search history.

(56) References Cited

U.S. PATENT DOCUMENTS

| | | | | |
|---|---|---|---|---|
| 5,839,000 A | * | 11/1998 | Davis, Jr. ............... | G03B 13/02 396/77 |
| 6,115,007 A | | 9/2000 | Yamazaki | |

(Continued)

FOREIGN PATENT DOCUMENTS

| | | |
|---|---|---|
| EP | 0903661 A | 3/1999 |
| EP | 0942350 A | 9/1999 |

(Continued)

*Primary Examiner* — Thomas J Lett
(74) *Attorney, Agent, or Firm* — Robinson Intellectual Property Law Office; Eric J. Robinson

(57) ABSTRACT

An input system and an electronic apparatus with novel structures are provided. An electronic apparatus whose setting can be changed even when both hands are full is provided. An input system and an electronic apparatus including an imaging device having a function of taking an image of eyes and a detection device having a function of detecting a change of the shape of the eyes from data obtained by the imaging device are provided. Settings are changed in accordance with the change of the shape of the eyes. The settings are changed by a different method from a manual method and the change of the settings can be reflected in display.

10 Claims, 39 Drawing Sheets

Related U.S. Application Data continuation of application No. 15/407,668, filed on Jan. 17, 2017, now Pat. No. 10,572,006.

(51) Int. Cl.
*G09G 3/3225* (2016.01)
*G09G 3/32* (2016.01)

(56) References Cited

U.S. PATENT DOCUMENTS

| | | |
|---|---|---|
| 6,161,932 A | 12/2000 | Goto et al. |
| 6,426,740 B1 | 7/2002 | Goto et al. |
| 6,483,484 B1 | 11/2002 | Yamazaki et al. |
| 6,573,952 B1 | 6/2003 | Yamazaki et al. |
| 6,580,405 B1 | 6/2003 | Yamazaki et al. |
| 6,867,752 B1 | 3/2005 | Yamazaki et al. |
| 7,158,098 B2 | 1/2007 | Yamazaki et al. |
| 7,248,232 B1 | 7/2007 | Yamazaki et al. |
| 8,605,010 B2 | 12/2013 | Yamazaki et al. |
| 8,884,845 B2 | 11/2014 | Yamazaki et al. |
| 9,086,567 B2 | 7/2015 | Yamazaki et al. |
| 9,182,816 B2 | 11/2015 | Kasahara et al. |
| 9,201,244 B2 | 12/2015 | Yamazaki et al. |
| 9,335,547 B2 | 5/2016 | Takano et al. |
| 9,448,405 B2 | 9/2016 | Yamamoto |
| 9,551,873 B2 | 1/2017 | Zalewski |
| 9,606,363 B2 | 3/2017 | Zalewski |
| 9,921,646 B2 | 3/2018 | Takano et al. |
| 9,933,850 B2 | 4/2018 | Kasahara et al. |
| 2012/0064948 A1 | 3/2012 | Lee et al. |
| 2012/0242570 A1 | 9/2012 | Kobayashi |
| 2013/0250086 A1 | 9/2013 | Mar et al. |
| 2014/0049563 A1* | 2/2014 | Tobin .............. G06F 3/017 345/649 |
| 2014/0285404 A1* | 9/2014 | Takano ............ G06F 3/0482 345/8 |
| 2014/0354515 A1 | 12/2014 | LaValle et al. |
| 2014/0361977 A1 | 12/2014 | Stafford et al. |
| 2015/0153826 A1 | 6/2015 | Ballard et al. |
| 2015/0215601 A1 | 7/2015 | Zhou |
| 2015/0378431 A1 | 12/2015 | Donaldson |
| 2016/0004307 A1 | 1/2016 | Kasahara et al. |
| 2016/0011657 A1 | 1/2016 | Estacio |
| 2016/0025971 A1 | 1/2016 | Crow et al. |
| 2016/0154493 A1 | 6/2016 | Song |
| 2016/0202487 A1 | 7/2016 | Iguchi |
| 2016/0203359 A1* | 7/2016 | von und zu Liechtenstein ........... G06V 40/19 345/156 |
| 2016/0266644 A1 | 9/2016 | Yamamoto |
| 2016/0270656 A1 | 9/2016 | Samec et al. |
| 2016/0313558 A1 | 10/2016 | Gutierrez |
| 2017/0017080 A1 | 1/2017 | Onwuta |
| 2017/0160801 A1 | 6/2017 | Miyaguchi |
| 2017/0168296 A1 | 6/2017 | Giwnewer et al. |

FOREIGN PATENT DOCUMENTS

| | | |
|---|---|---|
| EP | 2784632 A | 10/2014 |
| JP | 11-073274 A | 3/1999 |
| JP | 2013-003647 A | 1/2013 |
| JP | 2013-196163 A | 9/2013 |
| JP | 2014-191386 A | 10/2014 |
| JP | 2015-055638 A | 3/2015 |
| JP | 2015-192697 A | 11/2015 |
| WO | WO-2015/151447 | 10/2015 |
| WO | WO-2015/183621 | 12/2015 |

* cited by examiner

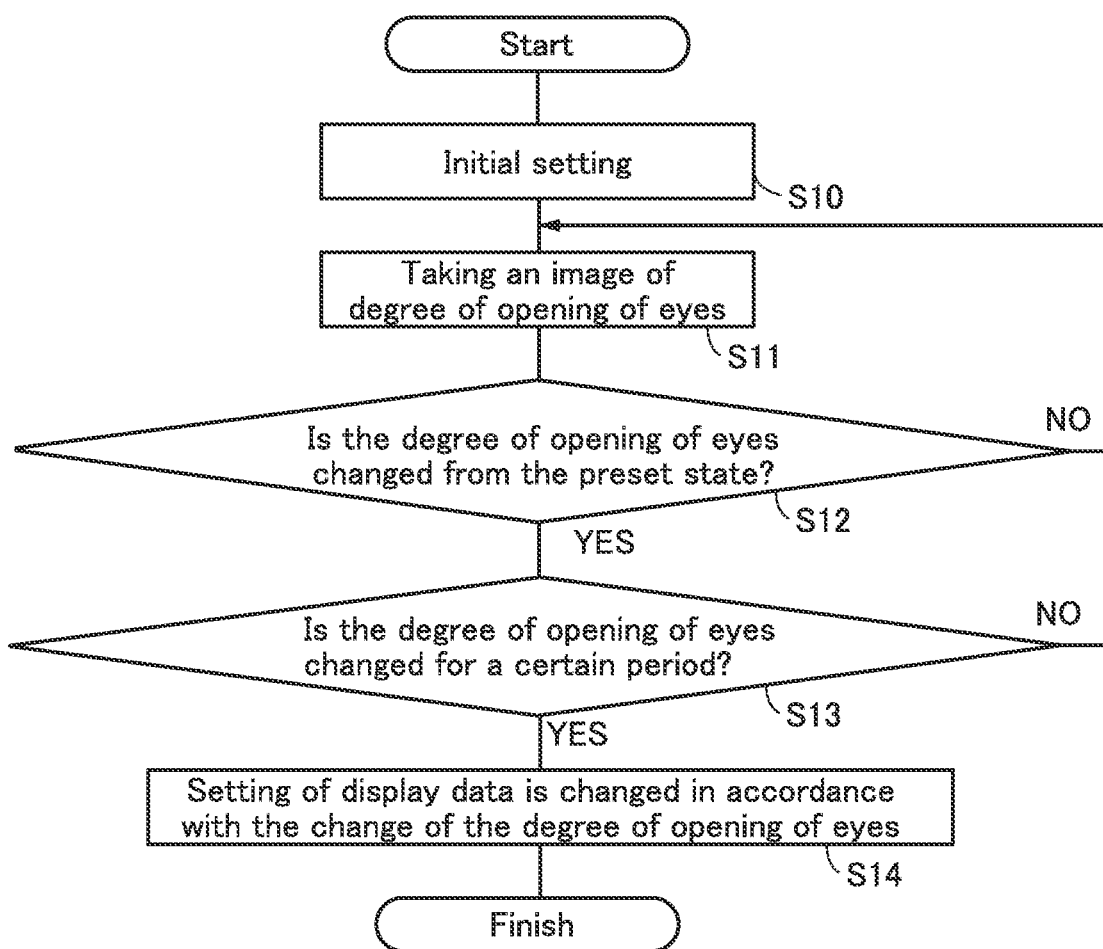

FIG. 24A1
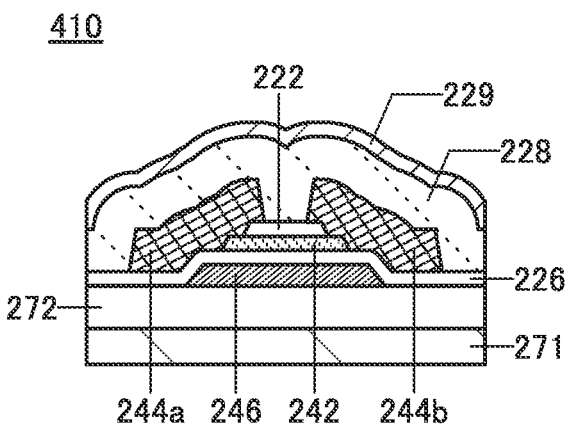
FIG. 24A2
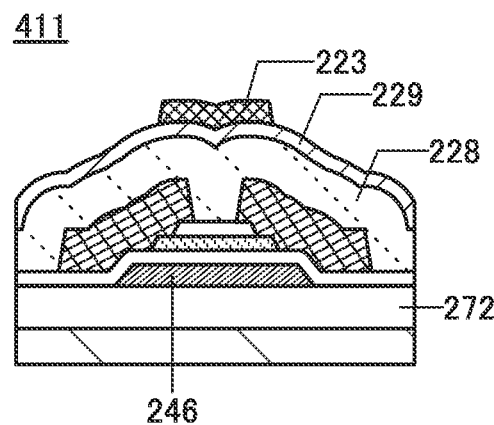
FIG. 24B1
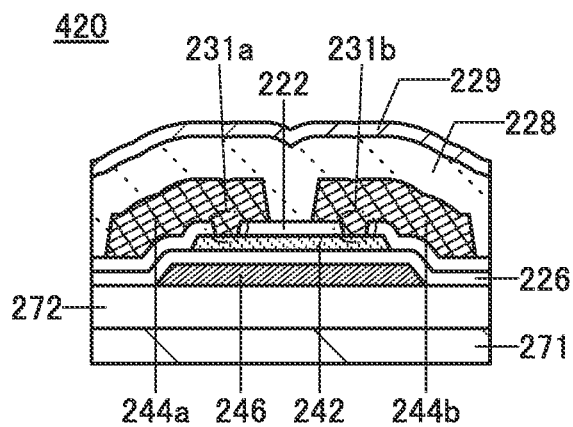
FIG. 24B2
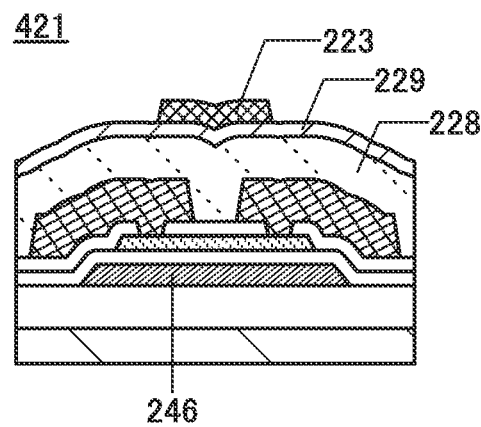
FIG. 24C1
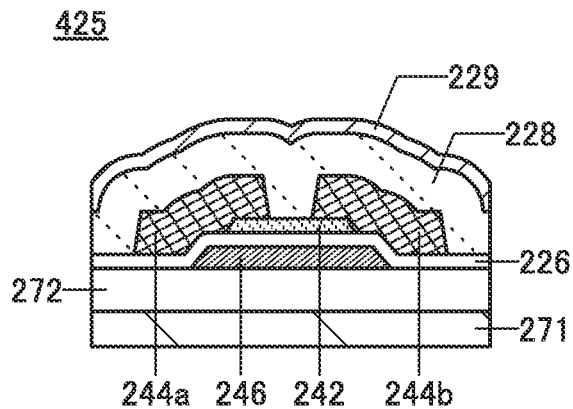
FIG. 24C2
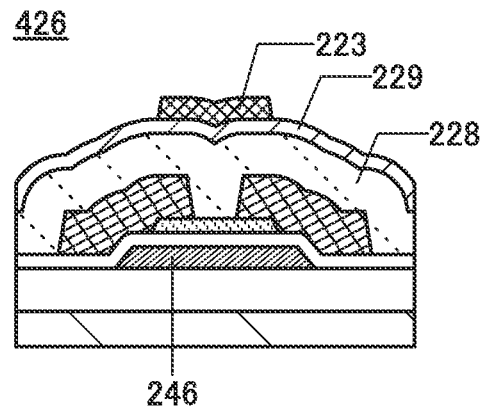

FIG. 25A1
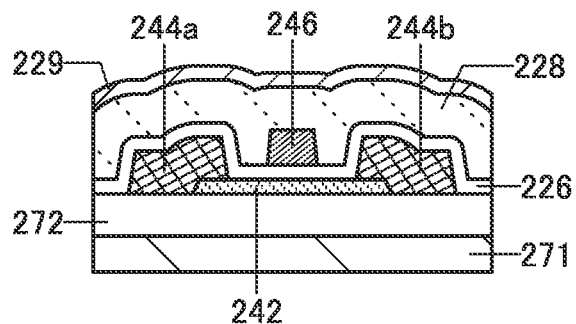
FIG. 25A2
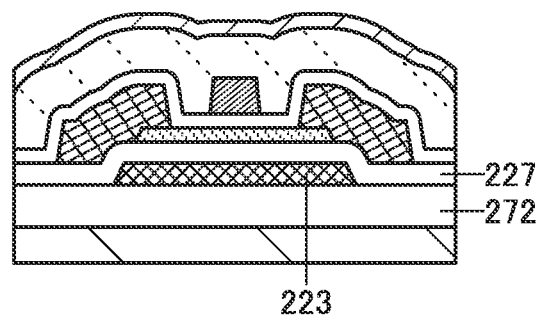
FIG. 25A3
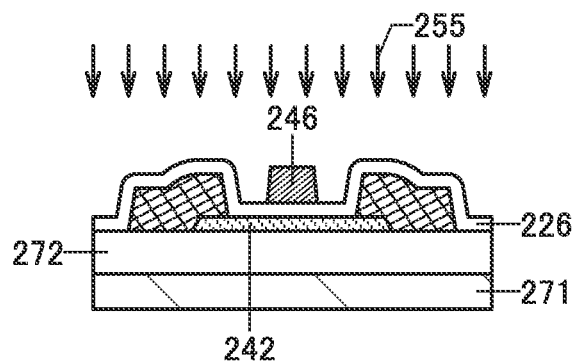
FIG. 25B1
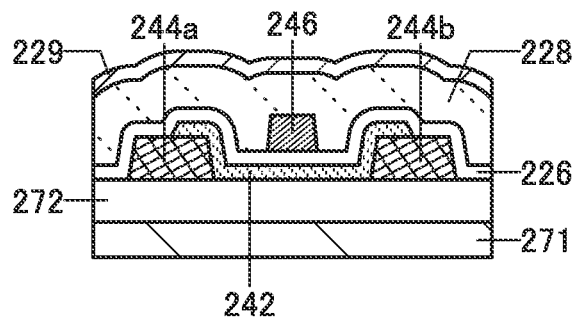
FIG. 25B2
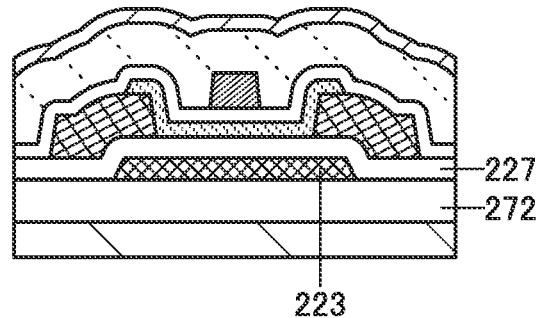

FIG. 26A1
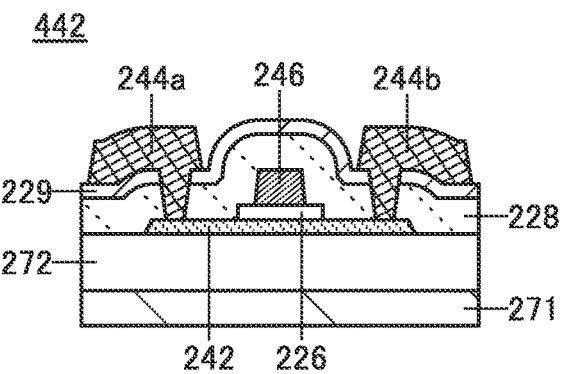
FIG. 26A2
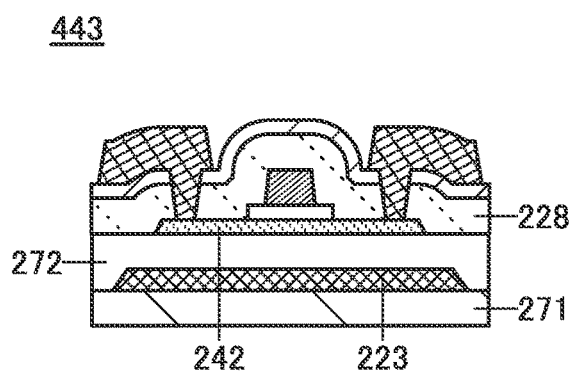
FIG. 26A3
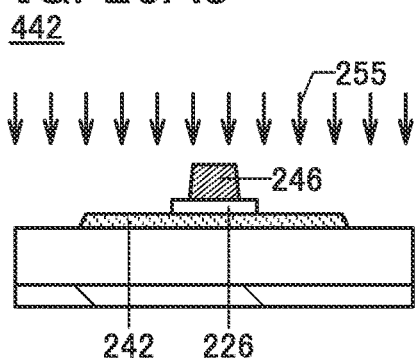
FIG. 26B1
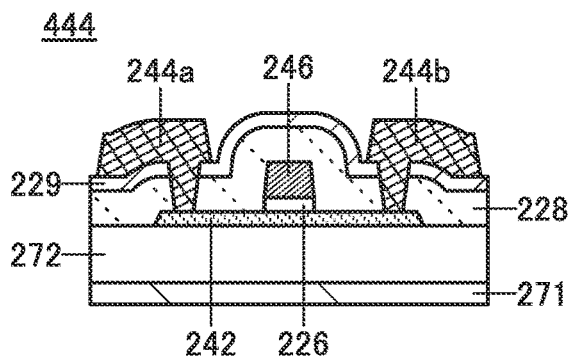
FIG. 26B2
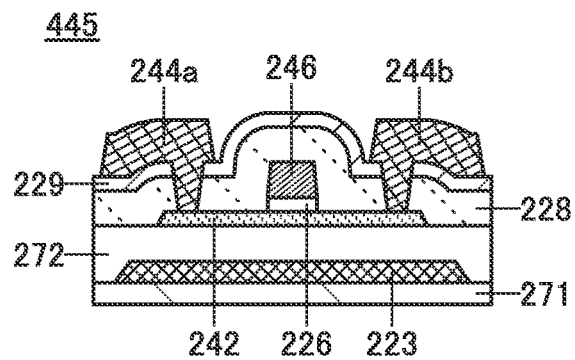
FIG. 26C1
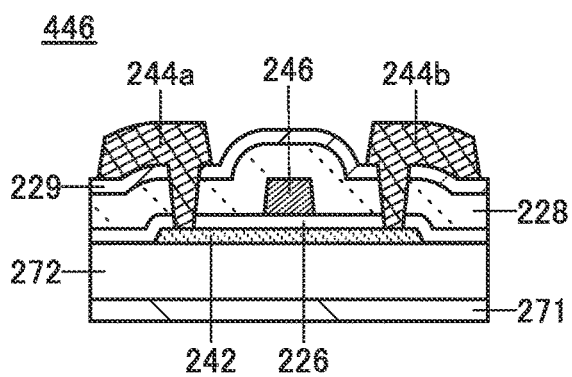
FIG. 26C2
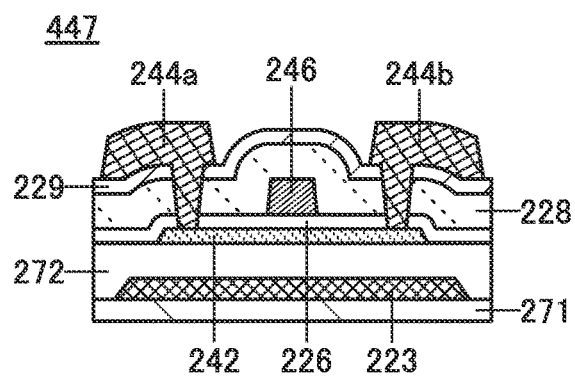

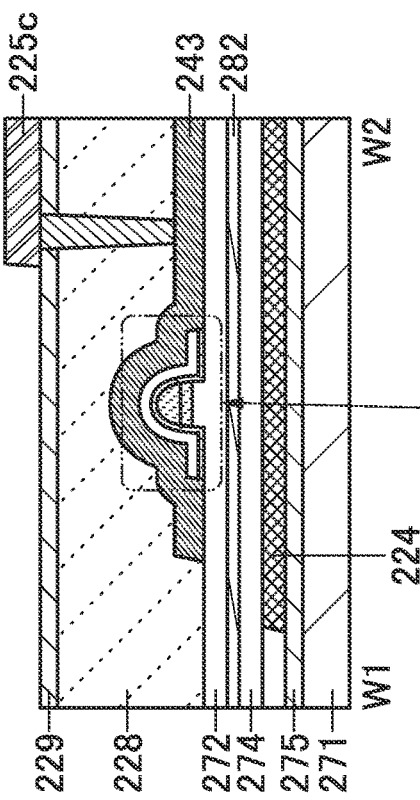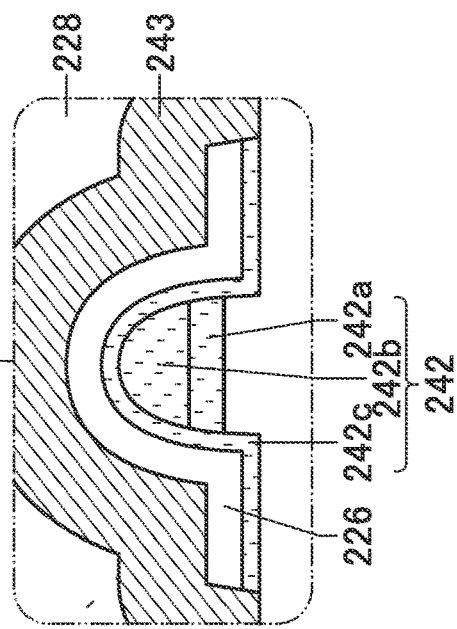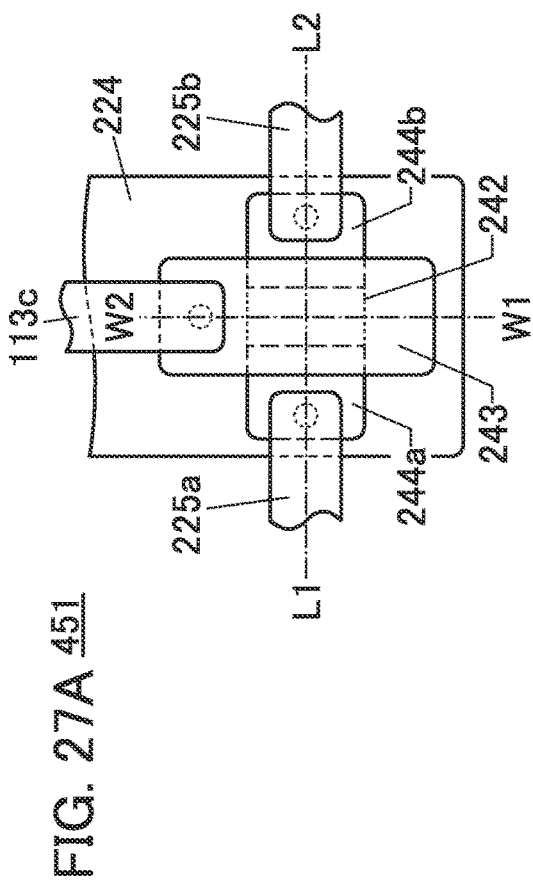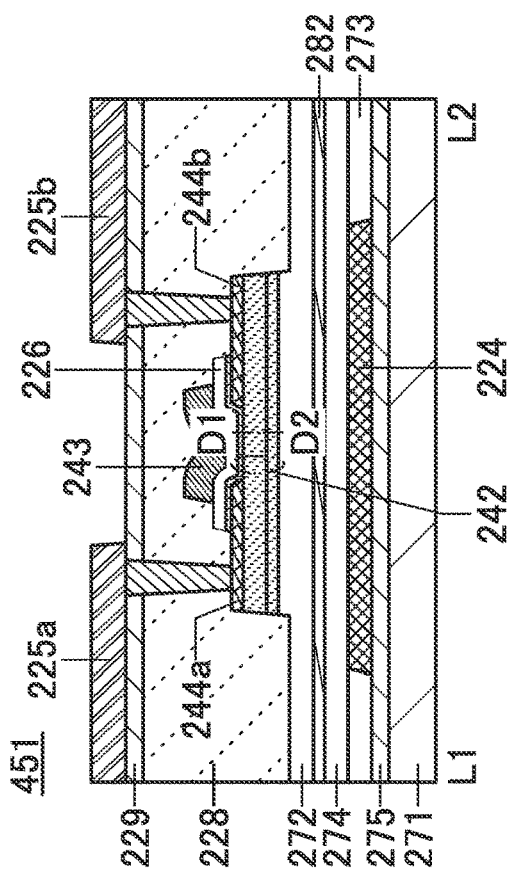
FIG. 27A, FIG. 27B, FIG. 27C

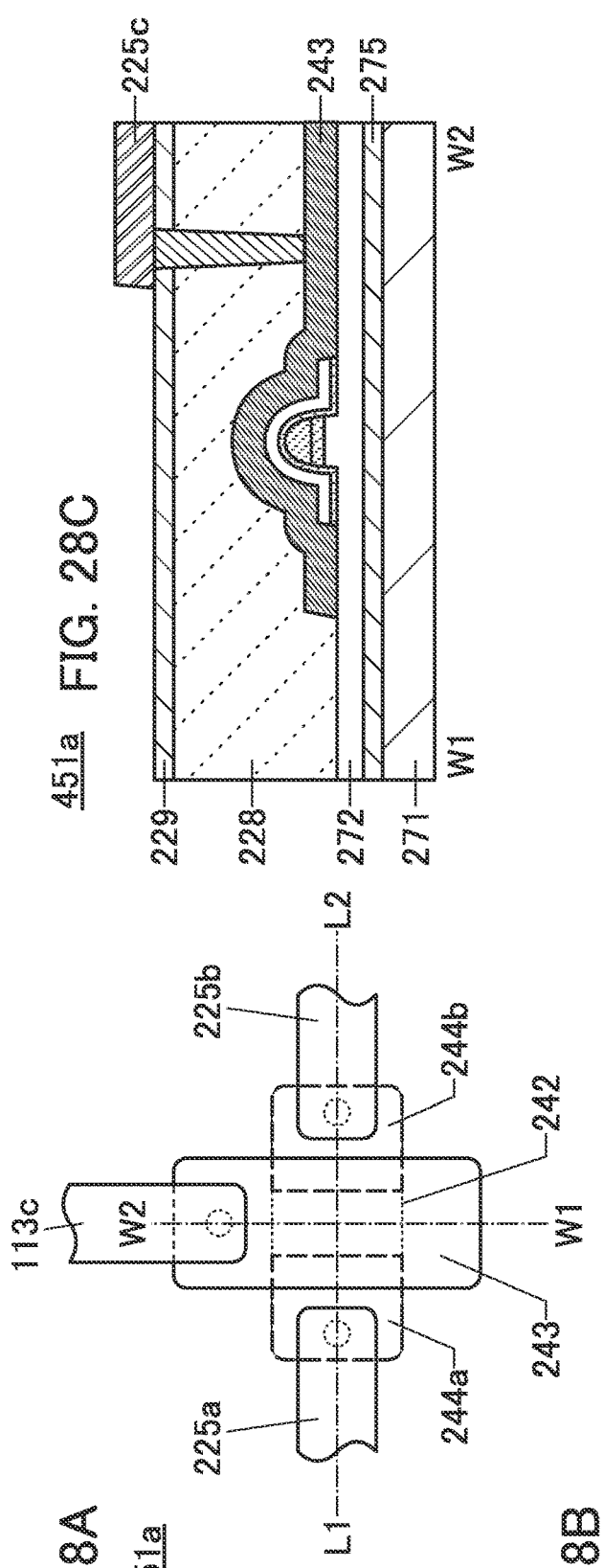
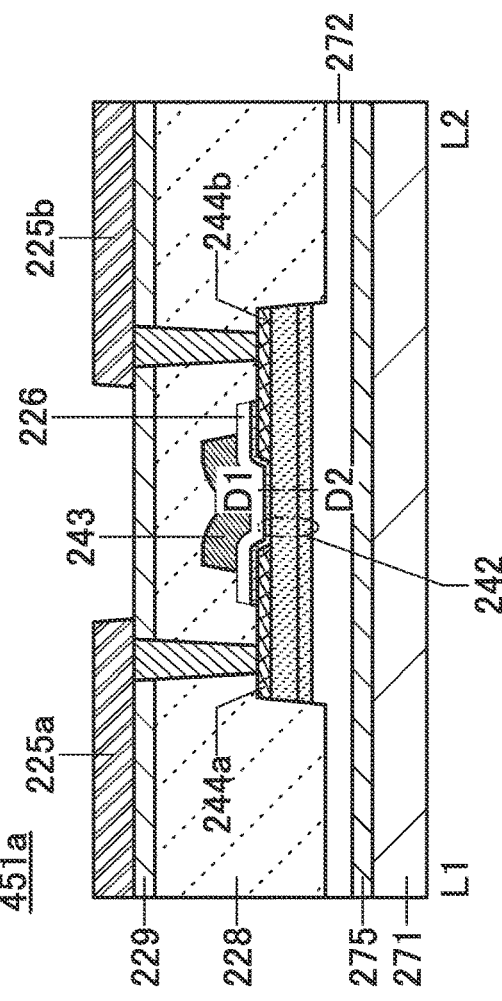

452

452

452

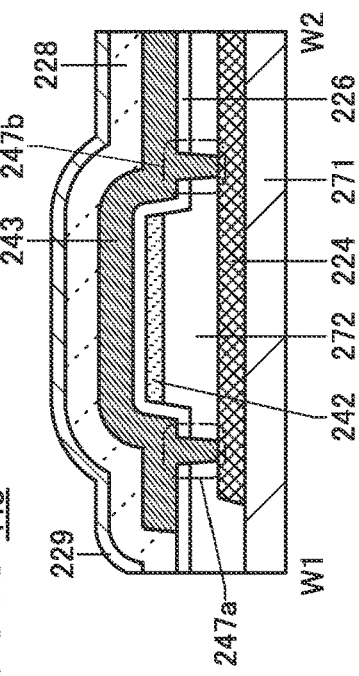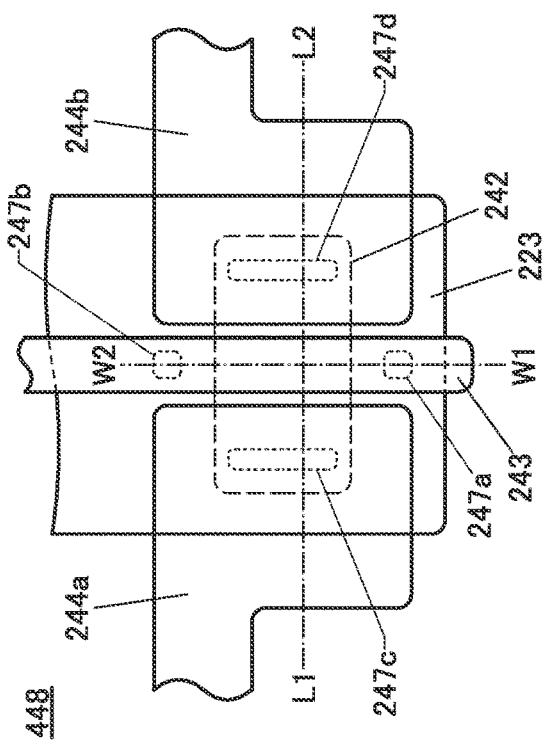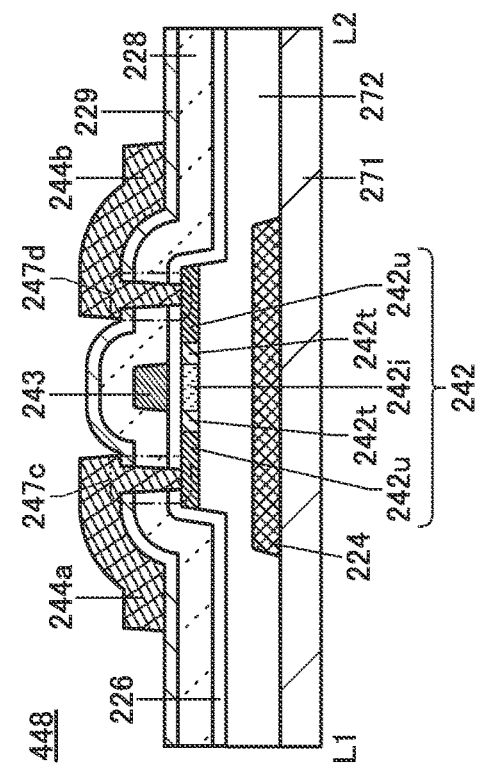
FIG. 34A
FIG. 34B
FIG. 34C

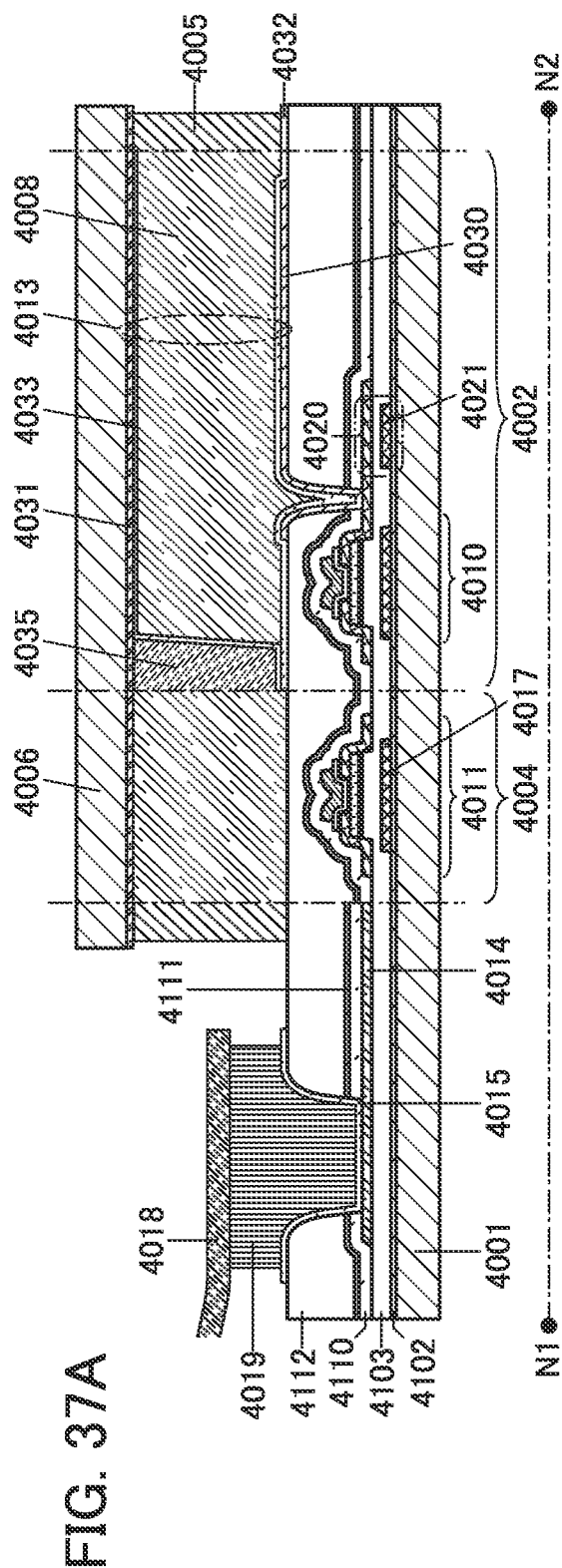
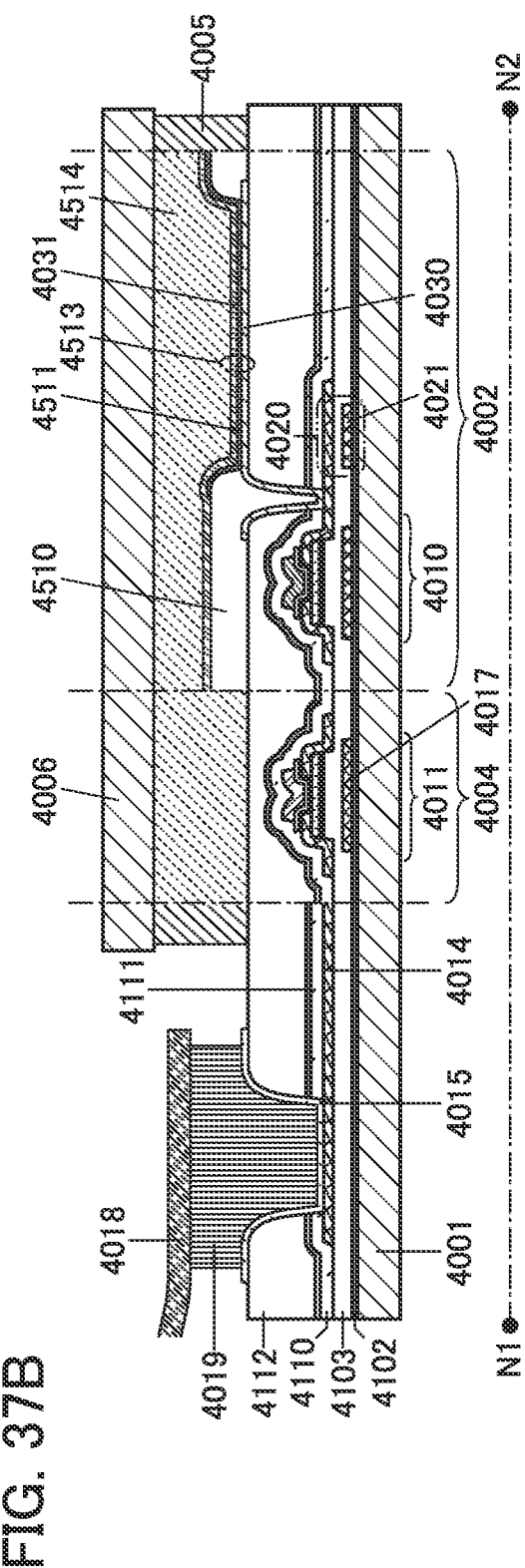
FIG. 37A
FIG. 37B

INPUT SYSTEM AND ELECTRONIC APPARATUS

BACKGROUND OF THE INVENTION

1. Field of the Invention

One embodiment of the present invention relates to an input system and an electronic apparatus.

Note that one embodiment of the present invention is not limited to the above technical field. The technical field of the invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving thereof, and a method for manufacturing thereof.

In this specification and the like, an electronic apparatus means an apparatus or the like that can function by utilizing electrical characteristics. For example, an apparatus including devices that function by utilizing electrical characteristics such as a display device and an imaging device is referred to as an electronic apparatus.

2. Description of the Related Art

A head mounted display (HMD) has been actively developed. An image is displayed by the HMD based on the inclination of a head (for example, see Patent Documents 1 and 2).

PATENT DOCUMENT

Patent Document [1] Japanese Published Patent Application No. 2015-55638
Patent Document [2] Japanese Published Patent Application No. 2015-192697

SUMMARY OF THE INVENTION

In the case of attempting to zoom up (or zoom out) a field while observation of an image is performed by an HMD, the magnification of a camera or the like needs to be set again. However, when a user performs operation with tools or medical tools or the like such as a forceps while wearing the HMD, the user has to part with the tools temporarily to operate the HMD. Thus, the operation is interrupted every time the setting is changed, whereby operating efficiency is decreased considerably.

One embodiment of the present invention is to provide an input system and an electronic apparatus with novel structures whose settings can be changed even when both hands are full. Another object is to provide an input system and an electronic apparatus with novel structures.

Note that the objects of one embodiment of the present invention are not limited to the above objects. The objects described above do not disturb the existence of other objects. The other objects are the ones that are not described above and will be described below. The other objects will be apparent from and can be derived from the description of the specification, the drawings, and the like by those skilled in the art. One embodiment of the present invention is to solve at least one of the above objects and/or the other objects.

One embodiment of the present invention is an input system including an imaging device having a function of taking an image of eyes and a detection device having a function of detecting a change of the shape of the eyes from data obtained by the imaging device. The setting of the input system is changed in accordance with the change of the shape of the eyes.

One embodiment of the present invention is an electronic apparatus including an imaging device having a function of taking an image of eyes, a detection device having a function of detecting a change of the shape of the eyes from data obtained by the imaging device, an arithmetic device having a function of performing computation of display data based on a change of the setting corresponding to the change of the shape of the eyes, and a display device performing display corresponding to the display data.

One embodiment of the present invention is an electronic apparatus including an imaging device having a function of taking an image of eyes, a detection device having a function of detecting a change of the shape of the eyes from data obtained by the imaging device, an acceleration sensor having a function of detecting a movement of a head, an arithmetic device having a function of performing computation of display data based on a change of the setting corresponding to the movement of the head and the change of the shape of the eyes, and a display device performing display corresponding to the display data.

In one embodiment of the present invention, the electronic apparatus preferably includes a display device including a light-emitting element.

In one embodiment of the present invention, the electronic apparatus preferably includes a display device including a liquid crystal element.

In one embodiment of the present invention, the electronic apparatus preferably includes a display device which is a retina scanning type projection device.

Note that other embodiments of the present invention will be described in the following embodiments with reference to the drawings.

One embodiment of the present invention can provide an input system and an electronic apparatus with novel structures whose settings can be changed even when both hands are full. One embodiment of the present invention can also provide an input system and an electronic apparatus with novel structures.

Note that the effects of one embodiment of the present invention are not limited to the above effects. The effects described above do not disturb the existence of other effects. The other effects are the ones that are not described above and will be described below. The other effects will be apparent from and can be derived from the description of the specification, the drawings, and the like by those skilled in the art. One embodiment of the present invention is to have at least one of the above effects and the other effects. Accordingly, one embodiment of the present invention does not have the above effects in some cases.

BRIEF DESCRIPTION OF THE DRAWINGS

In the accompanying drawings.

FIG. 10 is a flow chart showing an operation of an electronic apparatus;

FIGS. 24A1, 24A2, 24B1, 24B2, 24C1, and 24C2 illustrate examples of transistors;

FIGS. 25A1, 25A2, 25A3, 25B1, and 25B2 illustrate examples of transistors;

FIGS. 26A1, 26A2, 26A3, 26B1, 26B2, 26C1, and 26C2 illustrate examples of transistors;

FIGS. 27A to 27C illustrate an example of a transistor;

FIGS. 28A to 28C illustrate an example of a transistor;

FIGS. 34A to 34C illustrate an example of a transistor;

FIGS. 37A and 37B each illustrate an example of a display device;

DETAILED DESCRIPTION OF THE INVENTION

Figure 1:
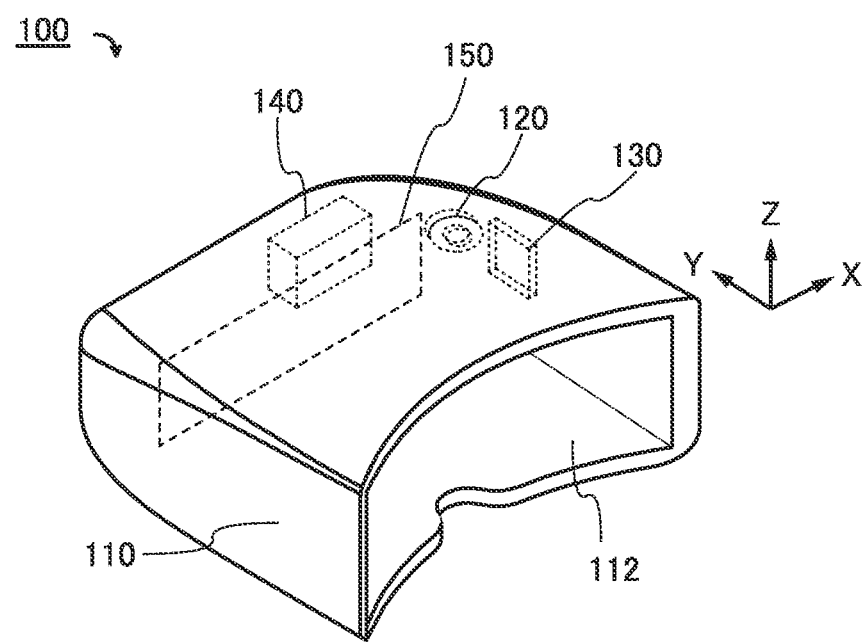
FIG. 1 illustrates an electronic apparatus.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments and example. Note that in the structures of the invention described below, the same portions or portions having similar functions are denoted by the same reference numerals in different drawings, and description of such portions is not repeated in some cases.

The position, size, range, and the like of each component illustrated in the drawings and the like are not accurately represented in some cases to facilitate understanding of the invention. Therefore, the present invention is not necessarily limited to the position, size, range, or the like as disclosed in the drawings and the like.

In the drawings, some components might not be illustrated for easy understanding of the invention. In addition, some hidden lines and the like might not be shown.

Ordinal numbers such as "first" and "second" in this specification and the like are used in order to avoid confusion among components and do not denote the priority or the order such as the order of steps or the stacking order. A term without an ordinal number in this specification and the like might be provided with an ordinal number in a claim in order to avoid confusion among components. A term with an ordinal number in this specification and the like might be provided with a different ordinal number in a claim. Moreover, a term with an ordinal number in this specification and the like might not be provided with any ordinal number in a claim and the like.

In addition, in this specification and the like, the term such as an "electrode" or a "wiring" does not limit a function of the component. For example, an "electrode" is used as part of a "wiring" in some cases, and vice versa. Further, the term "electrode" or "wiring" can also mean a combination of a plurality of "electrodes" and "wirings" formed in an integrated manner.

Note that the term "over" or "under" in this specification and the like does not necessarily mean that a component is placed "directly on" or "directly below" and "directly in contact with" another component. For example, the expression "electrode B over insulating layer A" does not necessarily mean that the electrode B is on and in direct contact with the insulating layer A and can mean the case where another component is provided between the insulating layer A and the electrode B.

Functions of a source and a drain might be switched depending on operation conditions or the like, for example, when a transistor having opposite polarity is employed or the direction of current flow is changed in circuit operation. Thus, it is difficult to define which is a source or a drain. Accordingly, the terms "source" and "drain" can be switched in this specification.

Furthermore, in this specification and the like, an explicit description "X and Y are connected" means that X and Y are electrically connected, X and Y are functionally connected, and X and Y are directly connected. Accordingly, without being limited to a predetermined connection relationship, for example, a connection relationship shown in drawings or texts, another connection relationship is included in the drawings or the texts.

Note that in this specification and the like, the term "electrically connected" includes the case where components are connected through an object having any electric function. There is no particular limitation on the "object having any electric function" as long as electric signals can be transmitted and received between components that are connected through the object. Accordingly, even when the expression "electrically connected" is used in this specification, there is a case in which no physical connection is made and a wiring is just extended in an actual circuit.

Note that the channel length refers to, for example, a distance between a source (source region or source electrode) and a drain (drain region or drain electrode) in a region where a semiconductor (or a portion where a current flows in a semiconductor when a transistor is on) and a gate electrode overlap with each other or a region where a channel is formed (also referred to as a "channel formation region") in a top view of the transistor. In one transistor, channel lengths in all regions are not necessarily the same. In other words, the channel length of one transistor is not fixed to one value in some cases. Therefore, in this specification, the channel length is any one of values, the maximum value, the minimum value, or the average value in a region where a channel is formed.

The channel width refers to, for example, the length of a portion where a source and a drain face each other in a region where a semiconductor (or a portion where a current flows in a semiconductor when a transistor is on) and a gate electrode overlap with each other, or a region where a channel is formed. In one transistor, channel widths in all regions are not necessarily the same. In other words, the channel width of one transistor is not fixed to one value in some cases. Therefore, in this specification, the channel width is any one of values, the maximum value, the minimum value, or the average value in a region where a channel is formed.

Note that depending on transistor structures, a channel width in a region where a channel is actually formed (also referred to as an "effective channel width") is different from a channel width shown in a top view of a transistor (also referred to as an "apparent channel width") in some cases. For example, in a transistor having a gate electrode covering a side surface of a semiconductor layer, an effective channel width is greater than an apparent channel width, and its influence cannot be ignored in some cases. For example, in a miniaturized transistor having a gate electrode covering a side surface of a semiconductor, the proportion of a channel region formed in a side surface of a semiconductor is increased in some cases. In that case, an effective channel width is greater than an apparent channel width.

In such a case, an effective channel width is difficult to measure in some cases. For example, to estimate an effective channel width from a design value, it is necessary to assume that the shape of a semiconductor is known as an assumption condition. Therefore, in the case where the shape of a semiconductor is not known accurately, it is difficult to measure an effective channel width accurately.

Therefore, in this specification, an apparent channel width is referred to as a surrounded channel width (SCW) in some cases. Further, in this specification, in the case where the term "channel width" is simply used, it may represent a surrounded channel width or an apparent channel width. Alternatively, in this specification, in the case where the term "channel width" is simply used, it may represent an effective channel width in some cases. Note that a channel length, a channel width, an effective channel width, an apparent channel width, a surrounded channel width, and the like can be determined by analyzing a cross-sectional TEM image and the like.

Note that in the case where field-effect mobility, a current value per channel width, and the like of a transistor are obtained by calculation, a surrounded channel width may be used for the calculation. In that case, a value different from one in the case where an effective channel width is used for the calculation is obtained in some cases.

Furthermore, unless otherwise specified, transistors described in this specification and the like are enhancement-type (normally-off-type) field effect transistors.

Note that an impurity in a semiconductor refers to, for example, elements other than the main components of a semiconductor. For example, an element with a concentration lower than 0.1 atomic % can be regarded as an impurity. Inclusion of impurities may cause an increase in density of states (DOS) in a semiconductor, and/or a decrease in the carrier mobility or the crystallinity. In the case where the semiconductor is an oxide semiconductor, examples of an impurity which changes characteristics of the semiconductor include Group 1 elements, Group 2 elements, Group 13 elements, Group 14 elements, Group 15 elements, and transition metals other than the main components of the oxide semiconductor; specifically, there are hydrogen (included in water), lithium, sodium, silicon, boron, phosphorus, carbon, and nitrogen, for example. When the semiconductor is an oxide semiconductor, oxygen vacancies may be formed by entry of impurities such as hydrogen, for example. Furthermore, when the semiconductor is silicon, examples of an impurity which changes the characteristics of the semiconductor include oxygen, Group 1 elements except hydrogen, Group 2 elements, Group 13 elements, and Group 15 elements.

In this specification, the term "parallel" indicates that the angle formed between two straight lines is greater than or equal to −10° and less than or equal to 10°, and accordingly also includes the case where the angle is greater than or equal to −5° and less than or equal to 5°. In addition, the term "substantially parallel" indicates that the angle formed between two straight lines is greater than or equal to −30° and less than or equal to 30°. The terms "perpendicular" and "orthogonal" indicate that the angle formed between two straight lines is greater than or equal to 80° and less than or equal to 100°, and accordingly also includes the case where the angle formed between two straight lines is greater than or equal to 85° and less than or equal to 95°. In addition, the term "substantially perpendicular" indicates that the angle formed between two straight lines is greater than or equal to 60° and less than or equal to 120°.

In this specification and the like, the terms "identical", "the same", "equal", "uniform", and the like (including synonyms thereof) used in describing calculation values and actual measurement values allow for a margin of error of ±20% unless otherwise specified.

In this specification, in the case where an etching step is performed after a photolithography process, a resist mask formed in the photolithography process is removed after the etching step, unless otherwise specified.

In this specification and the like, a high power supply potential $V_{DD}$ (hereinafter also simply referred to as $V_{DD}$ or H potential) is a power supply potential higher than a low power supply potential $V_{SS}$. The low power supply potential $V_{SS}$ (hereinafter also simply referred to as $V_{SS}$ or L potential) is a power supply potential lower than the high power supply potential $V_{DD}$. In addition, a ground potential can be used as $V_{DD}$ or $V_{SS}$.

For example, in the case where a ground potential is used as $V_{DD}$, $V_{SS}$ is lower than the ground potential, and in the case where a ground potential is used as $V_{SS}$, $V_{DD}$ is higher than the ground potential.

A "voltage" usually refers to a potential difference between a given potential and a reference potential (e.g., a ground potential (GND potential) or a source potential). Note that a "potential" is a relative concept, and a potential supplied to wirings or the like may be changed depending on a reference potential. Therefore, the terms "voltage" and "potential" can be used interchangeably in some cases. Note that in this specification and the like, $V_{SS}$ is the reference voltage unless otherwise specified.

Note that the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

In this specification, trigonal and rhombohedral crystal systems are included in a hexagonal crystal system.

Embodiment 1

An electronic apparatus and an input system of one embodiment of the present invention will be described with reference to drawings. The electronic apparatus can be used as a head mounted display (HMD).

<External View>

FIG. 1 shows an example of an external view of an electronic apparatus. For illustrative purposes, FIG. 1 shows an X direction, a Y direction, and a Z direction.

An electronic apparatus 100 includes an imaging device 120, a detection device 130, an arithmetic device 140, and a display device 150.

The imaging device 120, the detection device 130, the arithmetic device 140, and the display device 150 can be provided in a housing 110, for example.

In the housing 110, the display device 150 and the imaging device 120 are provided to face an eyeball at an opening 112 provided in the Y direction.

As the imaging device 120, a camera including an imaging element which can take an image of the shape of eyes can be used. Since the outline of a portion where a cornea and a sclera are not covered with an eyelid is clear, the shape of the eyes can be detected without a high-performance imaging element.

The detection device 130 detects the change of the shape of the eyes based on the shape of the eyes captured with the imaging device 120. For example, the change of the shape of the eyes is detected from the data on the boundary between an eyelid and a sclera (white part of the eye) or the boundary between an eyelid and a cornea (e.g., black part of the eye). Since the detection of the change of the shape of the eyes by the detection device 130 involves image processing or arithmetic processing, it is also referred to as "the calculation of the change of the shape of the eyes" in some cases.

The arithmetic device 140 generates display data based on the change of the setting corresponding to the change of the shape of the eyes or display data based on the change of the setting corresponding to the movement of a head and the change of the shape of the eyes. Since generation of display data in the arithmetic device 140 involves a treatment in a circuit such as a processor, it can be also referred to as "performing an operation to generate display data" in some cases.

As the display device 150, an EL display device or a liquid crystal display device can be used. A display device whose display surface is curved so that the display surface can be provided to cover eyeballs is preferable.

With such a structure, an electronic apparatus and an input system whose settings can be changed even when both hands are full can be provided.

Figure 2A:
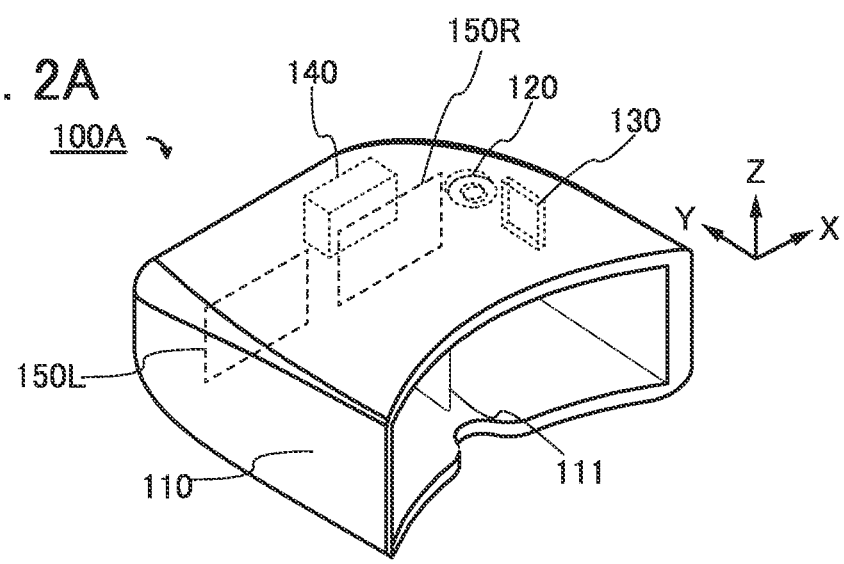
FIGS. 2A to 2C illustrate electronic apparatuses.
Figure 2B:
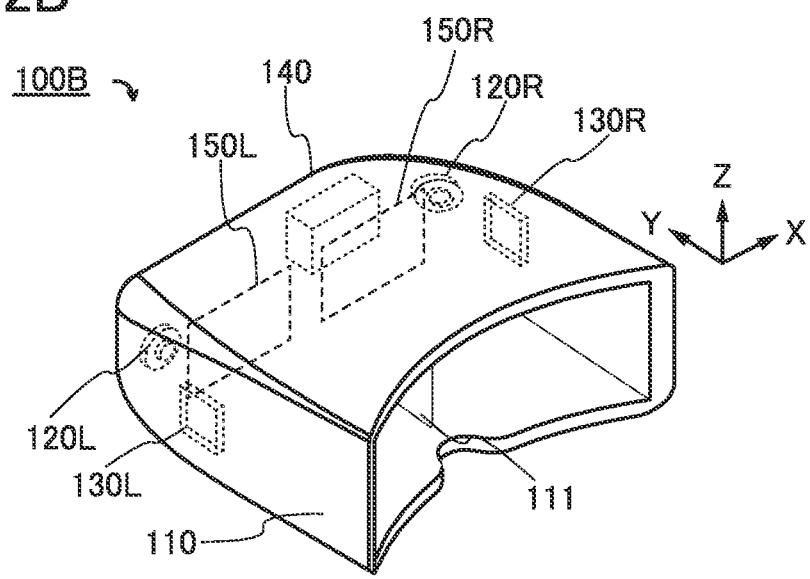
Figure 2C:
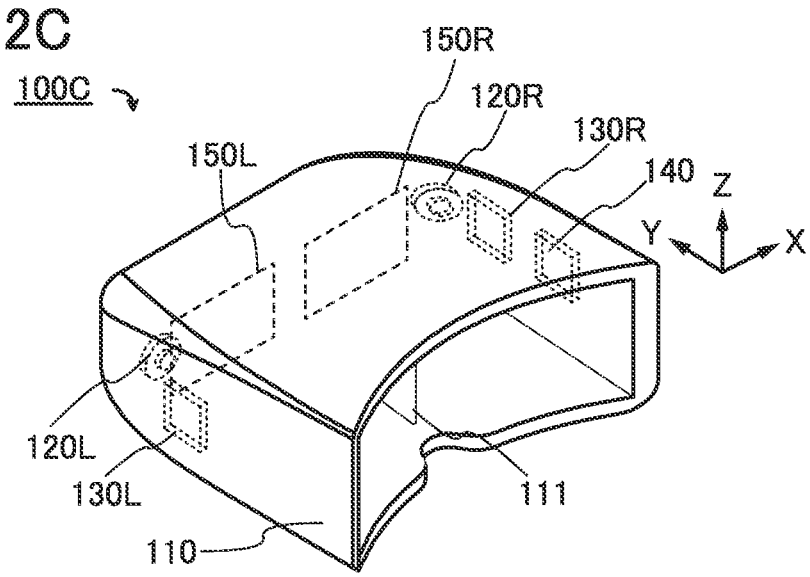

The electronic apparatus 100 illustrated in FIG. 1 may have any of structures in FIGS. 2A to 2C.

An electronic apparatus 100A illustrated in FIG. 2A includes the imaging device 120, the detection device 130, the arithmetic device 140, a separator 111, and display devices 150L and 150R. When images seen by left and right eyes are made different from each other by the separator 111 and the display devices 150L and 150R, binocular parallax is generated. The binocular parallax allows a user to see an image three-dimensionally.

An electronic apparatus 100B illustrated in FIG. 2B includes imaging devices 120L and 120R, detection devices 130L and 130R, the arithmetic device 140, the separator 111, and the display devices 150L and 150R. As in FIG. 2A, the binocular parallax allows a user to see an image three-dimensionally. The change of the shape of eyes can be detected separately.

As in FIG. 2B, an electronic apparatus 100C illustrated in FIG. 2C includes the imaging devices 120L and 120R, the detection devices 130L and 130R, the arithmetic device 140, the separator 111, and the display devices 150L and 150R. FIG. 2C differs from FIG. 2B in that the arithmetic device 140 is provided on a side surface of a housing from a back surface of the display device 150R. This structure reduces deviation of the center of gravity due to the concentration of devices on the end portion side of the housing 110.

Figure 3A:
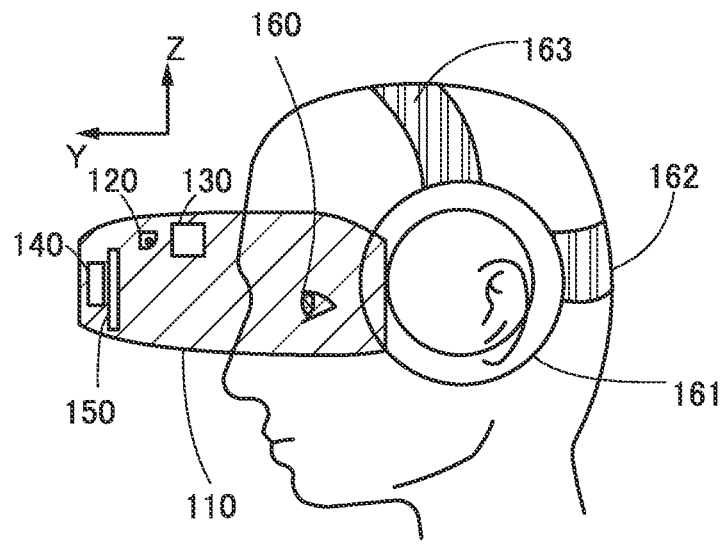
FIGS. 3A and 3B illustrate an electronic apparatus.
Figure 3B:
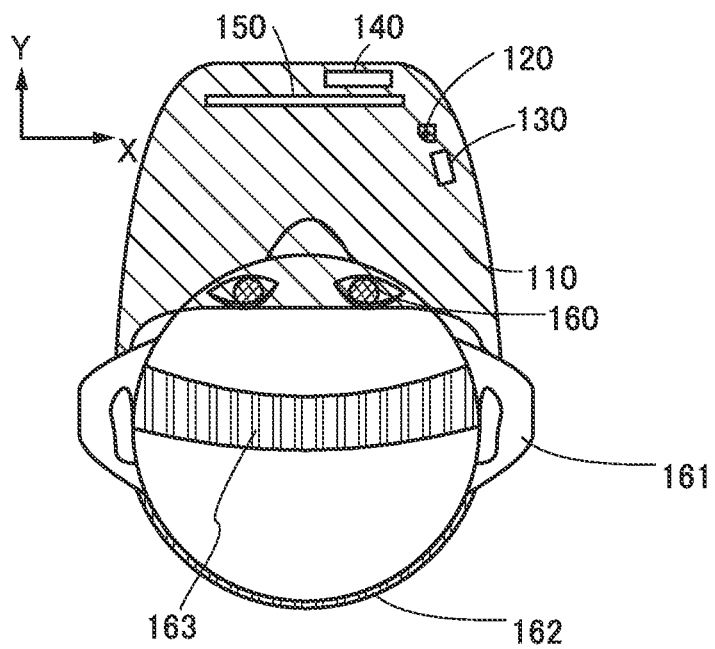

FIGS. 3A and 3B show an example where a user wears the electronic apparatus 100 illustrated in FIG. 1.

FIG. 3A is a view of a user who wears the housing 110 seen from the X direction. FIG. 3A illustrates the housing 110 including the imaging device 120, the detection device 130, the arithmetic device 140, and the display device 150, an eyeball 160 of a user, and a speaker portion 161 and fixing units 162 and 163 for fixing the housing 110 to a head. The speaker portion 161 and the fixing units 162 and 163 are provided to fix the housing 110 to the head. Thus, the structure of the fixing portions is not limited to a band-like shape, and another structure may be used.

FIG. 3B is a view of a user who wears the housing 110 seen from the Z direction. In a manner similar to FIG. 3A, FIG. 3B illustrates the housing 110 including the imaging device 120, the detection device 130, the arithmetic device 140, and the display device 150, the eyeball 160 of the user, and the speaker portion 161 and the fixing units 162 and 163 for fixing the housing 110 to a head.

The electronic apparatus 100 illustrated in FIG. 1 can have a structure illustrated in FIGS. 4A and 4B or FIGS. 5A and 5B. FIGS. 4A and 4B and FIGS. 5A and 5B show examples where the electronic apparatus 100 illustrated in FIG. 1 is provided with an acceleration sensor for detecting the inclination of a head.

Figure 4A:
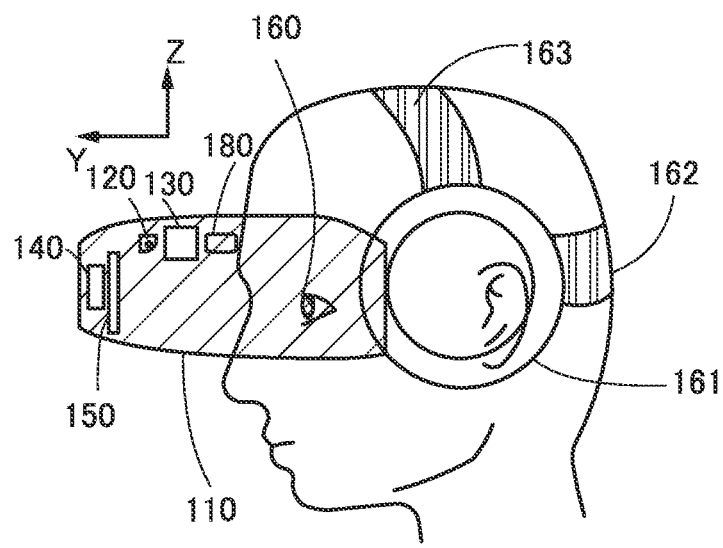
FIGS. 4A and 4B illustrate an electronic apparatus.
Figure 4B:
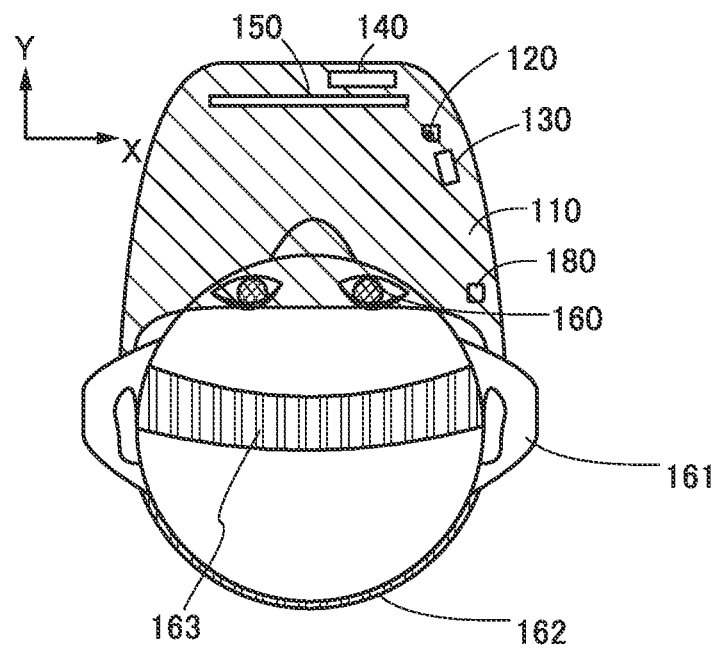

FIGS. 4A and 4B illustrate an example where a user wears an electronic apparatus provided with an acceleration sensor in the housing 110. In a manner similar to FIGS. 3A and 3B, FIGS. 4A and 4B are views seen from the specific direction.

As illustrated in FIGS. 4A and 4B, an acceleration sensor 180 can be provided in the housing 110. The acceleration sensor 180 can detect the inclination of the housing 110, so that the inclination of the head synchronizing the inclination of the housing 110 can be detected.

Figure 5A:
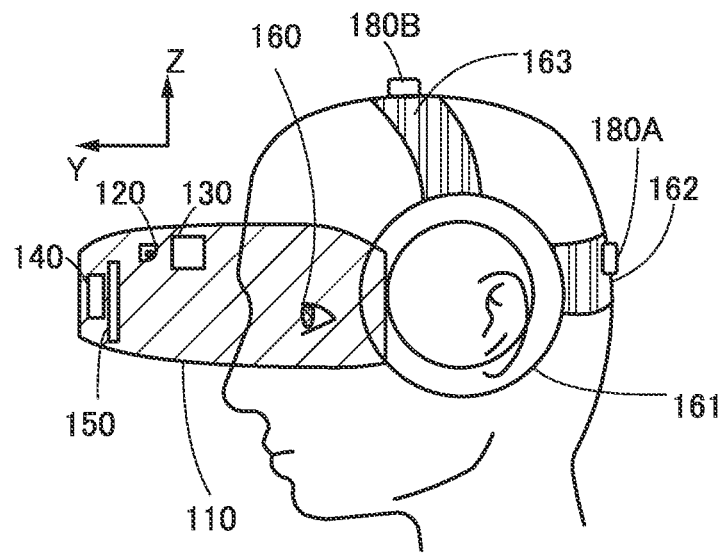
FIGS. 5A and 5B illustrate an electronic apparatus.
Figure 5B:
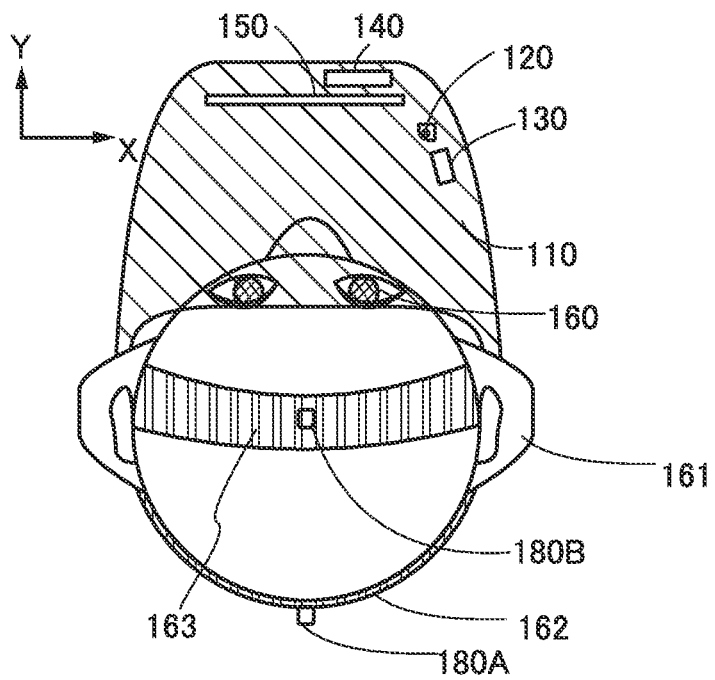

FIGS. 5A and 5B illustrate an example where a user wears an electronic apparatus provided with acceleration sensors outside the housing 110. In a manner similar to FIGS. 3A and 3B, FIGS. 5A and 5B are views seen from the specific direction.

Note that a device which detects the inclination of a head is not limited to an acceleration sensor. For example, the imaging device or the like provided outside the housing 110 may take images of the surrounding environment and detect the inclination of the head or the like on the basis of a change in images of the surrounding environment.

As illustrated in FIGS. 5A and 5B, acceleration sensors 180A and 180B can be provided on the fixing units 162 and 163 which are outside the housing 110. The acceleration sensors 180A and 180B can detect the inclination of a head.

<Block Diagram>

Figure 6:
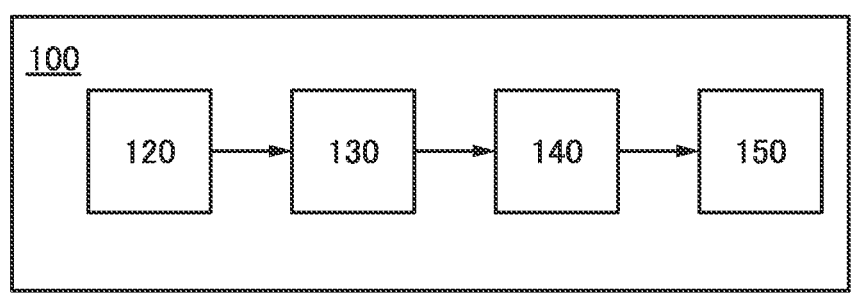
FIG. 6 is a block diagram of an electronic apparatus.

FIG. 6 is a block diagram of the electronic apparatus 100. In the block diagram in FIG. 6, as in a manner similar to that of FIG. 1, the electronic apparatus 100 includes the imaging device 120, the detection device 130, the arithmetic device 140, and the display device 150.

The imaging device 120 takes an image of the shape of eyes with a camera including an imaging element which can take an image. The imaging data of the shape of the eyes is output to the detection device 130. The imaging device 120 may include a mechanism for adjusting an inclination or the like of the imaging device 120 in order to take the image of the shape of the eyes reliably.

The detection device 130 detects the change of the shape of the eyes based on the imaging data of the shape of the eyes. The data on the change of the shape of the eyes is output to the arithmetic device 140.

Figure 7A:
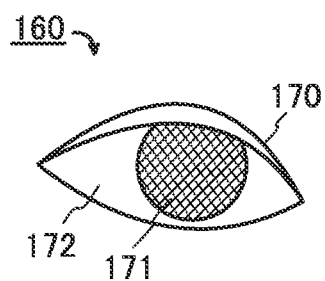
FIGS. 7A and 7B each illustrate an eyeball.

For example, the eyeball 160 of which image is taken is illustrated in FIG. 7A. Regions which are recognized as an eye in the eyeball 160 are a cornea 171 (e.g., black part of the eye) and a sclera 172 (white part of the eye). An eyelid 170 which is in the periphery of the eye protects the eyeball 160.

Figure 7B:
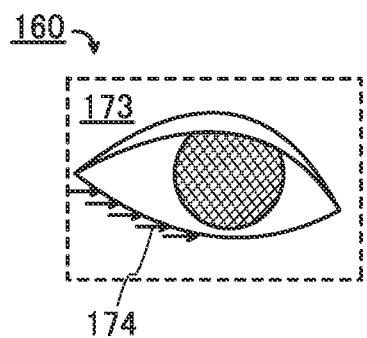

As illustrated in FIG. 7B, the movement of the sight line is determined by scanning an imaging region 173 including the cornea 171 and the sclera 172 in the horizontal direction (a direction indicated by an arrow 174 in the drawing) and specifying the boundary between the eyelid 170 and the sclera 172 or between the eyelid 170 and the cornea 171. Since the boundary between the eyelid 170 and the sclera 172 or between the eyelid 170 and the cornea 171 is clear, the shape of the eyes can be detected without a high-performance imaging element.

The arithmetic device 140 generates the display data which is changed based on a change of the setting such as the magnification of a camera corresponding to the data on the change of the shape of the eyes. The display data is generated based on the data of an acceleration sensor or the like in addition to the setting which is changed and output to the display device 150.

Figure 8A:
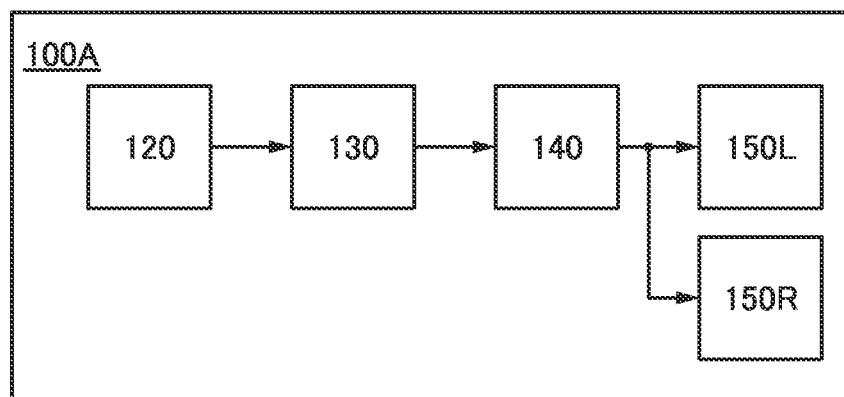
FIGS. 8A and 8B are block diagrams of electronic apparatuses.

FIG. 8A is a block diagram corresponding to the electronic apparatus 100A illustrated in FIG. 2A. The electronic apparatus 100A illustrated in FIG. 8A includes the imaging device 120, the detection device 130, the arithmetic device 140, the separator 111, and the display devices 150L and 150R. The display data generated by the arithmetic device 140 is output to the display devices 150L and 150R as different data.

Figure 8B:
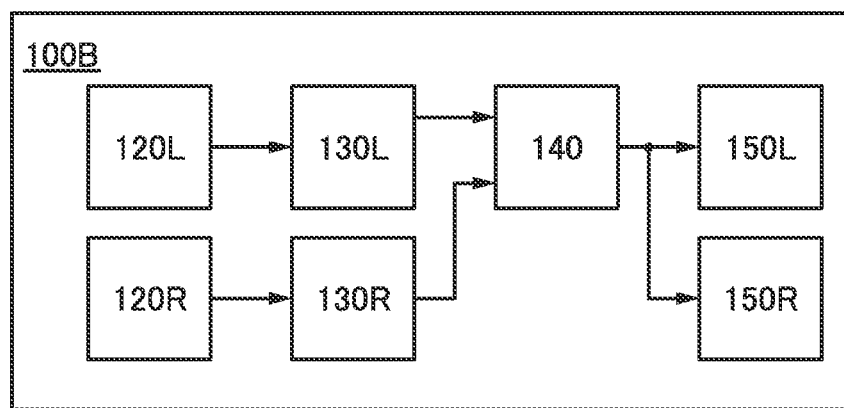
Figure 9A:
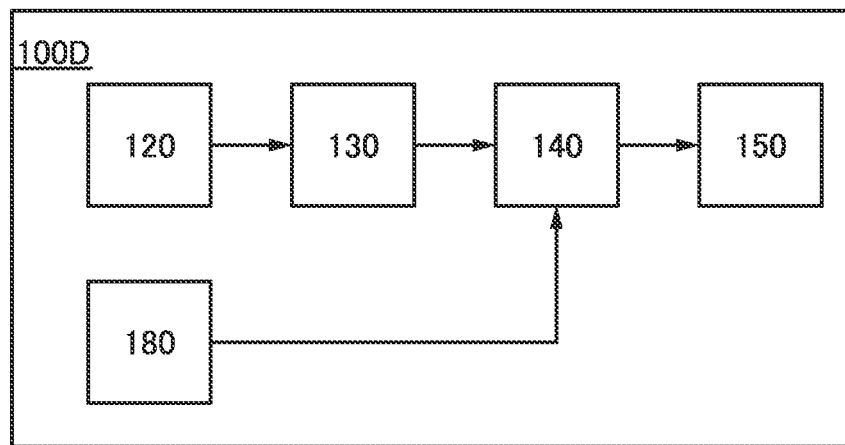
FIGS. 9A and 9B are block diagrams of electronic apparatuses.

FIG. 8B is a block diagram corresponding to the electronic apparatus 100B illustrated in FIG. 2B. The electronic apparatus 100B illustrated in FIG. 8B includes the imaging devices 120L and 120R, the detection devices 130L and 130R, the arithmetic device 140, the separator 111, and the display devices 150L and 150R. The imaging data generated by the imaging device 120L is output to the detection device 130L. The imaging data generated by the imaging device 120R is output to the detection device 130R. The display data generated by the arithmetic device 140 is output to the display devices 150L and 150R as different data. FIG. 9A is a block diagram corresponding to the electronic apparatus illustrated in FIGS. 4A and 4B. An electronic apparatus 100D illustrated in FIG. 9A includes the imaging device 120, the detection device 130, the arithmetic device 140, the separator 111, the display device 150, and the acceleration sensor 180. The data on the inclination of the head obtained by the acceleration sensor 180 is output to the arithmetic device 140.

Figure 9B:
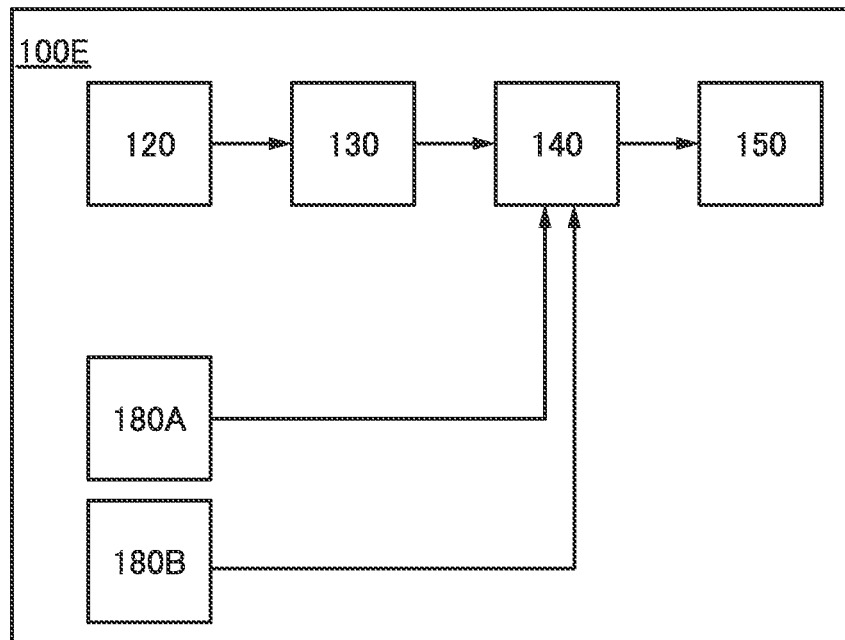

FIG. 9B is a block diagram corresponding to the electronic apparatus illustrated in FIGS. 5A and 5B. An electronic apparatus 100E illustrated in FIG. 9B includes the imaging device 120, the detection device 130, the arithmetic device 140, the separator 111, the display device 150, and the acceleration sensors 180A and 180B. The data on the inclination of the head obtained by the acceleration sensors 180A and 180B is output to the arithmetic device 140.

With this structure, the change in inclination of the head is estimated in accordance with the movement of a sight line, and display data corresponding to the estimated change in inclination can be generated. Thus, the display data can be generated before a head actually moves, so that display corresponding to the inclination of the head can be performed in real time.

<Flow Chart>

FIG. 10 is a flow chart showing an operation example of the electronic apparatus 100 and an input system.

In Step S10, initial settings of the setting which is in accordance with the shape of eyes (e.g., degree of opening) is performed. For example, the setting is not changed when the degree of opening of eyes is normal. The setting is changed to enlarge a display region and display in reduced form when eyes are opened widely. The setting is changed to narrow a display region and display in enlarged form when eyes are half-closed. The setting is changed not to perform display when eyes are closed.

In Step S11, an image of the degree of opening of eyes is taken by an imaging device, for example. At this time, if the degree of opening of eyes is changed by a blink or the like frequently but not continuously for a certain period, for example, it is regarded that there is no change in the degree of opening of eyes.

An image of the degree of opening of eyes is taken by the imaging device 120 and the change of the degree of opening of eyes is observed by the detection device 130. In Step S12, whether or not the degree of opening of eyes is changed from the preset state is determined. In Step S13, whether or not the change of the degree of opening of eyes is detected for a certain period is determined. When the change of the degree of opening of eyes is detected for a certain period, the operation in Step S14 is performed. Other than this case, for example, in the case where the change of the degree of opening of eyes is not detected or is not detected continuously for a certain period, the operation in Step S11 is performed.

In Step S14, setting of display data which is displayed is changed when the degree of opening of eyes is changed. The change in the setting corresponding to the change of the degree of opening of eyes is reflected in the display data.

Figure 11:
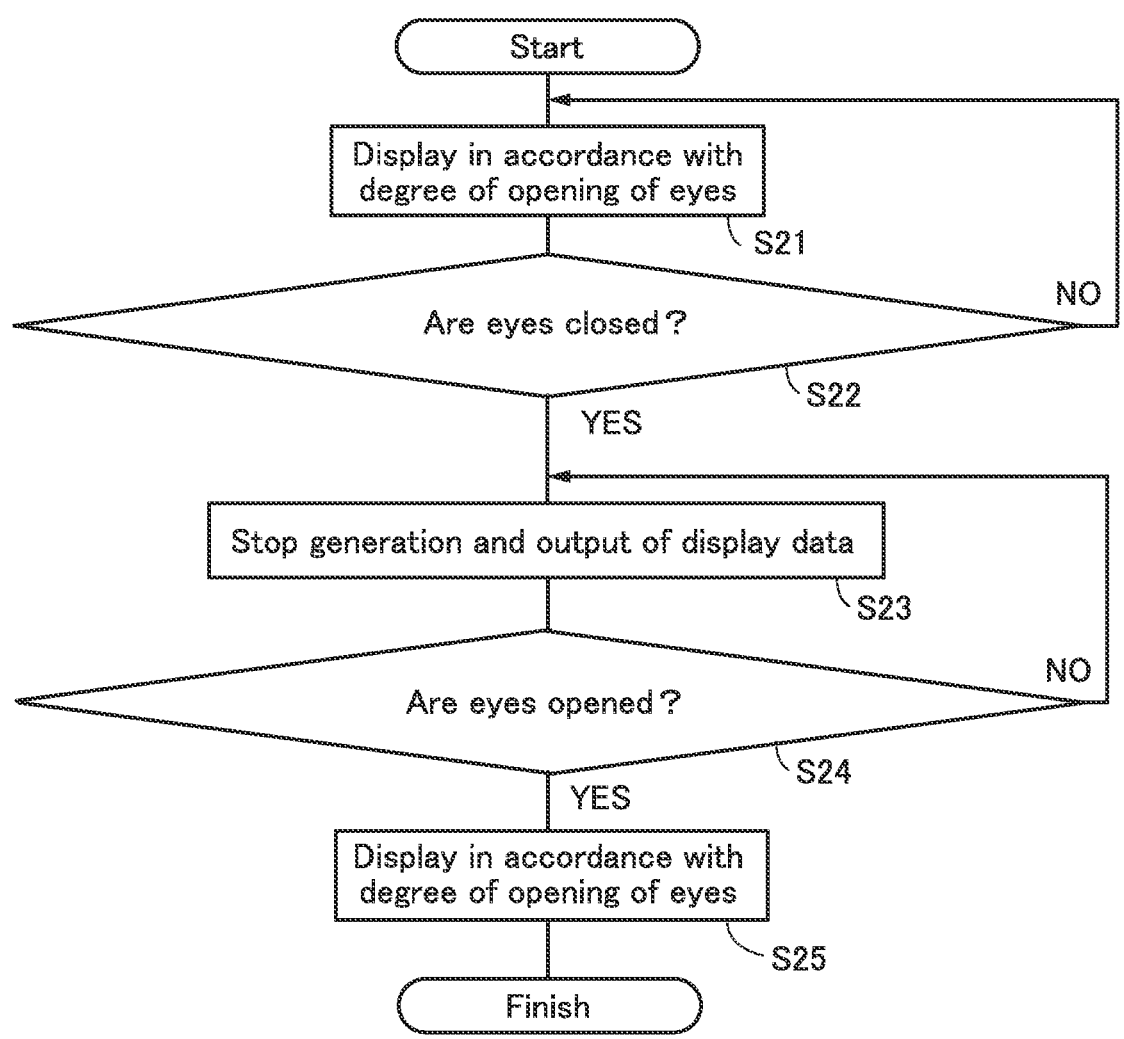
FIG. 11 is a flow chart showing an operation of an electronic apparatus.

FIG. 11 is a flow chart different from that in FIG. 10 which shows an operation example of the electronic apparatus 100.

In Step S21, display is performed based on the setting which is in accordance with the shape of eyes (e.g., degree of opening).

In Step S22, whether eyes are closed or not is determined by taking an image of the degree of opening of eyes. When closing of eyes is detected for a certain period, the operation in Step S23 is performed. Other than this case, it is determined that eyes are not closed, and the operation in Step S21 is performed.

In Step S23, when eyes are closed, generation and output of display data which is displayed are stopped, whereby the display device stops displaying the display data. Through Step S23, display by the display device can be stopped temporarily while a user does not see the display; therefore, power consumption can be reduced.

In Step S24, whether eyes are opened or not is determined by taking an image of the degree of opening of eyes. When opening of eyes is detected for a certain period, the operation in Step S25 is performed. Other than this case, it is determined that eyes are not opened, and the operation in Step S23 is performed.

In Step S25, when eyes are opened, generation and output of display data which is displayed are restarted, whereby the display device restarts displaying the display data. Here, the display device is set to display so that the brightness or the like of the display data is changed to that of the original display data gradually, whereby the glare or the like that a user feels can be reduced.

<Operation Example>

Operation examples are described with reference to FIG. 12, FIG. 13, FIGS. 14A and 14B, FIGS. 15A and 15B, and FIGS. 16A to 16C.

Figure 12:
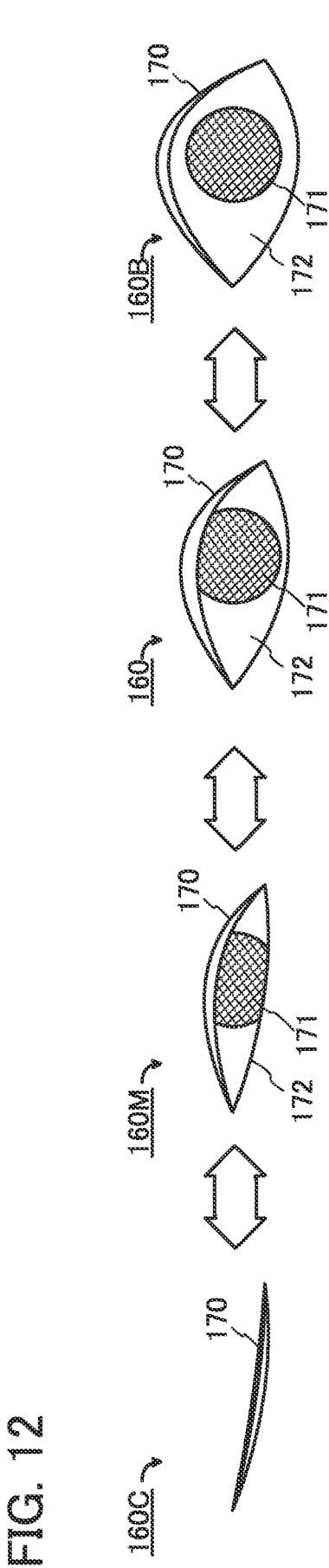
FIG. 12 illustrates movement of an eye.

FIG. 12 illustrates the degree of opening of an eye for describing an operation. The cornea 171, the sclera 172, and the eyelid 170 are also illustrated. The state where the degree of opening of an eye is normal is illustrated as the state of the eyeball 160 in FIG. 12. The state where an eye is opened widely is illustrated as the state of an eyeball 160B in FIG. 12. The state where an eye is half-closed is illustrated as the state of an eyeball 160M in FIG. 12. The state where an eye is closed is illustrated as the state of an eyeball 160C in FIG. 12.

Figure 13:
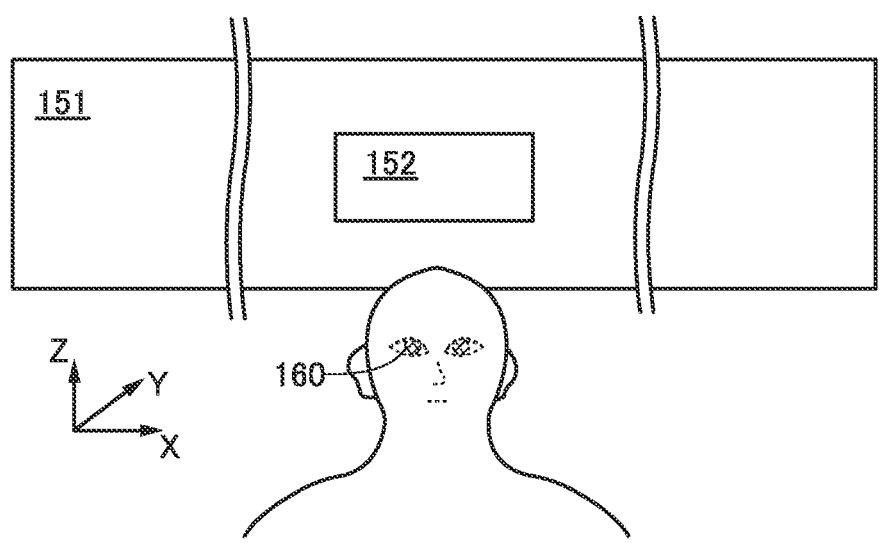
FIG. 13 illustrates the relationship between a sight line of a user and a display region in a virtual space.

FIG. 13 illustrates the relationship between a head of a user who wears an electronic apparatus, a virtual space to be seen, and a display region of a display device. FIG. 13 illustrates the user wearing the electronic apparatus, a virtual space 151, a display region 152, and the eyeball 160. In FIG. 13, components such as a housing of the electronic apparatus worn by the user are not illustrated.

Next, the change of the display data based on the change of the setting corresponding to the degree of opening of eyes will be described by illustrating specific operations and the degree of opening of eyes with reference to FIGS. 14A and 14B, FIGS. 15A and 15B, and FIGS. 16A to 16C. FIGS. 14A and 14B, FIGS. 15A and 15B, and FIGS. 16A to 16C illustrate the relationship between the virtual space 151, the display region 152, and the eyeball 160 as in FIG. 13.

Figure 14A:
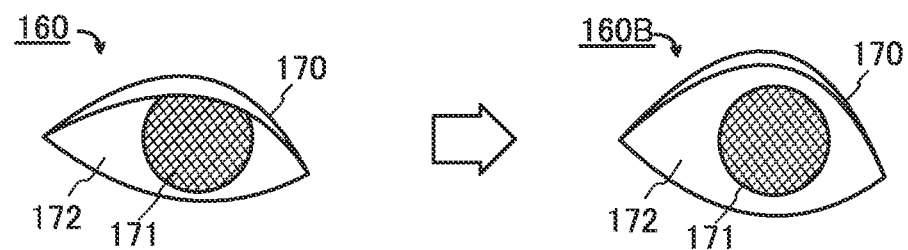
FIGS. 14A and 14B illustrate the relationship between a sight line of a user and a display region in a virtual space.

FIG. 14A illustrates that the degree of opening of an eye is changed from the eyeball 160 to the eyeball 160B. In this state, an imaging device of an electronic apparatus detects the change of the degree of opening of the eye from the eyeball 160 to the eyeball 160B and the arithmetic operation is performed to generate display data based on the change of the setting corresponding to the change of the state of the eye.

Figure 14B:
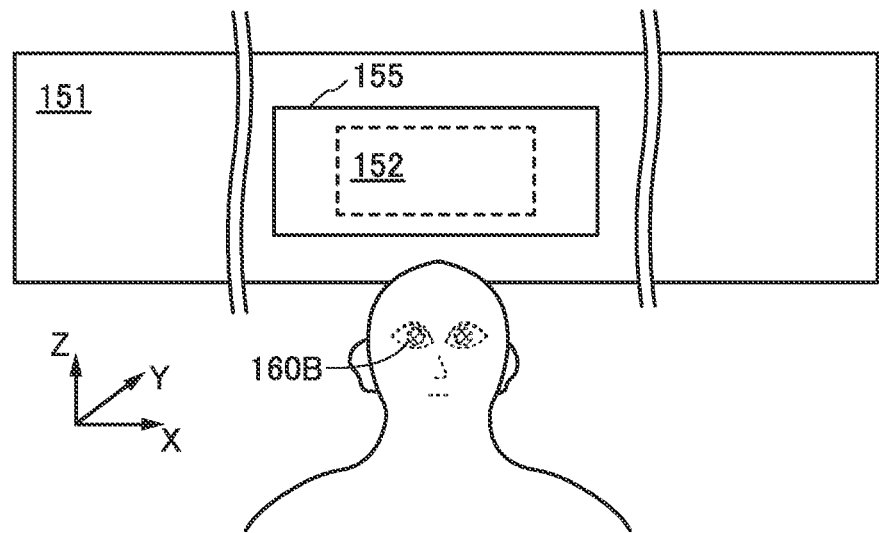

FIG. 14B illustrates the change of the display region of the display data based on the change of the setting corresponding to the change of the degree of opening of eyes (change from the eyeball 160 to the eyeball 160B) of a user watching the display region 152 in the virtual space 151 from the front. FIG. 14B illustrates that the display region 152 in an original state is enlarged to a display region 155.

Figure 15A:
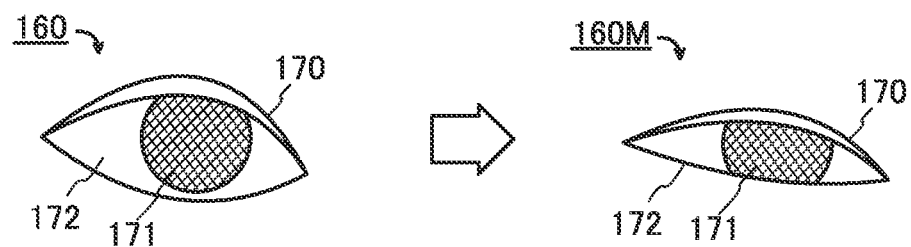
FIGS. 15A and 15B illustrate the relationship between a sight line of a user and a display region in a virtual space.

FIG. 15A illustrates that the degree of opening of an eye is changed from the eyeball 160 to the eyeball 160M. In this state, an imaging device of an electronic apparatus detects the change of the degree of squinting of the eye from the eyeball 160 to the eyeball 160M and the arithmetic operation is performed to generate display data based on the change of the setting corresponding to the change of the state of the eye.

Figure 15B:
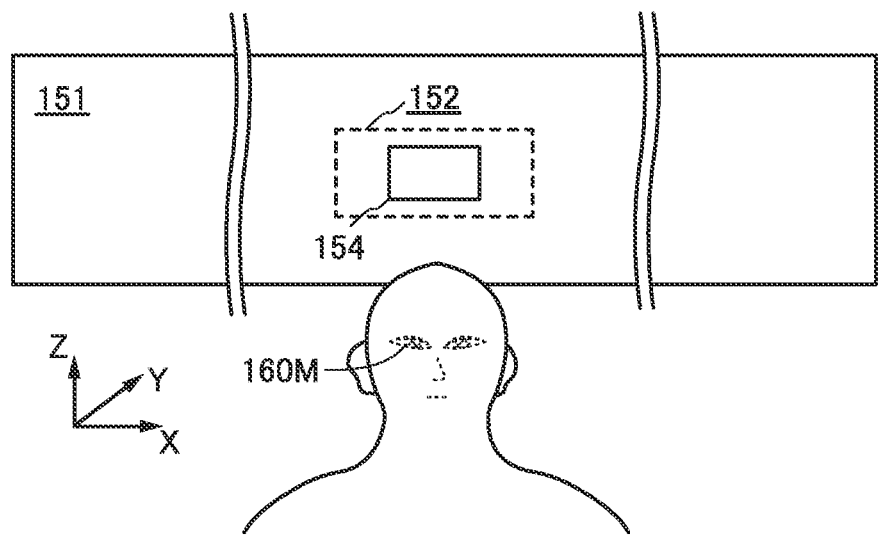

FIG. 15B illustrates the change of the display region of the display data based on the change of the setting corresponding to the change of the degree of opening of eyes (change from the eyeball 160 to the eyeball 160M) of a user watching the display region 152 in the virtual space 151 from the front. FIG. 15B illustrates that the display region 152 in an original state is narrowed to a display region 154.

Figure 16A:
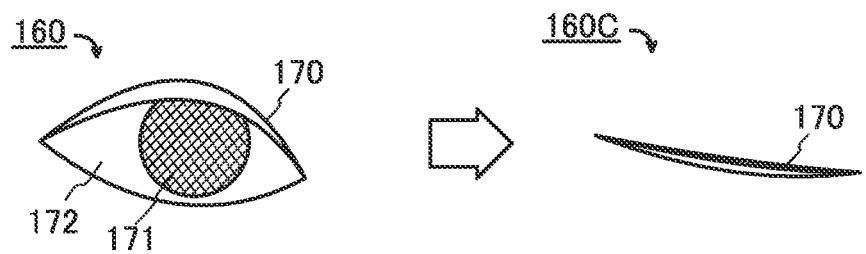
FIGS. 16A to 16C illustrate the relationship between a sight line of a user and a display region in a virtual space.

FIG. 16A illustrates that the degree of opening of an eye is changed from the eyeball 160 to the eyeball 160C. In this state, an imaging device of an electronic apparatus detects closing of the eye from the eyeball 160 to the eyeball 160C and the arithmetic operation is performed to generate display data based on the change of the setting corresponding to the change of the state of the eye.

Figure 16B:
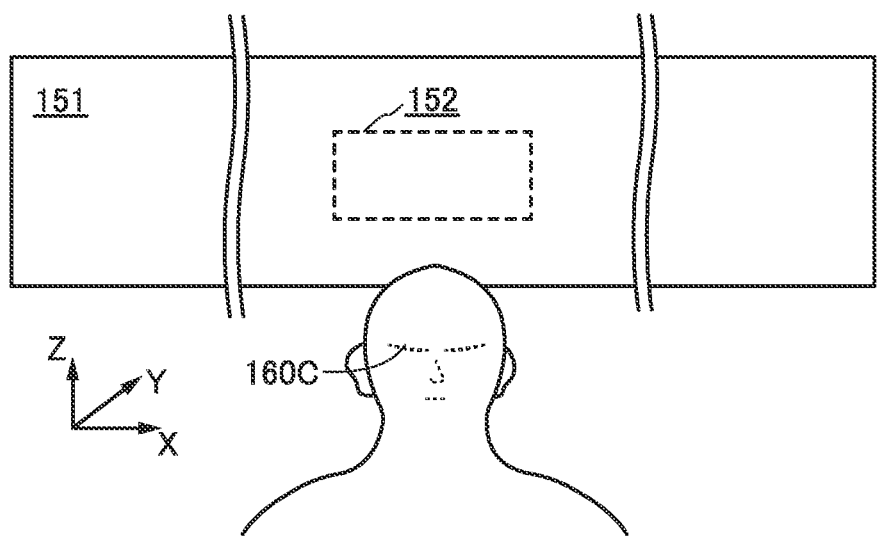
Figure 16C:
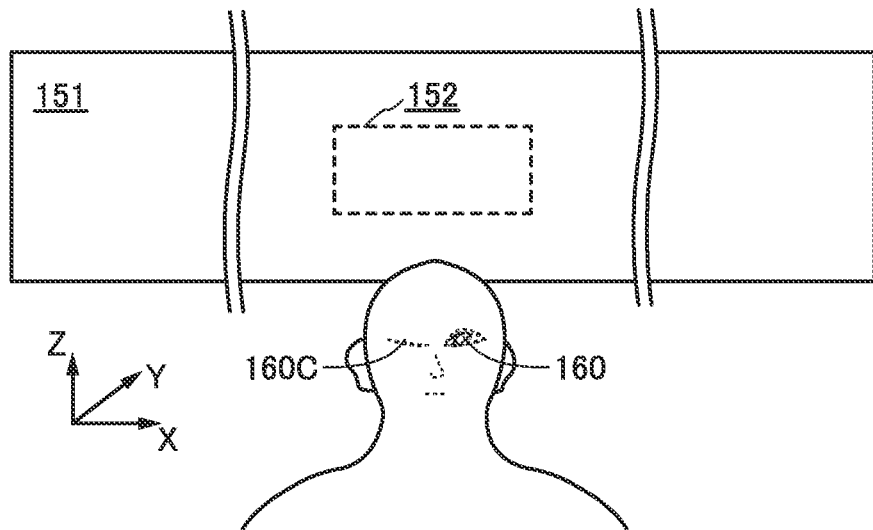

FIG. 16B illustrates the change of the display region of the display data based on the change of the setting corresponding to the change of the degree of opening of eyes (change from the eyeball 160 to the eyeball 160C) of a user watching the display region 152 in the virtual space 151 from the front. FIG. 16B illustrates that display is changed from the display in an original state in the display region 152 to the state where no display is performed. Note that the change of the degree of opening of eyes of the user may be detected from one eye as illustrated in FIG. 16C.

By detecting the shape of eyes and reflecting in the change of the setting of display as described above, an input system and an electric apparatus whose settings can be changed even when both hands are full can be provided.

MODIFICATION EXAMPLE

FIGS. 17A and 17B, FIGS. 18A and 18B, FIGS. 19A and 19B, and FIGS. 20A and 20B illustrate structure examples of an electronic apparatus which are different from that illustrated in FIG. 1.

Figure 17A:
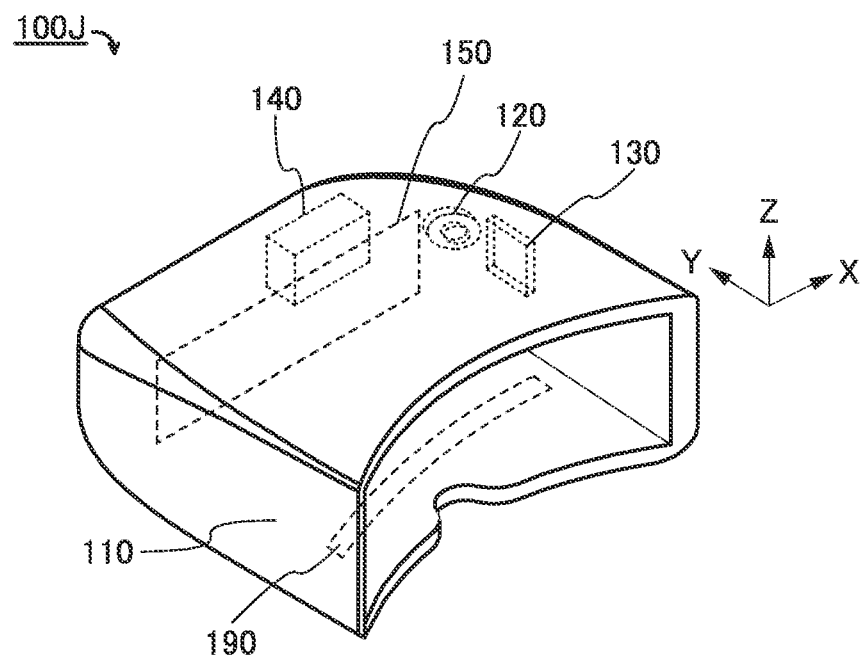
FIGS. 17A and 17B each illustrate an electronic apparatus.

The electronic apparatus 100J illustrated in FIG. 17A includes the imaging device 120, the detection device 130, the arithmetic device 140, the display device 150, and a lighting device 190. The left and right eyeballs are irradiated with light emitted from the lighting device 190, whereby the image of the state of eyeballs can be easily taken by the imaging device 120. The light emitted from the lighting device 190 is not limited to visible light. Light which does not influence the visibility of the display device 150, i.e., light with other wavelengths such as infrared light, may be used.

Figure 17B:
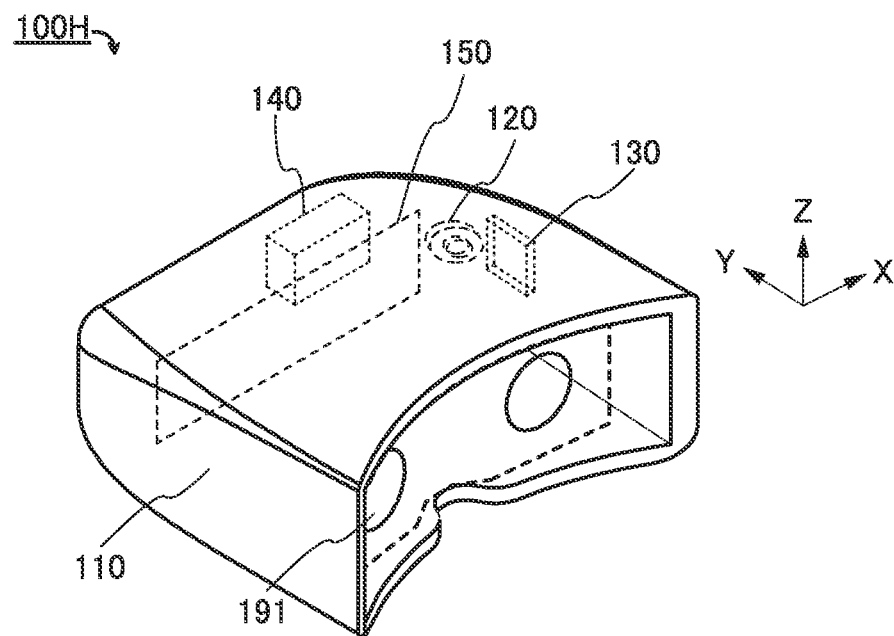

The electronic apparatus 100H illustrated in FIG. 17B includes the imaging device 120, the detection device 130, the arithmetic device 140, the display device 150, and an optical device 191. With the structure where the display device 150 is seen through the optical device 191, display can be easily seen. The imaging device 120 can be provided in front of the optical device 191 (an eyeball side) so that the image of the state of the eyeballs can be easily taken.

The electronic apparatus may be a retina scanning type electronic apparatus. An electronic apparatus 200 illustrated in FIGS. 18A and 18B is an example of the retina scanning type electronic apparatus.

Figure 18A:
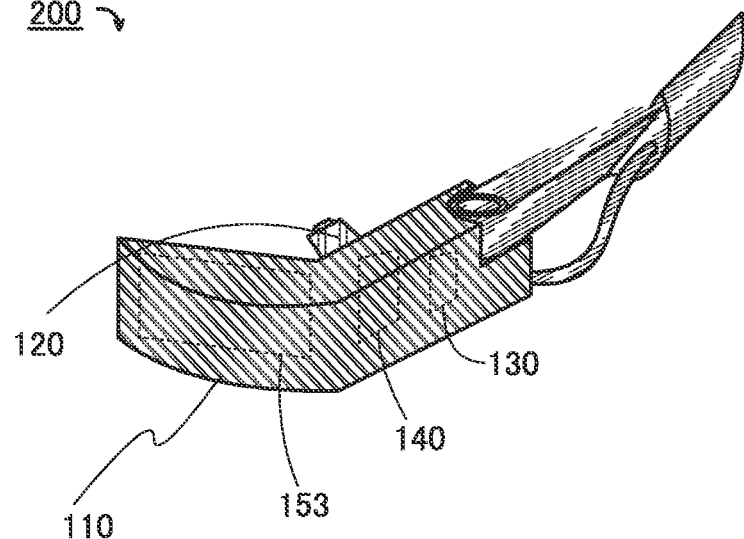
FIGS. 18A and 18B illustrate an electronic apparatus.
Figure 18B:
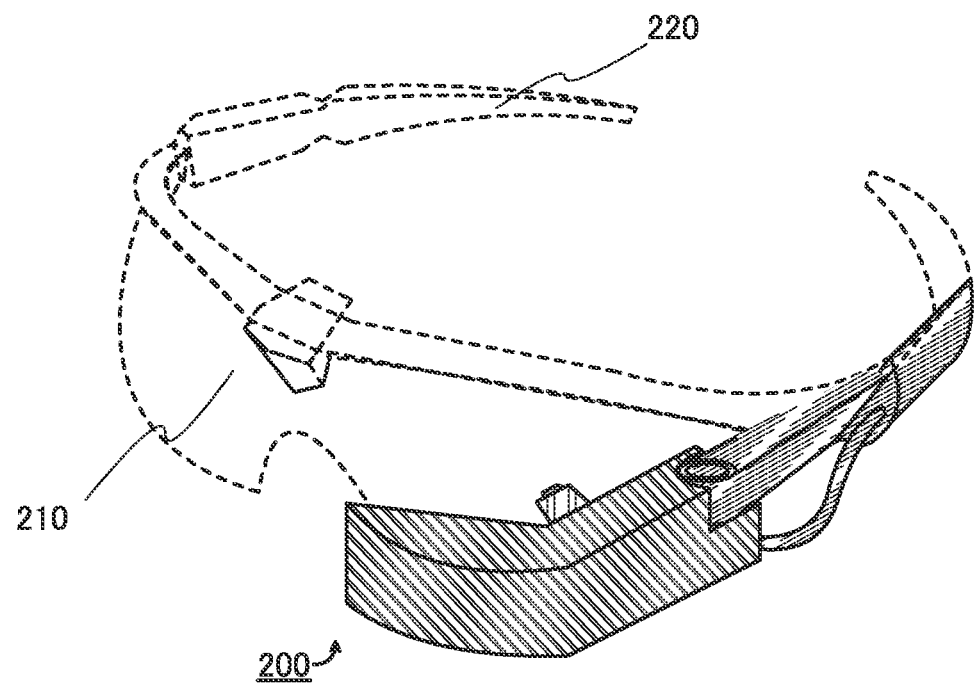

The electronic apparatus 200 illustrated in FIG. 18A includes the imaging device 120, the detection device 130, the arithmetic device 140, and a projection device 153. The electronic apparatus 200 illustrated in FIG. 18A can be fixed to a lens 210 and a temple 220 of glasses illustrated in FIG. 18B, whereby display can be seen.

Figure 19A:
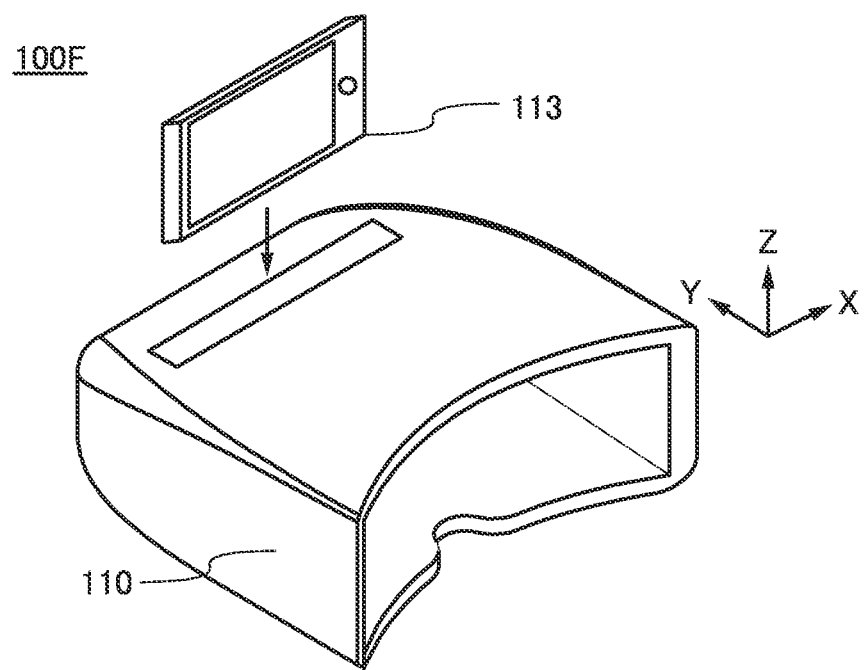
FIGS. 19A and 19B illustrate an electronic apparatus.
Figure 19B:
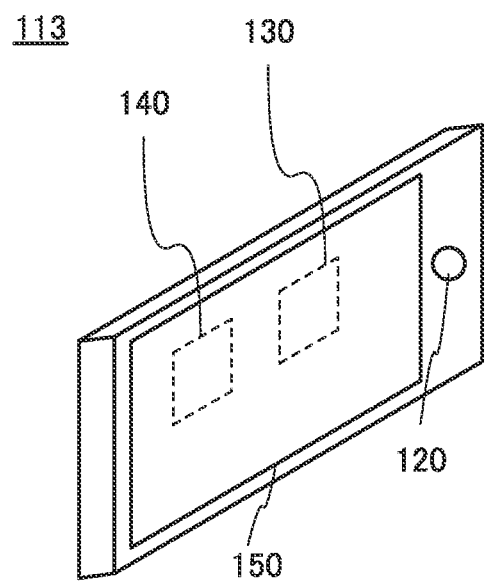

An electronic apparatus 100F illustrated in FIG. 19A has a structure where the housing 110 and an electronic apparatus 113 including a display portion are used in combination. The electronic apparatus 113 is an information terminal such as a smartphone. In a manner similar to the electronic apparatus 100 in FIG. 1, the electronic apparatus 113 illustrated in FIG. 19B includes the imaging device 120, the detection device 130, the arithmetic device 140, and the display device 150. The imaging device 120, the detection device 130, and/or the arithmetic device 140 included in the electronic apparatus 113 may be provided in the housing separately from the electronic apparatus 113 in advance, whereby display data, imaging data, and the like are transmitted and received with a communication unit or the like. Note that the detection device 130 is not necessarily incorporated as hardware and may be stored in a memory or the like as software or the like. In this case, the arithmetic device 140 can be used as the detection device 130.

Figure 20A:
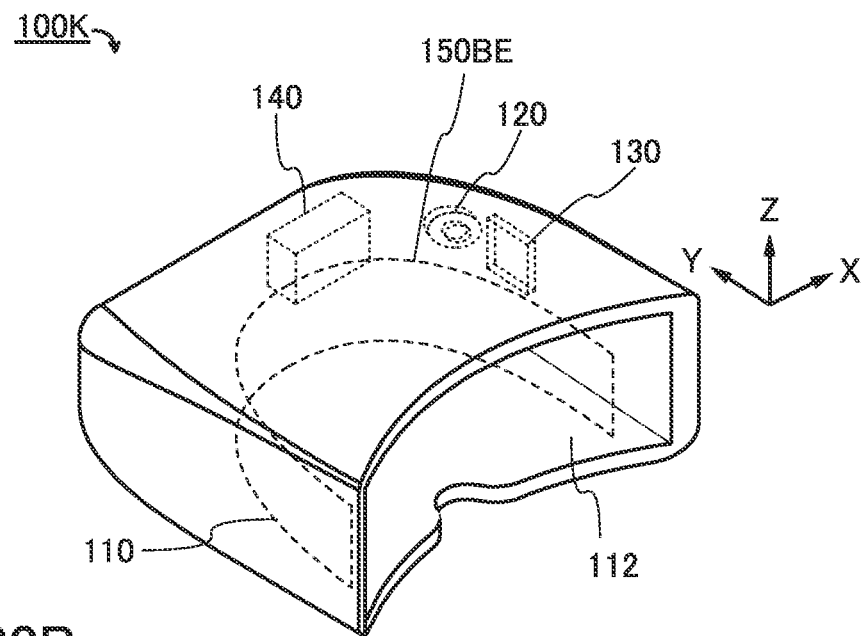
FIGS. 20A and 20B each illustrate an electronic apparatus.
Figure 20B:
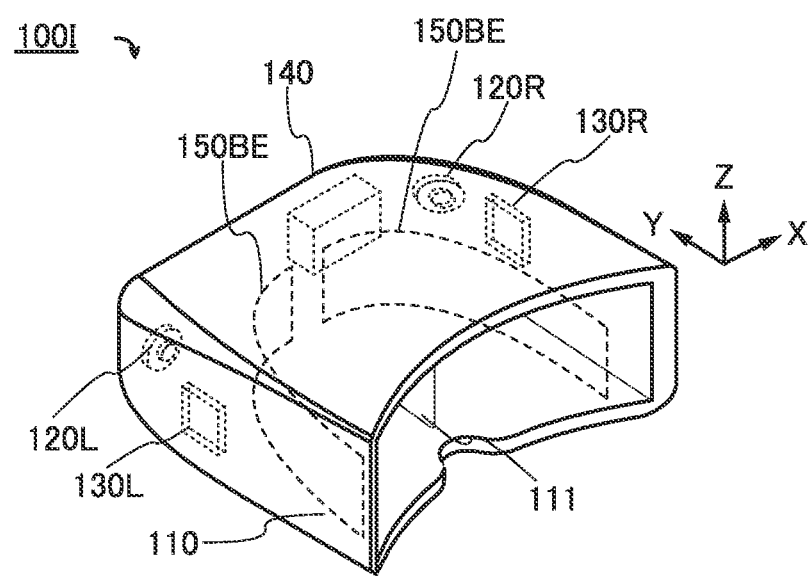

An electronic apparatus 100K illustrated in FIG. 20A is a modification example of the electronic apparatus 100 in FIG. 1 and includes a display device 150BE having a curved surface. An electronic apparatus 100I illustrated in FIG. 20B is a modification example of the electronic apparatus 100 in FIG. 2B and includes the display devices 150BE, which have curved surfaces, on the left and right sides. The display device 150BE having a curved surface can perform more realistic display.

Also in each of the structures illustrated in FIGS. 17A and 17B, FIGS. 18A and 18B, FIGS. 19A and 19B, and FIGS. 20A and 20B, as in a manner similar to that in FIG. 1, the display device 150 or the projection device 153 for seeing display is included in addition to the imaging device 120, the detection device 130, and the arithmetic device 140. With this structure, the change in inclination of the head is estimated in accordance with the movement of a sight line, and display data corresponding to the estimated change in inclination can be generated. Thus, the display data can be generated before a head actually moves, so that display corresponding to the inclination of the head can be performed in real time.

Embodiment 2

Figure 21A:
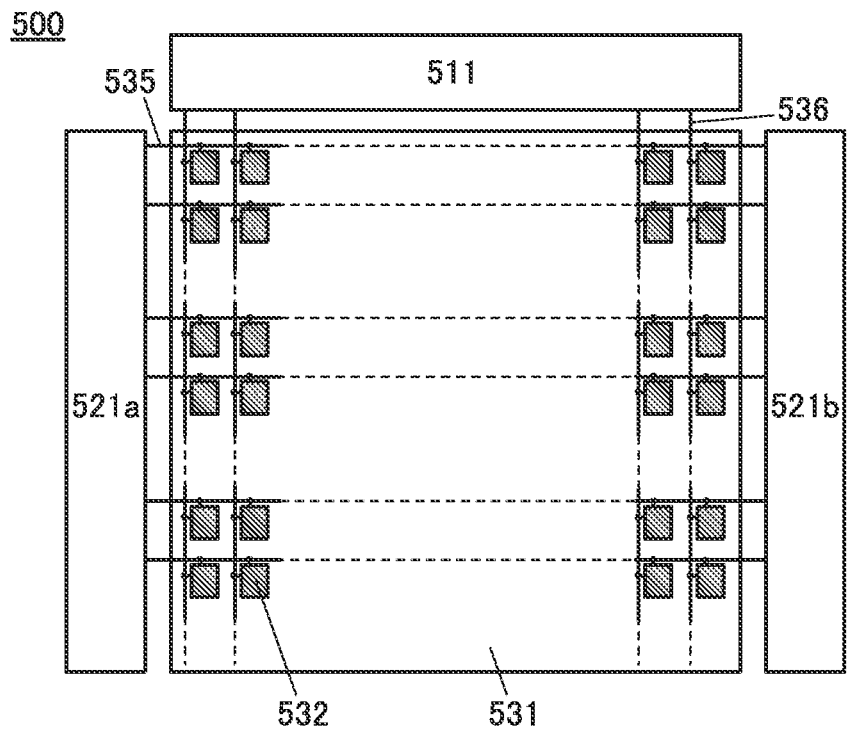
FIGS. 21A to 21C each illustrate an example of a display device.

In this embodiment, an example of the display device 150 will be described. FIG. 21A is a block diagram illustrating a structure example of a display device 500.

The display device 500 in FIG. 21A includes driver circuits 511, 521a, and 521b, and a display region 531. Note that the driver circuits 511, 521a, and 521b are collectively referred to as a driver circuit or a peripheral driver circuit in some cases.

The driver circuits 521a and 521b can function as, for example, scan line driver circuits. The driver circuit 511 can function as, for example, a signal line driver circuit. Note that one of the driver circuits 521a and 521b may be omitted. Alternatively, some sort of circuit facing the driver circuit 511 with the display region 531 provided therebetween may be provided.

The display device 500 illustrated as an example in FIG. 21A includes p wirings 535 which are arranged substantially parallel to each other and whose potentials are controlled by the driver circuit 521a and/or the driver circuit 521b, and q wirings 536 which are arranged substantially parallel to each other and whose potentials are controlled by the driver circuit 511. The display region 531 includes a plurality of pixels 532 arranged in a matrix. The pixel 532 includes a pixel circuit 534 and a display element.

When every three pixels 532 function as one pixel, full-color display can be provided. The three pixels 532 each control the transmittance, reflectance, amount of emitted light, or the like of red light, green light, or blue light. The light colors controlled by the three pixels 532 are not limited to the combination of red, green, and blue, and may be yellow, cyan, and magenta.

A pixel 532 that controls white light may be added to the pixels controlling red light, green light, and blue light so that the four pixels 532 will collectively serve as one pixel. The addition of the pixel 532 controlling white light can heighten the luminance of the display region. When the number of the pixels 532 functioning as one pixel is increased to use red, green, blue, yellow, cyan, and magenta in appropriate combination, the range of color reproduction can be widened.

Using the pixels arranged in a matrix of 1920×1080, the display device 500 can display an image with "full high definition" (also referred to as "2K resolution", "2K1K", "2K", and the like). Using the pixels arranged in a matrix of 3840×2160, the display device 500 can display an image with "ultra high definition" (also referred to as "4K resolution", "4K2K", "4K", and the like). Using the pixels arranged in a matrix of 7680×4320, the display device 500 can display an image with "super high definition" (also referred to as "8K resolution", "8K4K", "8K", and the like). Using a larger number of pixels, the display device 500 can display an image with 16K or 32K resolution.

A wiring 535_g on the g-th row (g is a natural number larger than or equal to 1 and smaller than or equal to p) is electrically connected to q pixels 532 on the g-th row among the plurality of pixels 532 arranged in p rows and q columns (p and q are each a natural number of 1 or more) in the display region 531. A wiring 536_h on the h-th column (h is a natural number larger than or equal to 1 and smaller than or equal to q) is electrically connected to p pixels 532 on the h-th column among the plurality of pixels 532 arranged in p rows and q columns.

[Display Element]

The display device 500 can employ various modes and include various display elements. Examples of the display element include a display medium whose contrast, luminance, reflectance, transmittance, or the like is changed by electrical or magnetic effect, such as an electroluminescence (EL) element (e.g., an EL element including organic and inorganic materials, an organic EL element, or an inorganic EL element), an LED (e.g., a white LED, a red LED, a green LED, or a blue LED), a transistor (a transistor that emits light depending on current), an electron emitter, a liquid crystal element, electronic ink, an electrophoretic element, a grating light valve (GLV), a display element using micro electro mechanical systems (MEMS), a digital micromirror device (DMD), a digital micro shutter (DMS), MIRASOL (registered trademark), an interferometric modulator display (IMOD) element, a MEMS shutter display element, an optical-interference-type MEMS display element, an electrowetting element, a piezoelectric ceramic display, or a display element using a carbon nanotube. Alternatively, quantum dots may be used as the display element.

Note that examples of display devices having EL elements include an EL display. Examples of display devices including electron emitters are a field emission display (FED) and an SED-type flat panel display (SED: surface-conduction electron-emitter display). Examples of display devices including quantum dots include a quantum dot display. Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). Examples of a display device including electronic ink, electronic liquid powder (registered trademark), or electrophoretic elements include electronic paper. For example, the display device may be a plasma display panel (PDP). The display device may be a retina scanning type projection device.

In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption.

Note that in the case of using an LED, graphene or graphite may be provided under an electrode or a nitride semiconductor of the LED. Graphene or graphite may be a multilayer film in which a plurality of layers are stacked. As described above, provision of graphene or graphite enables easy formation of a nitride semiconductor film thereover, such as an n-type GaN semiconductor layer including crystals. Furthermore, a p-type GaN semiconductor layer including crystals or the like can be provided thereover, and thus the LED can be formed. Note that an AlN layer may be provided between the n-type GaN semiconductor layer including crystals and graphene or graphite. The GaN semiconductor layers included in the LED may be formed by MOCVD. Note that when the graphene is provided, the GaN semiconductor layers included in the LED can also be formed by a sputtering method.

FIGS. 21B and 21C and FIGS. 22A and 22B illustrate circuit structure examples that can be used for the pixel 532.

[Example of Pixel Circuit for Light-Emitting Display Device]

Figure 21B:
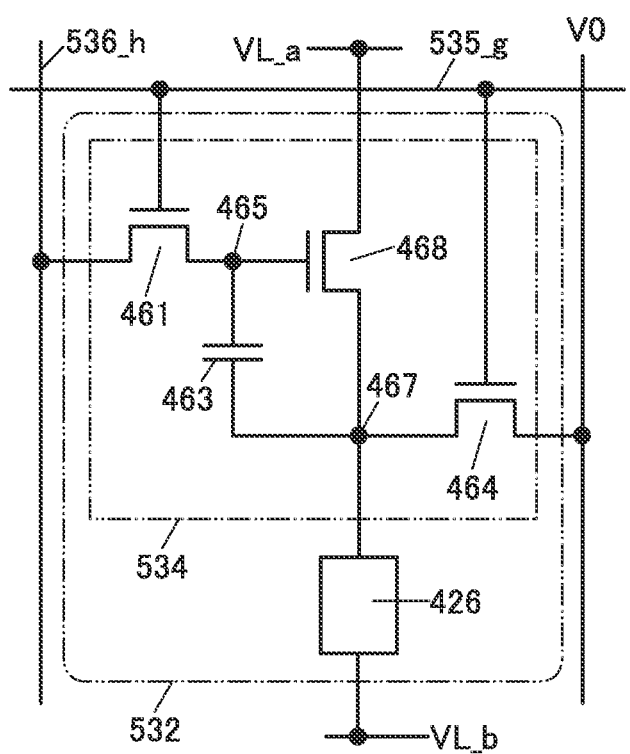

The pixel circuit 534 in FIG. 21B includes transistors 461, 468, and 464, and a capacitor 463. The pixel circuit 534 in FIG. 21B is electrically connected to a light-emitting element 426 that can function as a display element.

One of a source electrode and a drain electrode of the transistor 461 is electrically connected to the wiring 536_h. A gate electrode of the transistor 461 is electrically connected to the wiring 535_g. The wiring 536_h supplies a video signal.

The transistor 461 has a function of controlling writing of a video signal to a node 465.

One of a pair of electrodes of the capacitor 463 is electrically connected to the node 465, and the other is electrically connected to a node 467. The other of the source electrode and the drain electrode of the transistor 461 is electrically connected to the node 465.

The capacitor 463 has a function as a storage capacitor for storing data written to the node 465.

One of a source electrode and a drain electrode of the transistor 468 is electrically connected to a potential supply line VL_a, and the other of the source electrode and the drain electrode of the transistor 468 is electrically connected to the node 467. A gate electrode of the transistor 468 is electrically connected to the node 465.

One of a source electrode and a drain electrode of the transistor 464 is electrically connected to a potential supply line V0, and the other of the source electrode and the drain electrode of the transistor 464 is electrically connected to the node 467. A gate electrode of the transistor 464 is electrically connected to the wiring 535_g.

One of an anode and a cathode of the light-emitting element 426 is electrically connected to a potential supply line VL_b, and the other is electrically connected to the node 467.

As the light-emitting element 426, an organic electroluminescence element (also referred to as an organic EL element) or the like can be used, for example. Note that the light-emitting element 426 is not limited thereto and may be an inorganic EL element containing an inorganic material, for example.

A high power supply potential $V_{DD}$ is supplied to one of the potential supply line VL_a and the potential supply line VL_b, and a low power supply potential $V_{SS}$ is supplied to the other, for example.

In the display device 500 including the pixel circuits 534 in FIG. 21B, the pixels 532 are sequentially selected row by row by the driver circuit 521a and/or the driver circuit 521b, so that the transistors 461 and 464 are turned on and a video signal is written to the node 465.

The pixel 532 in which the data has been written to the node 465 is brought into a holding state when the transistors 461 and 464 are turned off. The amount of current flowing between the source electrode and the drain electrode of the transistor 468 is controlled in accordance with the potential of the data written to the node 465. The light-emitting element 426 emits light with a luminance corresponding to the amount of flowing current. This operation is sequentially performed row by row; thus, an image is displayed.

Figure 22A:
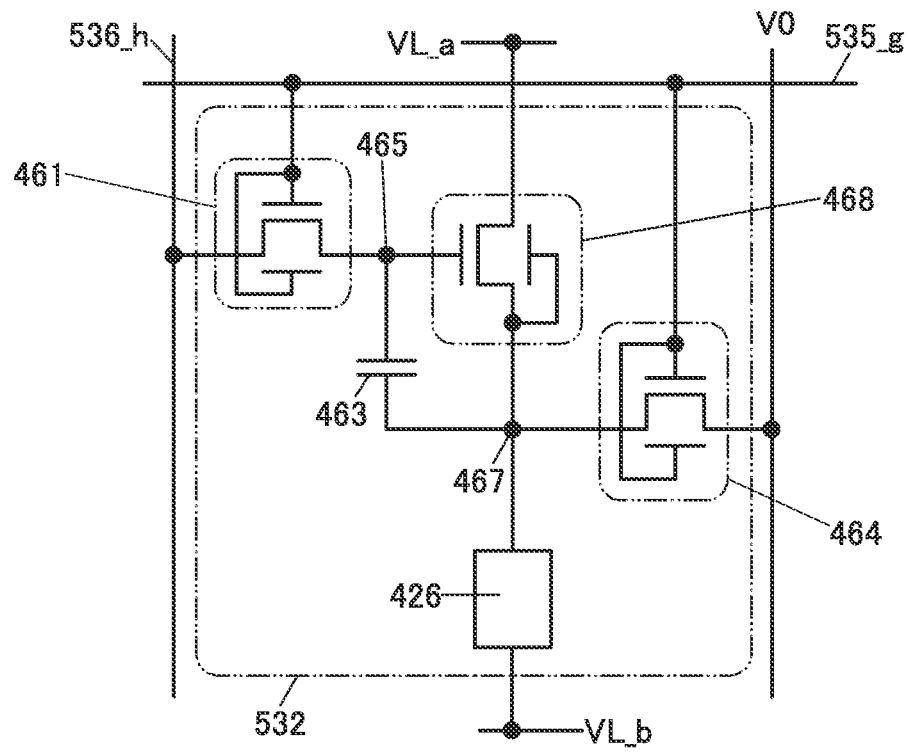
FIGS. 22A and 22B each illustrate an example of a display device.

As shown in FIG. 22A, the transistors 461, 464, and 468 may be transistors with back gates. In each of the transistors 461 and 464 in FIG. 22A, the gate is electrically connected to the back gate. Thus, the gate and back gate always have the same potential. The back gate of the transistor 468 is electrically connected to the node 467. Therefore, the back gate always has the same potential as the node 467.

[Example of Pixel Circuit for Liquid Crystal Display Device]

Figure 21C:
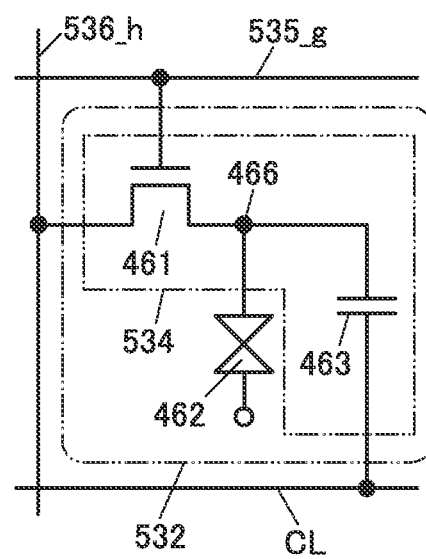

The pixel circuit 534 in FIG. 21C includes the transistor 461 and the capacitor 463. The pixel circuit 534 in FIG. 21C is electrically connected to a liquid crystal element 462 that can function as a display element.

The potential of one of a pair of electrodes of the liquid crystal element 462 is set as appropriate according to the specifications of the pixel circuit 534. For example, one of the pair of electrodes of the liquid crystal element 462 may be supplied with a common potential, or may have the same potential as a capacitor line CL. Further, the potential applied to one of the pair of electrodes of the liquid crystal element 462 may be different among the pixels 532. The other of the pair of electrodes of the liquid crystal element 462 is electrically connected to a node 466. The alignment state of the liquid crystal element 462 depends on data written to the node 466.

As a driving method of the display device including the liquid crystal element 462, any of the following modes can be used, for example: a TN (twisted nematic) mode, an STN (super-twisted nematic) mode, a VA (vertical alignment) mode, an ASM (axially symmetric aligned micro-cell) mode, an OCB (optically compensated birefringence) mode, an FLC (ferroelectric liquid crystal) mode, an AFLC (anti-ferroelectric liquid crystal) mode, an MVA (multi-domain vertical alignment) mode, a PVA (patterned vertical alignment) mode, an IPS mode, an FFS (fringe field switching) mode, a TBA (transverse bend alignment) mode, and the like. Other examples of the driving method of the display device include ECB (electrically controlled birefringence) mode, PDLC (polymer dispersed liquid crystal) mode, PNLC (polymer network liquid crystal) mode, and a guest-host mode. Note that one embodiment of the present invention is not limited thereto, and various liquid crystal elements and driving methods can be used.

In the case where a liquid crystal element is used as the display element, thermotropic liquid crystal, low-molecular liquid crystal, high-molecular liquid crystal, polymer-dispersed liquid crystal, ferroelectric liquid crystal, anti-ferroelectric liquid crystal, or the like can be used. Such a liquid crystal material exhibits a cholesteric phase, a smectic phase, a cubic phase, a chiral nematic phase, an isotropic phase, or the like depending on conditions.

Alternatively, a liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which 5 wt. % or more of a chiral material is mixed is preferably used for a liquid crystal layer in order to improve the temperature range. The liquid crystal composition that includes the liquid crystal exhibiting a blue phase and a chiral material has a short response time of 1 msec or less, and has optical isotropy, which makes the alignment process unnecessary and the viewing angle dependence small. An alignment film does not need to be provided and rubbing treatment is thus not necessary; accordingly, electrostatic discharge damage caused by the rubbing treatment can be prevented and defects and damage of the liquid crystal display device in the manufacturing process can be reduced. Thus, productivity of the liquid crystal display device can be improved.

Furthermore, it is possible to use a method called domain multiplication or multi-domain design, in which a pixel is divided into some regions (subpixels) and molecules are aligned in different directions in their respective regions.

The specific resistivity of the liquid crystal material is greater than or equal to $1\times10^9$ Ω·cm, preferably greater than or equal to $1\times10^{11}$ Ω·cm, still preferably greater than or equal to $1\times10^{12}$ Ω·cm. Note that the specific resistance in this specification is measured at 20° C.

In the pixel circuit 534 on the g-th row and the h-th column, one of the source electrode and the drain electrode of the transistor 461 is electrically connected to the wiring 536_h, and the other of the source electrode and the drain electrode of the transistor 461 is electrically connected to the node 466. The gate electrode of the transistor 461 is electrically connected to the wiring 535_g. The wiring 536_h supplies a video signal. The transistor 461 has a function of controlling writing of a video signal to the node 466.

One of a pair of electrodes of the capacitor 463 is electrically connected to a wiring to which a particular potential is supplied (hereinafter referred to as a capacitor line CL), and the other is electrically connected to the node 466. The potential of the capacitor line CL is set in accordance with the specifications of the pixel circuit 534 as appropriate. The capacitor 463 has a function as a storage capacitor for storing data written to the node 466.

For example, in the display device 500 including the pixel circuit 534 in FIG. 21C, the pixel circuits 534 are sequentially selected row by row by the driver circuit 521a and/or the driver circuit 521b, so that the transistors 461 are turned on and a video signal is written to the node 466.

The pixel circuit 534 in which the video signal has been written to the node 466 is brought into a holding state when the transistor 461 is turned off. This operation is sequentially performed row by row; thus, an image can be displayed on the display region 531.

Figure 22B:
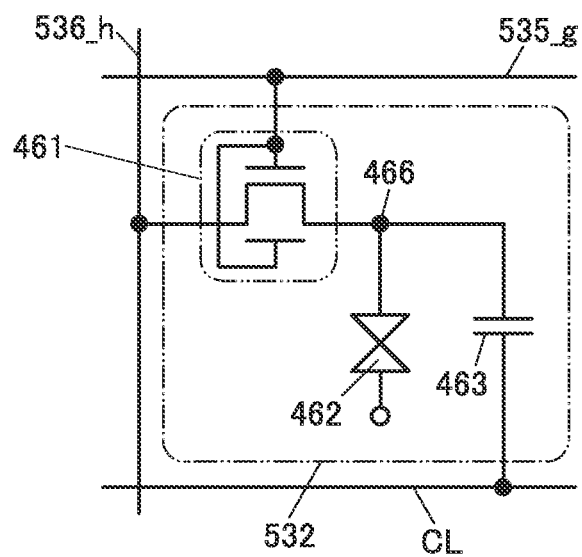

As shown in FIG. 22B, the transistor 461 may be a transistor with a back gate. In the transistor 461 in FIG. 22B, the gate is electrically connected to the back gate. Thus, the gate and back gate always have the same potential.

[Structure Example of Peripheral Circuit]

Figure 23A:
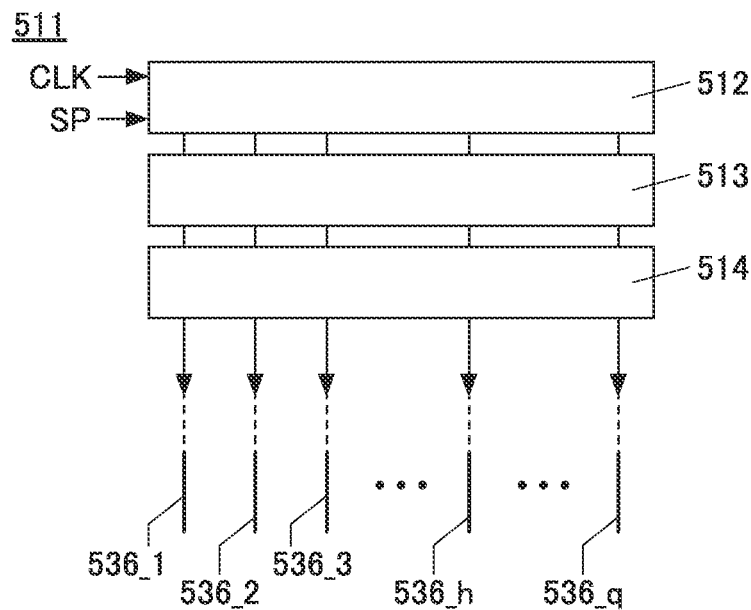
FIGS. 23A and 23B each illustrate a configuration example of a driver circuit.
Figure 23B:
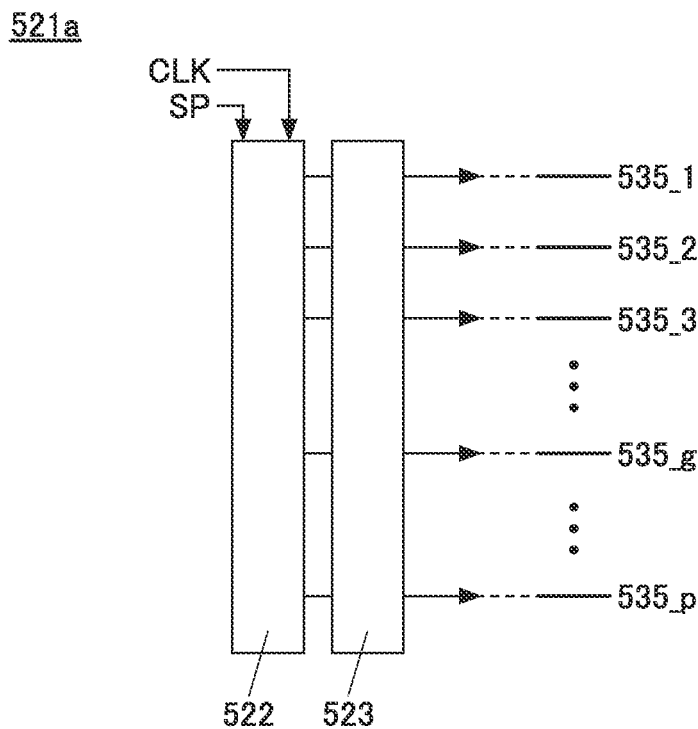

FIG. 23A shows a structure example of the driver circuit 511. The driver circuit 511 includes a shift register 512, a latch circuit 513, and a buffer 514. FIG. 23B shows a structure example of the driver circuit 521a. The driver circuit 521a includes a shift register 522 and a buffer 523. The structure of the driver circuit 521b can be similar to that of the driver circuit 521a.

The start pulse SP, the clock signal CLK, and the like are input to the shift register 512 and the shift register 522.

This embodiment can be implemented in appropriate combination with any of the structures described in the other embodiments and the like.

Embodiment 3

In this embodiment, a structure example of a transistor that can be used for the electronic apparatus described in the above embodiment will be described.

The electronic apparatus of one embodiment of the present invention can be fabricated by using a transistor with any of various structures, such as a bottom-gate transistor or a top-gate transistor. Therefore, a material for a semiconductor layer or the structure of a transistor can be easily changed depending on the existing production line.

[Bottom-Gate Transistor]

FIG. 24A1 is a cross-sectional view of a channel-protective transistor 410 that is a type of bottom-gate transistor. The transistor 410 includes an electrode 246 over a substrate 271 with an insulating layer 272 positioned therebetween. The transistor 410 includes a semiconductor layer 242 over the electrode 246 with an insulating layer 226 provided therebetween. The electrode 246 can function as a gate electrode. The insulating layer 226 can function as a gate insulating layer.

The transistor 410 includes an insulating layer 222 over a channel formation region in the semiconductor layer 242. The transistor 410 includes an electrode 244a and an electrode 244b which are partly in contact with the semiconductor layer 242 and over the insulating layer 226. Part of the electrode 244a and part of the electrode 244b are formed over the insulating layer 222.

The insulating layer 222 can function as a channel protective layer. With the insulating layer 222 provided over the channel formation region, the semiconductor layer 242 can be prevented from being exposed at the time of forming the electrodes 244a and 244b. Thus, the channel formation region in the semiconductor layer 242 can be prevented from being etched at the time of forming the electrodes 244a and 244b. According to one embodiment of the present invention, a transistor with favorable electrical characteristics can be provided.

The transistor 410 includes an insulating layer 228 over the electrode 244a, the electrode 244b, and the insulating layer 222 and further includes an insulating layer 229 over the insulating layer 228.

In the case where an oxide semiconductor is used for the semiconductor layer 242, a material that is capable of removing oxygen from part of the semiconductor layer 242 to generate oxygen vacancies is preferably used at least for regions of the electrodes 244a and 244b that are in contact with the semiconductor layer 242. The carrier concentration of the regions of the semiconductor layer 242 in which oxygen vacancies are generated is increased, so that the regions become n-type regions (n$^+$ layers). Accordingly, the regions can function as a source region and a drain region. Examples of the material which is capable of removing oxygen from the oxide semiconductor to generate oxygen vacancies include tungsten and titanium.

Formation of the source region and the drain region in the semiconductor layer 242 makes it possible to reduce contact resistance between the semiconductor layer 242 and each of the electrodes 244a and 244b. Accordingly, the electrical characteristics of the transistor, such as the field-effect mobility and the threshold voltage, can be favorable.

In the case where a semiconductor such as silicon is used for the semiconductor layer 242, a layer that functions as an n-type semiconductor or a p-type semiconductor is preferably provided between the semiconductor layer 242 and the electrode 244a and between the semiconductor layer 242 and the electrode 244b. The layer that functions as an n-type semiconductor or a p-type semiconductor can function as a source region or a drain region in a transistor.

The insulating layer 229 is preferably formed using a material that can prevent or reduce diffusion of impurities into the transistor from the outside. The formation of the insulating layer 229 may also be omitted.

When an oxide semiconductor is used for the semiconductor layer 242, heat treatment may be performed before and/or after the insulating layer 229 is formed. The heat treatment can fill oxygen vacancies in the semiconductor layer 242 by diffusing oxygen contained in the insulating layer 229 or other insulating layers into the semiconductor layer 242. Alternatively, the insulating layer 229 may be formed while the heat treatment is performed, so that oxygen vacancies in the semiconductor layer 242 can be filled.

A transistor 411 illustrated in FIG. 24A2 is different from the transistor 410 in that an electrode 223 that can function as a back gate is provided over the insulating layer 229. The electrode 223 can be formed using a material and a method similar to those of the electrode 246.

<Back Gate>

In general, the back gate is formed using a conductive layer. The gate and the back gate are located so that a channel formation region in a semiconductor layer is sandwiched therebetween. Thus, the back gate can function like the gate. The potential of the back gate may be the same as that of the gate or may be a GND potential or a given potential. By changing the potential of the back gate independently of the potential of the gate, the threshold voltage of the transistor can be changed.

The electrode 246 and the electrode 223 can each function as a gate. Thus, the insulating layers 226, 228, and 229 can each function as a gate insulating layer. The electrode 223 may also be provided between the insulating layers 228 and 229.

In the case where one of the electrode 246 and the electrode 223 is simply referred to as a "gate" or a "gate electrode", the other can be referred to as a "back gate" or a "back gate electrode". For example, in the transistor 411, in the case where the electrode 223 is referred to as a "gate electrode", the electrode 246 is referred to as a "back gate electrode". In the case where the electrode 223 is used as a "gate electrode", the transistor 411 can be regarded as a kind of top-gate transistor. Alternatively, one of the electrode 246 and the electrode 223 may be referred to as a "first gate" or a "first gate electrode", and the other may be referred to as a "second gate" or a "second gate electrode".

By providing the electrode 246 and the electrode 223 with the semiconductor layer 242 provided therebetween and setting the potentials of the electrode 246 and the electrode 223 to be the same, a region of the semiconductor layer 242 through which carriers flow is enlarged in the film thickness direction; thus, the number of transferred carriers is increased. As a result, the on-state current and the field-effect mobility of the transistor 411 are increased.

Therefore, the transistor 411 has large on-state current for the area occupied thereby. That is, the area occupied by the transistor 411 can be small for required on-state current. With one embodiment of the present invention, the area occupied by a transistor can be reduced. Therefore, an electronic apparatus including a highly integrated transistor can be provided.

Furthermore, the gate and the back gate are formed using conductive layers and thus each have a function of preventing an electric field generated outside the transistor from influencing the semiconductor layer in which the channel is formed (in particular, an electric field blocking function against static electricity and the like). When the back gate is formed larger than the semiconductor layer such that the semiconductor layer is covered with the back gate, the electric field blocking function can be enhanced.

Since the electrode 246 (gate) and the electrode 223 (back gate) each have a function of blocking an electric field from the outside, electric charge of charged particles and the like generated on the insulating layer 272 side or above the electrode 223 do not influence the channel formation region in the semiconductor layer 242. Thus, degradation by a stress test (e.g., a negative gate bias temperature (-GBT) stress test in which negative charges are applied to a gate) can be reduced. Furthermore, a change in gate voltage (rising voltage) at which on-state current starts flowing at different drain voltages can be reduced. Note that this effect is obtained when the electrodes 246 and 223 have the same potential or different potentials.

The GBT stress test is one kind of acceleration test and can evaluate, in a short time, a change by long-term use (i.e., a change over time) in characteristics of a transistor. In particular, the amount of a change in threshold voltage of the transistor between before and after the GBT stress test is an important indicator when examining the reliability of the transistor. As the change in the threshold voltage is smaller, the transistor has higher reliability.

By providing the electrodes 246 and 223 and setting the potentials of the electrodes 246 and 223 to be the same, the amount of the change in threshold voltage is reduced. Accordingly, a variation in electrical characteristics among a plurality of transistors is also reduced.

The transistor including the back gate has a smaller change in threshold voltage by a positive GBT stress test in which positive electric charge is applied to a gate than a transistor including no back gate.

When the back gate is formed using a light-blocking conductive film, light can be prevented from entering the semiconductor layer from the back gate side. Therefore, photodegradation of the semiconductor layer can be prevented and deterioration in electrical characteristics of the transistor, such as a shift of the threshold voltage, can be prevented.

With one embodiment of the present invention, a transistor with high reliability can be provided. Moreover, a highly reliable electronic apparatus including a pulse output circuit can be provided.

FIG. 24B1 is a cross-sectional view of a channel-protective transistor 420 that is a type of bottom-gate transistor. The transistor 420 has substantially the same structure as the transistor 410 but is different from the transistor 410 in that the insulating layer 222 having openings 231a and 231b covers the semiconductor layer 242. The openings 231a and 231b are formed by selectively removing part of the insulating layer 222 which overlaps with the semiconductor layer 242.

The semiconductor layer 242 is electrically connected to the electrode 244a in the opening 231a. The semiconductor layer 242 is electrically connected to the electrode 244b in the opening 231b. With the insulating layer 222, the semiconductor layer 242 can be prevented from being exposed at the time of forming the electrodes 244a and 244b. Thus, the semiconductor layer 242 can be prevented from being reduced in thickness at the time of forming the electrodes 244a and 244b. A region of the insulating layer 222 which overlaps with the channel formation region can function as a channel protective layer.

A transistor 421 illustrated in FIG. 24B2 is different from the transistor 420 in that the electrode 223 that can function as a back gate is provided over the insulating layer 229.

The distance between the electrodes 244a and 246 and the distance between the electrodes 244b and 246 in the transistors 420 and 421 are longer than those in the transistors 410 and 411. Thus, the parasitic capacitance generated between the electrodes 244a and 246 can be reduced. Furthermore, the parasitic capacitance generated between the electrodes 244b and 246 can be reduced. According to one embodiment of the present invention, a transistor with favorable electrical characteristics can be provided.

A transistor 425 illustrated in FIG. 24C1 is a channel-etched transistor that is a type of bottom-gate transistor. In the transistor 425, the insulating layer 222 is not provided and the electrodes 244a and 244b are formed to contact with the semiconductor layer 242. Thus, part of the semiconductor layer 242 that is exposed when the electrodes 244a and 244b are formed is etched in some cases. However, since the insulating layer 222 is not provided, the productivity of the transistor can be increased.

A transistor 426 illustrated in FIG. 24C2 is different from the transistor 425 in that the electrode 223 which can function as a back gate is provided over the insulating layer 229.

[Top-Gate Transistor]

FIG. 25A1 is a cross-sectional view of a transistor 430 that is a type of top-gate transistor. The transistor 430 includes the semiconductor layer 242 over the substrate 271 with the insulating layer 272 therebetween, the electrodes 244a and 244b that are over the semiconductor layer 242 and the insulating layer 272 and in contact with part of the semiconductor layer 242, the insulating layer 226 over the semiconductor layer 242 and the electrodes 244a and 244b, and the electrode 246 over the insulating layer 226.

Since the electrode 246 overlaps with neither the electrode 244a nor the electrode 244b in the transistor 430, the parasitic capacitance generated between the electrodes 246 and 244a and the parasitic capacitance generated between the electrodes 246 and 244b can be reduced. After the formation of the electrode 246, an impurity 255 is introduced into the semiconductor layer 242 using the electrode 246 as a mask, so that an impurity region can be formed in the semiconductor layer 242 in a self-aligned manner (see FIG. 25A3). According to one embodiment of the present invention, a transistor with favorable electrical characteristics can be provided.

The introduction of the impurity 255 can be performed with an ion implantation apparatus, an ion doping apparatus, or a plasma treatment apparatus.

As the impurity 255, for example, at least one element of a Group 13 element, a Group 15 element, and the like can be used. In the case where an oxide semiconductor is used for the semiconductor layer 242, it is possible to use at least one kind of element of a rare gas, hydrogen, and nitrogen as the impurity 255.

A transistor 431 illustrated in FIG. 25A2 is different from the transistor 430 in that the electrode 223 and the insulating layer 227 are included. The transistor 431 includes the electrode 223 formed over the insulating layer 272 and the insulating layer 227 formed over the electrode 223. The electrode 223 can function as a back gate. Thus, the insulating layer 227 can function as a gate insulating layer. The insulating layer 227 can be formed using a material and a method similar to those of the insulating layer 226.

The transistor 431 as well as the transistor 411 has large on-state current for the area occupied thereby. That is, the area occupied by the transistor 431 can be small for required on-state current. With one embodiment of the present invention, the area occupied by a transistor can be reduced. Therefore, according to one embodiment of the present invention, an electronic apparatus including a highly integrated transistor can be provided.

A transistor 440 shown in FIG. 25B1 as an example is a type of top-gate transistor. The transistor 440 is different from the transistor 430 in that the semiconductor layer 242 is formed after the formation of the electrodes 244a and 244b. A transistor 441 illustrated in FIG. 25B2 is different from the transistor 440 in that the electrode 223 and the insulating layer 227 are included. Thus, in the transistors 440 and 441, part of the semiconductor layer 242 is formed over the electrode 244a and another part of the semiconductor layer 242 is formed over the electrode 244b.

The transistor 441 as well as the transistor 411 has a high on-state current for its area. That is, the area occupied by the transistor 441 can be small for required on-state current. With one embodiment of the present invention, the area occupied by a transistor can be reduced. Therefore, an electronic apparatus including a highly integrated transistor can be provided.

A transistor 442 illustrated in FIG. 26A1 as an example is a type of top-gate transistor. The transistor 442 has the electrodes 244a and 244b over the insulating layer 229. The electrodes 244a and 244b are electrically connected to the semiconductor layer 242 through openings formed in the insulating layers 228 and 229.

Part of the insulating layer 226 that does not overlap with the electrode 246 is removed. The insulating layer 226 included in the transistor 442 is partly extended across the ends of the electrode 246.

The impurity 255 is added to the semiconductor layer 242 using the electrode 246 and the insulating layer 226 as masks, so that an impurity region can be formed in the semiconductor layer 242 in a self-aligned manner (see FIG. 26A3).

At this time, the impurity 255 is not added to the semiconductor layer 242 in a region overlapping with the electrode 246, and the impurity 255 is added to the semiconductor layer 242 in a region that does not overlap with the electrode 246. The semiconductor layer 242 in a region into which the impurity 255 is introduced through the insulating layer 226 has a lower impurity concentration than the semiconductor layer 242 in a region into which the impurity 255 is introduced without through the insulating layer 226.

Thus, a lightly doped drain (LDD) region is formed in the semiconductor layer 242 in a region adjacent to the electrode 246 when seen from the above.

A transistor 443 illustrated in FIG. 26A2 is different from the transistor 442 in that the transistor 443 includes the electrode 223 under the semiconductor layer 242. The electrode 223 and the semiconductor layer 242 overlap with each other with the insulating layer 272 positioned therebetween. The electrode 223 can function as a back gate electrode.

As in a transistor 444 illustrated in FIG. 26B1 and a transistor 445 illustrated in FIG. 26B2, the insulating layer 226 in a region that does not overlap with the electrode 246 may be wholly removed. Alternatively, as in a transistor 446 illustrated in FIG. 26C1 and a transistor 447 illustrated in FIG. 26C2, the insulating layer 226 except for the openings may be left without being removed.

In the transistors 444 to 447, after the formation of the electrode 246, the impurity 255 is added to the semiconductor layer 242 using the electrode 246 as a mask, so that an impurity region can be formed in the semiconductor layer 242 in a self-aligned manner.

[S-Channel Transistor]

FIGS. 27A to 27C illustrate an example of a structure of a transistor including an oxide semiconductor for the semiconductor layer 242. FIG. 27A is a top view of a transistor 451. FIG. 27B is a cross-sectional view (in the channel length direction) of a portion along the dashed-dotted line L1-L2 in FIG. 27A. FIG. 27C is a cross-sectional view (in the channel width direction) of a portion along the dashed-dotted line W1-W2 in FIG. 27A.

The transistor 451 includes the semiconductor layer 242, the insulating layer 226, the insulating layer 272, an insulating layer 282, an insulating layer 274, an electrode 224, an electrode 243, the electrode 244a, and the electrode 244b. The electrode 243 can function as a gate, and the electrode 224 can function as a back gate. The insulating layer 226, the insulating layer 272, the insulating layer 282, and the insulating layer 274 each can function as a gate insulating layer. The electrode 244a can function as one of a source electrode and a drain electrode. The electrode 244b can function as the other of the source electrode and the drain electrode.

An insulating layer 275 is provided over the substrate 271, and the electrode 224 and an insulating layer 273 are provided over the insulating layer 275. Over the electrode 224 and the insulating layer 273, the insulating layer 274 is provided. Over the insulating layer 274, the insulating layer 282 is provided, and over the insulating layer 282, the insulating layer 272 is provided.

A semiconductor layer 242a is provided over a projection formed in the insulating layer 272, and a semiconductor layer 242b is provided over the semiconductor layer 242a. The electrode 244a and the electrode 244b are provided over the semiconductor layer 242b. A region in the semiconductor layer 242b which overlaps with the electrode 244a can function as one of a source and a drain of the transistor 451. A region in the semiconductor layer 242b which overlaps with the electrode 244b can function as the other of the source and the drain of the transistor 451.

In addition, a semiconductor layer 242c is provided to be in contact with part of the semiconductor layer 242b. The insulating layer 226 is provided over the semiconductor layer 242c, and the electrode 243 is provided over the insulating layer 226.

The transistor 451 has a structure in which a top surface and side surfaces of the semiconductor layer 242b and side surfaces of the semiconductor layer 242a are covered with the semiconductor layer 242c in the portion along W1-W2. With the semiconductor layer 242b provided on the projection of the insulating layer 272, the side surface of the semiconductor layer 242b can be covered with the electrode 243. Thus, the transistor 451 has a structure in which the semiconductor layer 242b can be electrically surrounded by electric field of the electrode 243. In this way, the structure of a transistor in which the semiconductor layer in which the channel is formed is electrically surrounded by the electric field of the conductive film is called a surrounded channel (s-channel) structure. A transistor having an s-channel structure is referred to as an s-channel transistor.

In the s-channel structure, a channel can be formed in the whole (bulk) of the semiconductor layer 242b. In the s-channel structure, the drain current of the transistor can be increased, so that a larger amount of on-state current can be obtained. Furthermore, the entire channel formation region of the semiconductor layer 242b can be depleted by the electric field of the electrode 243. Accordingly, off-state current of the transistor with an s-channel structure can be further reduced.

When the projection of the insulating layer 272 is increased in height, and the channel width is shortened, the effects of the s-channel structure for increasing the on-state current, reducing the off-state current, and the like can be enhanced. Part of the semiconductor layer 242a exposed in the formation of the semiconductor layer 242b may be removed. In this case, the side surfaces of the semiconductor layer 242a and the semiconductor layer 242b may be aligned to each other.

The insulating layer 228 is provided over the transistor 451 and the insulating layer 229 is provided over the insulating layer 228. An electrode 225a, an electrode 225b, an electrode 225c are provided over the insulating layer 229. The electrode 225a is electrically connected to the electrode 244a via a contact plug through an opening in the insulating layer 229 and the insulating layer 228. The electrode 225b is electrically connected to the electrode 244b via a contact plug through an opening in the insulating layer 229 and the insulating layer 228. The electrode 225c is electrically connected to the electrode 243 via a contact plug through an opening in the insulating layer 229 and the insulating layer 228.

Note that when the insulating layer 282 is formed using hafnium oxide, aluminum oxide, tantalum oxide, aluminum silicate, or the like, the insulating layer 282 can function as a charge trap layer. The threshold voltage of the transistor can be changed by injecting electrons into the insulating layer 282. For example, the injection of electrons into the insulating layer 282 can be performed with use of the tunnel effect. By applying a positive voltage to the electrode 224, tunnel electrons can be injected into the insulating layer 282.

[Energy Band Structure (1) of Semiconductor Layer 242]

Figure 35A:
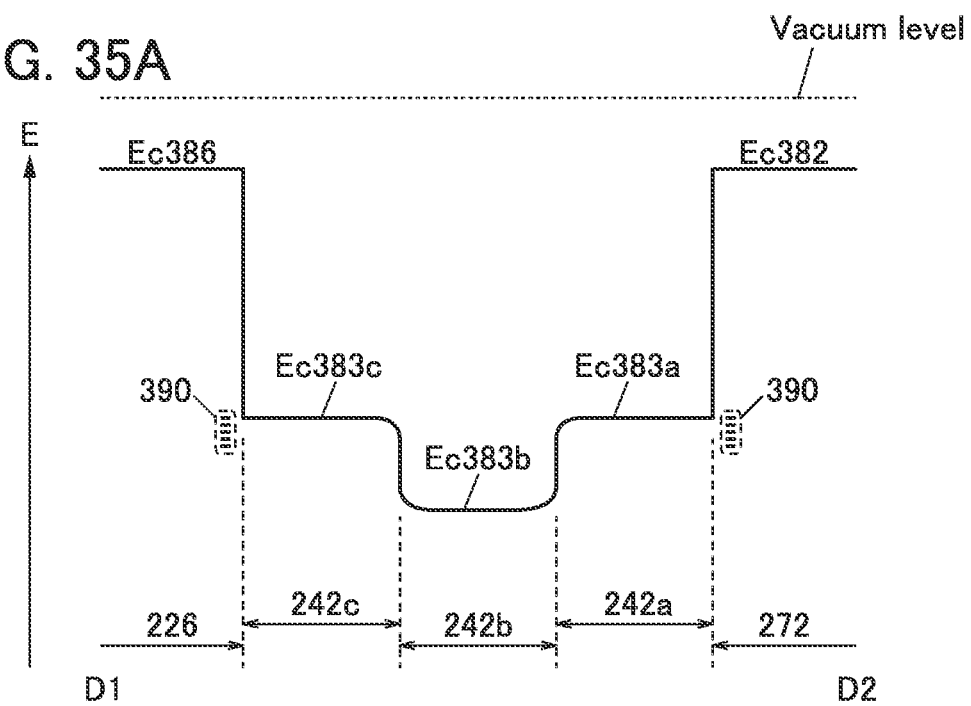
FIGS. 35A and 35B each show an energy band structure.

The function and effect of the semiconductor layer 242 that is a stacked layer including the semiconductor layers 242a, 242b, and 242c are described with an energy band structure diagrams shown in FIG. 35A. FIG. 35A illustrates the energy band structure of a portion along dashed-dotted line D1-D2 in FIG. 27B. In other words, FIG. 35A illustrates the energy band structure of a channel formation region of the transistor 451.

In FIG. 35A, Ec382, Ec383a, Ec383b, Ec383c, and Ec386 indicate the energy of the conduction band minimum of the insulating layer 272, that of the semiconductor layer 242a, that of the semiconductor layer 242b, that of the semiconductor layer 242c, and that of the insulating layer 226, respectively.

Here, an electron affinity corresponds to a value obtained by subtracting a band gap from a difference in energy between the vacuum level and the valence band maximum (the difference is also referred to as "ionization potential"). Note that the band gap can be measured using a spectroscopic ellipsometer (UT-300 manufactured by HORIBA JOBIN YVON). The energy difference between the vacuum level and the valence band maximum can be measured using an ultraviolet photoelectron spectroscopy (UPS) device (VersaProbe manufactured by ULVAC-PHI, Inc.).

In the case of an In—Ga—Zn oxide formed using a target whose atomic ratio is In:Ga:Zn=1:3:2, the band gap is about 3.5 eV, and the electron affinity is about 4.5 eV.

In the case of an In—Ga—Zn oxide formed using a target whose atomic ratio is In:Ga:Zn=1:3:4, the band gap is about 3.4 eV, and the electron affinity is about 4.5 eV. In the case of an In—Ga—Zn oxide formed using a target whose atomic ratio is In:Ga:Zn=1:3:6, the band gap is about 3.3 eV, and the electron affinity is about 4.5 eV. In the case of an In—Ga—Zn oxide formed using a target whose atomic ratio is In:Ga:Zn=1:6:2, the band gap is about 3.9 eV, and the electron affinity is about 4.3 eV. In the case of an In—Ga—Zn oxide formed using a target whose atomic ratio is In:Ga:Zn=1:6:8, the band gap is about 3.5 eV, and the electron affinity is about 4.4 eV. In the case of an In—Ga—Zn oxide formed using a target whose atomic ratio is In:Ga:Zn=1:6:10, the band gap is about 3.5 eV, and the electron affinity is about 4.5 eV. In the case of an In—Ga—Zn oxide formed using a target whose atomic ratio is In:Ga:Zn=1:1:1, the band gap is about 3.2 eV, and the electron affinity is about 4.7 eV. In the case of an In—Ga—Zn oxide formed using a target whose atomic ratio is In:Ga:Zn=3:1:2, the band gap is about 2.8 eV, and the electron affinity is about 5.0 eV.

Since the insulating layer 272 and the insulating layer 226 are insulators, Ec382 and Ec386 are closer to the vacuum level (have a smaller electron affinity) than Ec383a, Ec383b, and Ec383c.

Further, Ec383a is closer to the vacuum level than Ec383b is. Specifically, Ec383a is preferably located closer to the vacuum level than Ec383b by greater than or equal to 0.07 eV and less than or equal to 1.3 eV, further preferably greater than or equal to 0.1 eV and less than or equal to 0.7 eV, still further preferably greater than or equal to 0.15 eV and less than or equal to 0.4 eV.

Further, Ec383c is closer to the vacuum level than Ec383b is. Specifically, Ec383c is preferably located closer to the vacuum level than Ec383b by greater than or equal to 0.07 eV and less than or equal to 1.3 eV, further preferably greater than or equal to 0.1 eV and less than or equal to 0.7 eV, still further preferably greater than or equal to 0.15 eV and less than or equal to 0.4 eV.

Here, a mixed region of the semiconductor layer 242a and the semiconductor layer 242b exists between the semiconductor layer 242a and the semiconductor layer 242b in some cases. In addition, a mixed region of the semiconductor layer 242b and the semiconductor layer 242c exists between the semiconductor layer 242b and the semiconductor layer 242c in some cases. The mixed region has a low density of interface states. For that reason, the stack including the semiconductor layers 242a, 242b, and 242c has a band structure where energy at each interface and in the vicinity of the interface is changed continuously (continuous junction).

In this state, electrons move mainly in the semiconductor layer 242b, not in the semiconductor layers 242a and 242c. Thus, when the interface state density at the interface between the semiconductor layer 242a and the semiconductor layer 242b and the interface state density at the interface between the semiconductor layer 242b and the semiconductor layer 242c are decreased, electron movement in the semiconductor layer 242b is less likely to be inhibited and the on-state current of the transistor 451 can be increased.

Note that although trap states 390 due to impurities or defects might be formed in the vicinity of the interface between the semiconductor layer 242a and the insulating layer 272 and in the vicinity of the interface between the semiconductor layer 242c and the insulating layer 226, the semiconductor layer 242b can be apart from the trap states owing to the existence of the semiconductor layer 242a and the semiconductor layer 242c.

In the case where the transistor 451 has an s-channel structure, a channel is formed in the whole of the semiconductor layer 242b seen in the portion along W1-W2. Therefore, as the thickness of the semiconductor layer 242b is increased, the size of the channel region is increased. In other words, as the thickness of the semiconductor layer 242b is increased, the on-state current of the transistor 451 can be increased. For example, the semiconductor layer 242b has a region with a thickness greater than or equal to 10 nm, preferably greater than or equal to 40 nm, further preferably greater than or equal to 60 nm, still further preferably greater than or equal to 100 nm. Note that the semiconductor layer 242b has a region with a thickness of, for example, less than or equal to 300 nm, preferably less than or equal to 200 nm, or further preferably less than or equal to 150 nm because the productivity of the electronic apparatus including the transistor 451 might be decreased. In some cases, when the channel formation region is reduced in size, the electrical characteristics of the transistor with a smaller thickness of the semiconductor layer 242b are higher than those of the transistor with a larger thickness of the semiconductor layer 242b. Therefore, the semiconductor layer 242b may have a thickness less than 10 nm.

Moreover, the thickness of the semiconductor layer 242c is preferably as small as possible to increase the on-state current of the transistor 451. For example, the semiconductor layer 242c may have a region with a thickness less than 10 nm, preferably less than or equal to 5 nm, and further preferably less than or equal to 3 nm. Meanwhile, the semiconductor layer 242c has a function of blocking entry of elements other than oxygen (such as hydrogen and silicon) included in the adjacent insulator into the semiconductor layer 242b where a channel is formed. For this reason, it is preferable that the semiconductor layer 242c have a certain thickness. The semiconductor layer 242c may have a region with a thickness greater than or equal to 0.3 nm, preferably greater than or equal to 1 nm, further preferably greater than or equal to 2 nm, for example.

To improve the reliability, preferably, the thickness of the semiconductor layer 242a is large and the thickness of the semiconductor layer 242c is small. For example, the semiconductor layer 242a may have a region with a thickness greater than or equal to 10 nm, preferably greater than or equal to 20 nm, further preferably greater than or equal to 40 nm, still further preferably greater than or equal to 60 nm. When the thickness of the semiconductor layer 242a is made large, a distance from an interface between the adjacent insulator and the semiconductor layer 242a to the semiconductor layer 242b in which a channel is formed can be large. Since the productivity of the electronic apparatus including the transistor 451 might be decreased, the semiconductor layer 242a has a region with a thickness, for example, less than or equal to 200 nm, preferably less than or equal to 120 nm, or further preferably less than or equal to 80 nm.

Note that silicon contained in the oxide semiconductor might serve as a carrier trap or a carrier generation source. Therefore, the silicon concentration in the semiconductor layer 242b is preferably as low as possible. For example, a region with the silicon concentration lower than $1\times10^{19}$ atoms/cm$^3$, preferably lower than $5\times10^{18}$ atoms/cm$^3$, or further preferably lower than $2\times10^{18}$ atoms/cm$^3$ which is measured by secondary ion mass spectrometry (SIMS) is provided between the semiconductor layer 242b and the semiconductor layer 242a. A region with the silicon concentration of lower than $1\times10^{19}$ atoms/cm$^3$, preferably lower than $5\times10^{18}$ atoms/cm$^3$, further preferably lower than $2\times10^{18}$ atoms/cm$^3$ which is measured by SIMS is provided between the semiconductor layer 242b and the semiconductor layer 242c.

It is preferable to reduce the concentrations of hydrogen in the semiconductor layer 242a and the semiconductor layer 242c in order to reduce the concentration of hydrogen in the semiconductor layer 242b. The semiconductor layer 242a and the semiconductor layer 242c each have a region in which the concentration of hydrogen measured by SIMS is lower than or equal to $2\times10^{20}$ atoms/cm$^3$, preferably lower than or equal to $5\times10^{19}$ atoms/cm$^3$, further preferably lower than or equal to $1\times10^{19}$ atoms/cm$^3$, still further preferably lower than or equal to $5\times10^{18}$ atoms/cm$^3$. It is preferable to reduce the concentration of nitrogen in the semiconductor layer 242a and the semiconductor layer 242c in order to reduce the concentration of nitrogen in the semiconductor layer 242b. The semiconductor layer 242a and the semiconductor layer 242c each have a region in which the concentration of nitrogen measured by SIMS is lower than $5\times10^{19}$ atoms/cm$^3$, preferably less than or equal to $5\times10^{18}$ atoms/cm$^3$, further preferably less than or equal to $1\times10^{18}$ atoms/cm$^3$, still further preferably less than or equal to $5\times10^{17}$ atoms/cm$^3$.

Note that when copper enters the oxide semiconductor, an electron trap might be generated. The electron trap might shift the threshold voltage of the transistor in the positive direction. Therefore, the concentration of copper on the surface of or in the semiconductor layer 242b is preferably as low as possible. For example, the semiconductor layer 242b preferably has a region in which the concentration of copper is lower than or equal to $1\times10^{19}$ atoms/cm$^3$, lower than or equal to $5\times10^{18}$ atoms/cm$^3$, or lower than or equal to $1\times10^{18}$ atoms/cm$^3$.

The above three-layer structure is an example. For example, a two-layer structure without either one of the semiconductor layer 242a and the semiconductor layer 242c may be employed. A four-layer structure in which any one of the semiconductors described as examples of the semiconductor layer 242a, the semiconductor layer 242b, and the semiconductor layer 242c is provided below or over the semiconductor layer 242a or below or over the semiconductor layer 242c may be employed. An g-layer structure (g is an integer of 5 or more) may be included in which any one of the semiconductors described as examples of the semiconductor layers 242a, 242b, and 242c is provided at two or more of the following positions: over the semiconductor layer 242a, below the semiconductor layer 242a, over the semiconductor layer 242c, and below the semiconductor layer 242c may be employed.

In particular, in the transistor 451 described in this embodiment, an upper surface and a side surface of the semiconductor layer 242b are in contact with the semiconductor layer 242c, and a bottom surface of the semiconductor layer 242b is in contact with the semiconductor layer 242a. In this manner, the semiconductor layer 242b is surrounded by the semiconductor layer 242a and the semiconductor layer 242c, whereby the influence of the trap state can be further reduced.

Each of the band gaps of the semiconductor layer 242a and the semiconductor layer 242c is preferably larger than that of the semiconductor layer 242b.

With one embodiment of the present invention, a transistor with a small variation in electrical characteristics can be provided. Accordingly, an electronic apparatus including a transistor with a small variation in electrical characteristics can be provided. With one embodiment of the present invention, a transistor with high reliability can be provided. Therefore, an electronic apparatus including a transistor with high reliability can be provided.

An oxide semiconductor has a band gap of 2 eV or more; therefore, a transistor including an oxide semiconductor in a semiconductor layer in which a channel is formed (also referred to as an "OS transistor") has an extremely small off-state current. Specifically, the off-state current per micrometer in channel width at room temperature (25° C.) and at a source-drain voltage of 3.5 V can be lower than $1\times10^{-20}$ A, lower than $1\times10^{-22}$ A, or lower than $1\times10^{-24}$ A. That is, the on/off ratio of the transistor can be greater than or equal to 20 digits and less than or equal to 150 digits. An OS transistor has high withstand voltage between its source and drain. With use of the OS transistor, an electronic apparatus including a transistor with high output voltage and high withstand voltage can be achieved.

With one embodiment of the present invention, a transistor with small power consumption can be provided. Accordingly, an electronic apparatus including a transistor with small power consumption can be provided.

The electrode 224 that can function as a back gate is not necessary provided, depending on the purpose. FIG. 28A is a top view of a transistor 451a. FIG. 28B is a cross-sectional view of a portion indicated by the dashed-dotted line L1-L2 in FIG. 28A. FIG. 28C is a cross-sectional view of a portion indicated by the dashed-dotted line W1-W2 in FIG. 28A. The transistor 451a has a structure in which the electrode 224, the insulating layer 273, the insulating layer 274, and the insulating layer 282 are removed from the transistor 451. The productivity of transistor can be improved by omission of the electrode and insulating layer. Thus, the productivity of the electronic apparatus can be improved.

Figure 29C:
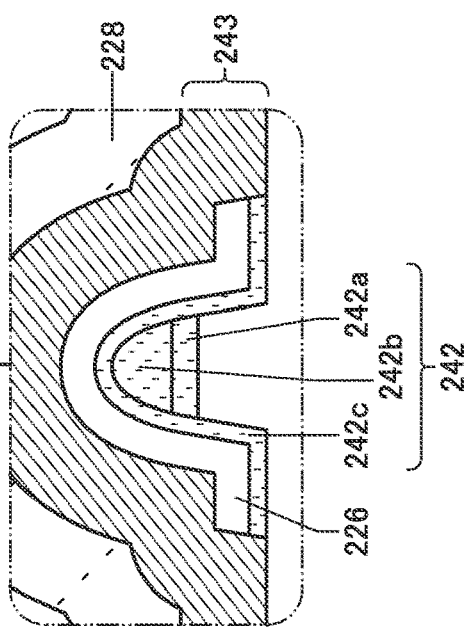
FIGS. 29A to 29C illustrate an example of a transistor.
Figure 29A:
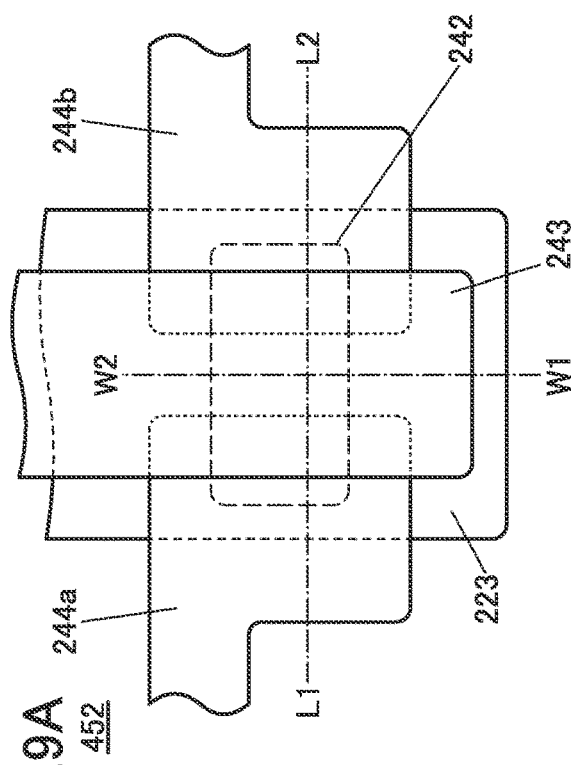
Figure 29B:
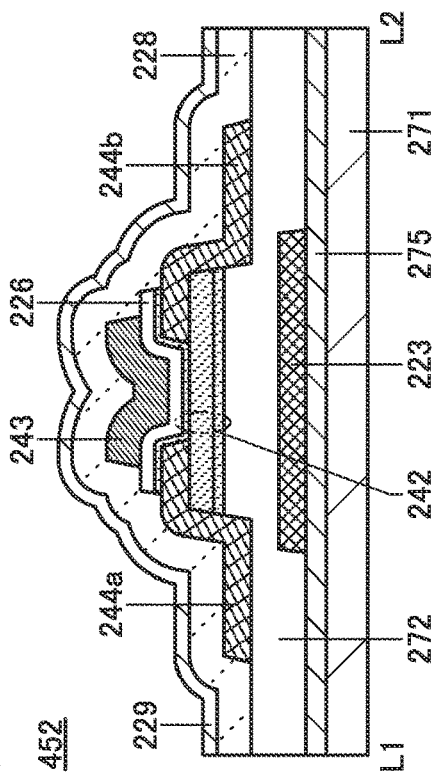

FIGS. 29A to 29C illustrate another example of an s-channel transistor. FIG. 29A is a top view of a transistor 452. FIG. 29B and FIG. 29C are cross-sectional views of portions indicated by the dashed-dotted line L1-L2 and the dashed-dotted line W1-W2 in FIG. 29A.

Although the transistor 452 has a structure similar to that of the transistor 451, there is a different point in that the electrode 244a and the electrode 244b are in contact with the side surfaces of the semiconductor layer 242a and the semiconductor layer 242b. As the insulating layer 228 covering the transistor 452, an insulating layer with a flat surface such as that in the transistor 451 may be used. In addition, the electrode 225a, the electrode 225b, and the electrode 225c may be provided over the insulating layer 229.

Figure 30A:
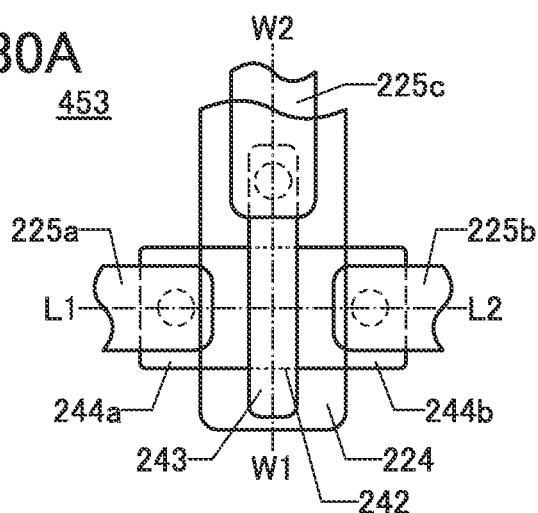
FIGS. 30A and 30B illustrate an example of a transistor.
Figure 30B:
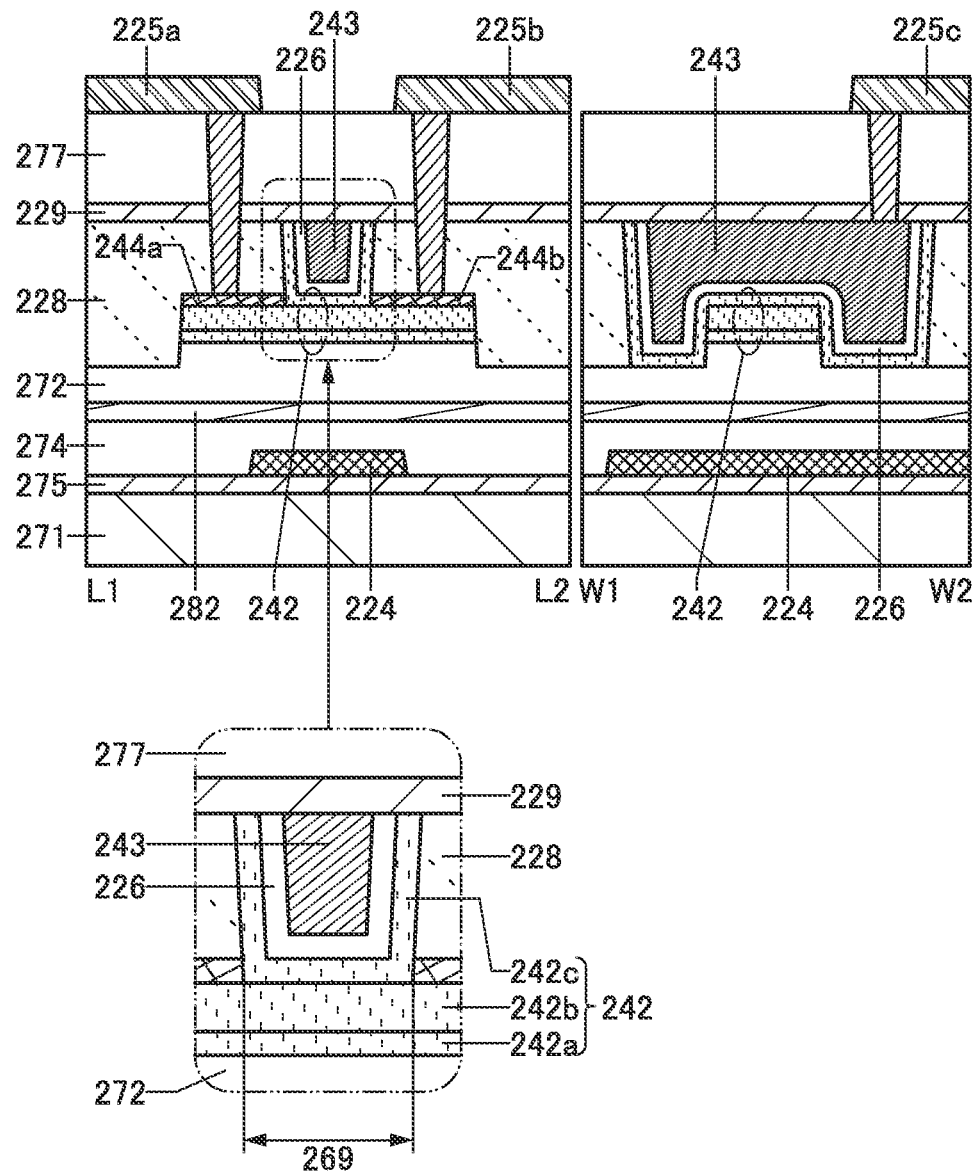

FIGS. 30A and 30B illustrate another example of an s-channel transistor. FIG. 30A is a top view of a transistor 453. FIG. 30B is a cross-sectional view of portions indicated by the dashed-dotted line L1-L2 and the dashed-dotted line W1-W2 in FIG. 30A. As in the transistor 451, the transistor 453 includes the semiconductor layer 242a and the semiconductor layer 242b over the projection of the insulating layer 272. The electrode 244a and the electrode 244b are provided over the semiconductor layer 242b. A region of the semiconductor layer 242b which overlaps with the electrode 244a can function as one of a source and a drain of the transistor 453. A region of the semiconductor layer 242b which overlaps with the electrode 244b can function as the other of the source and the drain of the transistor 453. Thus, a region 269 of the semiconductor layer 242b which is located between the electrode 244a and the electrode 244b can function as a channel formation region.

In the transistor 453, an opening is provided in a region overlapping with the region 269 by removing part of the insulating layer 228, and the semiconductor layer 242c is provided along a side and bottom surfaces of the opening. In the opening, the insulating layer 226 is provided along the side and bottom surfaces of the opening with the semiconductor layer 242c located therebetween. In addition, in the opening, the electrode 243 is provided along the side and bottom surfaces of the opening with the semiconductor layer 242c and the insulating layer 226 located therebetween.

Note that the opening is wider than the semiconductor layer 242a and the semiconductor layer 242b in the cross section in the channel width direction. Thus, in the region 269, side surfaces of the semiconductor layer 242a and the semiconductor layer 242b are covered with the semiconductor layer 242c.

The insulating layer 229 is provided over the insulating layer 228 and an insulating layer 277 is provided over the insulating layer 229. The electrode 225a, the electrode 225b, and the electrode 225c are provided over the insulating layer 277. The electrode 225a is electrically connected to the electrode 244a via a contact plug in an opening formed by removing part of the insulating layers 277, 229, and 228. The electrode 225b is electrically connected to the electrode 244b via a contact plug in an opening formed by removing part of the insulating layers 277, 229, and 228. The electrode 225c is electrically connected to the electrode 243 via a contact plug in an opening formed by removing part of the insulating layers 277 and 229.

Figure 31A:
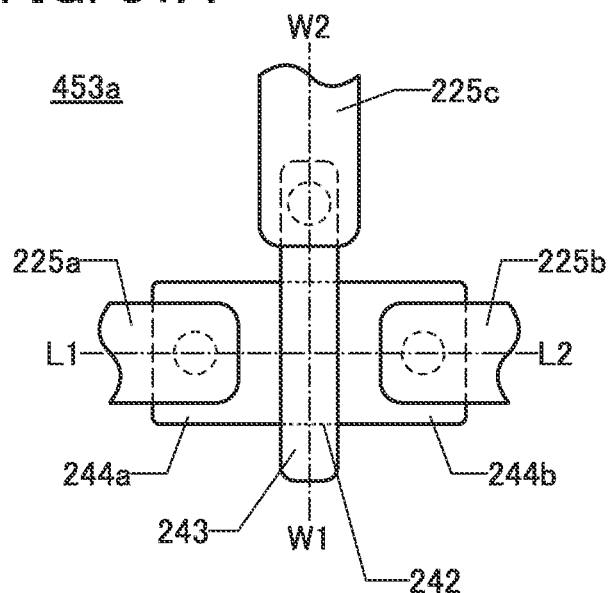
FIGS. 31A and 31B illustrate an example of a transistor.
Figure 31B:
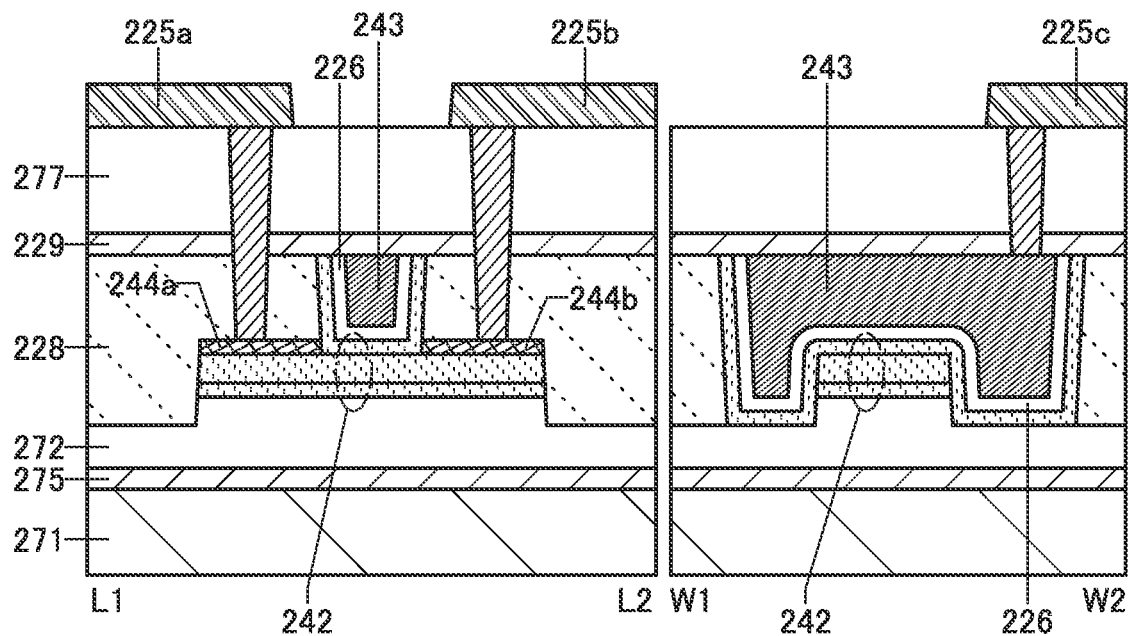

The electrode 224 that can function as a back gate is not necessarily provided, depending on the purpose. FIG. 31A is a top view of a transistor 453a. FIG. 31B is a cross-sectional view of portions indicated by the dashed-dotted line L1-L2 and the dashed-dotted line W1-W2 in FIG. 31A. The transistor 453a has a structure in which the electrode 224, the insulating layer 274, and the insulating layer 282 are removed from the transistor 453. The productivity of the transistor can be improved by omission of the electrode and the insulating layers. Accordingly, the productivity of the electronic apparatus can be improved.

Figure 32C:
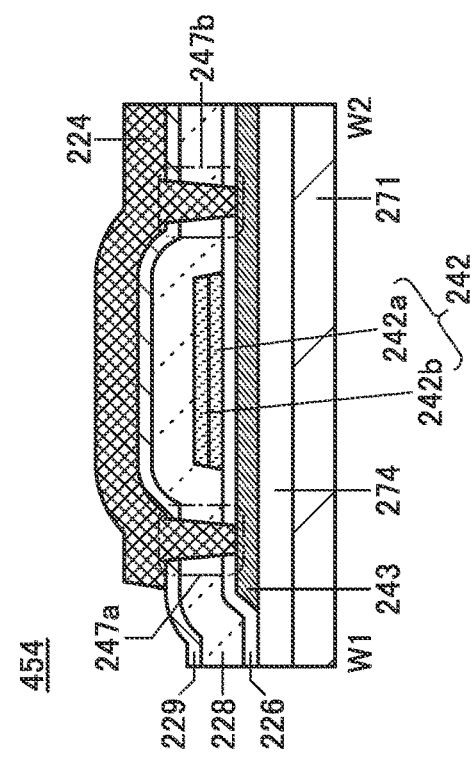
FIGS. 32A to 32C illustrate an example of a transistor.
Figure 32A:
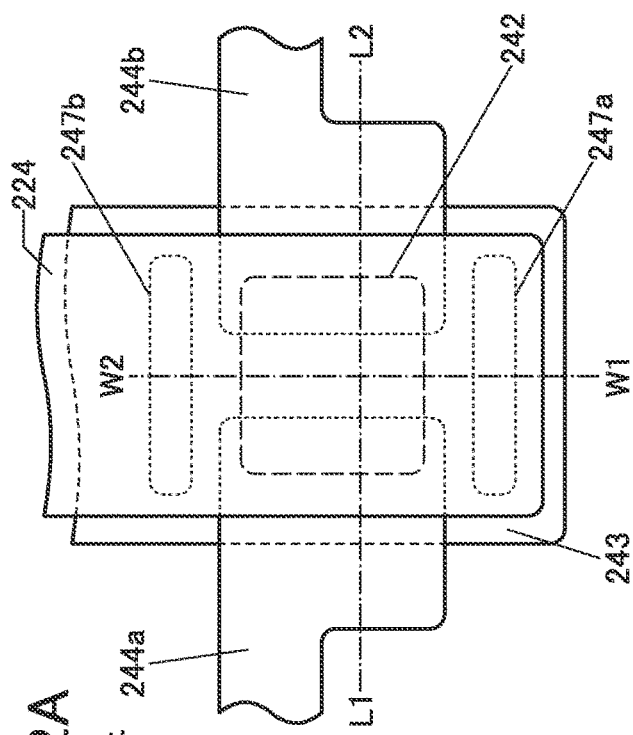
Figure 32B:
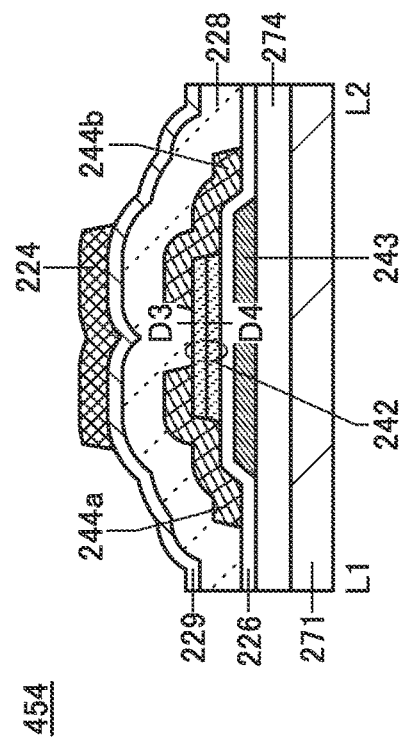

FIGS. 32A to 32C illustrate another example of an s-channel transistor. FIG. 32A is a top view of a transistor 454. FIG. 32B is a cross-sectional view of a portion indicated by the dashed-dotted line L1-L2 in FIG. 32A. FIG. 32C is a cross-sectional view of a portion indicated by the dashed-dotted line W1-W2 in FIG. 32A.

The transistor 454 is a kind of bottom-gate transistor having a back-gate electrode. In the transistor 454, the electrode 243 is formed over the insulating layer 274, and the insulating layer 226 is provided to cover the electrode 243. The semiconductor layer 242 is formed in a region that is over the insulating layer 226 and overlaps with the electrode 243. The semiconductor layer 242 in the transistor 454 has a stacked structure of the semiconductor layer 242a and the semiconductor layer 242b.

The electrode 244a and the electrode 244b are formed so as to be partly in contact with the semiconductor layer 242 and be over the insulating layer 226. The insulating layer 228 is formed so as to be partly in contact with the semiconductor layer 242 and be over the electrode 244a and the electrode 244b. The insulating layer 229 is formed over the insulating layer 228. The electrode 224 is formed in a region that is over the insulating layer 229 and overlaps with the semiconductor layer 242.

The electrode 224 provided over the insulating layer 229 is electrically connected to the electrode 243 in an opening 247a and an opening 247b provided in the insulating layer 229, the insulating layer 228, and the insulating layer 226. Accordingly, the same potential is supplied to the electrodes 224 and 243. Furthermore, either or both of the openings 247a and 247b may be omitted. In the case where neither the opening 247a nor the opening 247b is provided, different potentials can be supplied to the electrode 224 and the electrode 243.

[Energy Band Structure (2) of Semiconductor Layer 242]

Figure 35B:
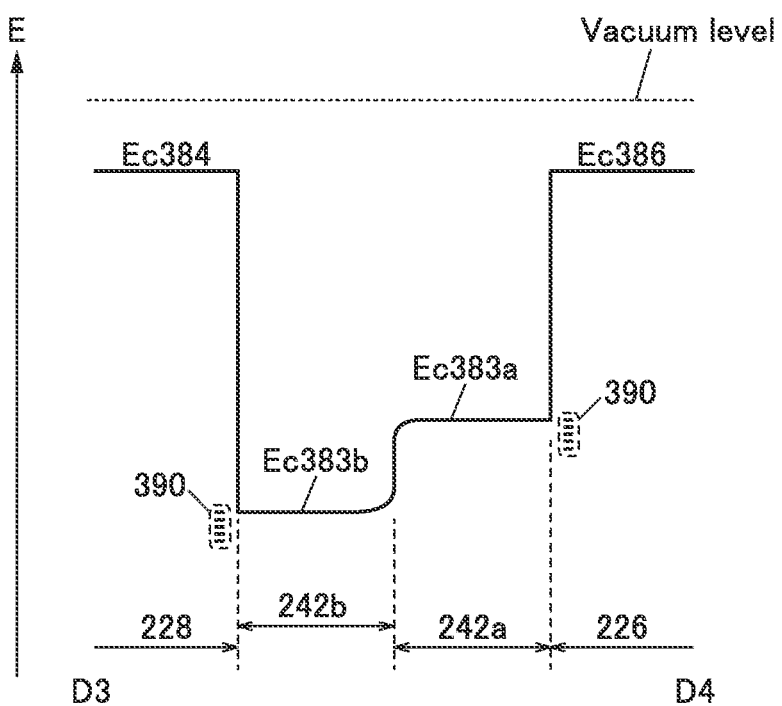

FIG. 35B is an energy band structure diagram showing a portion along the dashed-dotted line D3-D4 in FIG. 32B. FIG. 35B shows the energy band structure of a channel formation region of the transistor 454.

In FIG. 35B, Ec384 represents the energy of the conduction band minimum of the insulating layer 228. The semiconductor layer 242 is formed using two layers, the semiconductor layers 242a and 242b; thus, the transistor can be manufactured with improved productivity. Since the semiconductor layer 242c is not provided, the transistor including the two semiconductor layers is easily affected by the trap states 390 but can have higher field-effect mobility than a transistor including one semiconductor layer as the semiconductor layer 242.

Figure 33A:
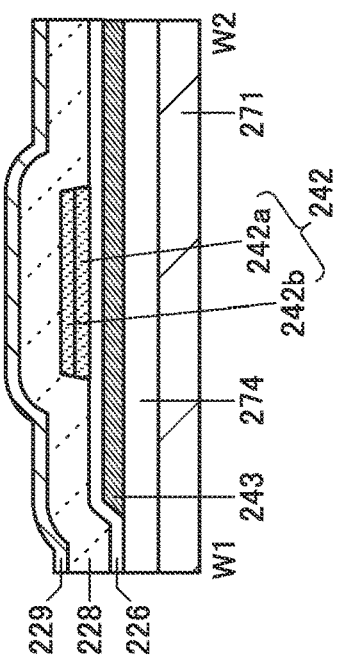
FIGS. 33A to 33C illustrate an example of a transistor.
Figure 33B:
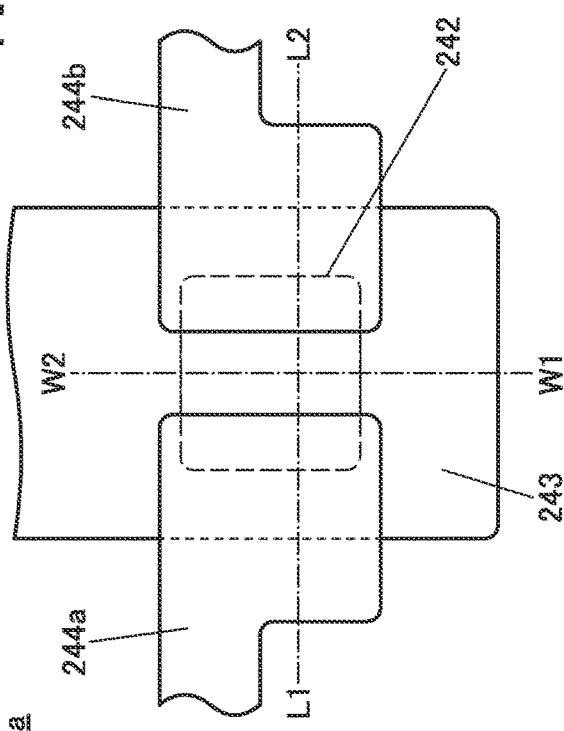
Figure 33C:
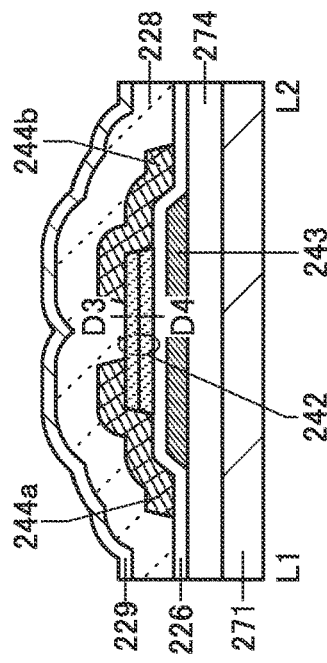

The electrode 224 that can function as a back gate is not necessary provided, depending on the purpose. FIG. 33A is a top view of a transistor 454a. FIG. 33B and FIG. 33C are cross-sectional views of portions indicated by the dashed-dotted line L1-L2 and the dashed-dotted line W1-W2 in FIG. 33A. The transistor 454a has a structure in which the electrode 224, the opening 247a, and the opening 247b are removed from the transistor 454. The productivity of the transistor can be improved by omission of the electrode and the openings. Thus, the productivity of the electronic apparatus can be improved.

FIGS. 34A to 34C illustrate an example of a transistor with an s-channel structure. A transistor 448 in FIGS. 34A to 34C has almost the same structure as the transistor 447. The transistor 448 is a kind of top-gate transistor having a back-gate electrode. FIG. 34A is a top view of the transistor 448. FIG. 34B is a cross-sectional view of a portion indicated by the dashed-dotted line L1-L2 in FIG. 34A. FIG. 34C is a cross-sectional view of a portion indicated by the dashed-dotted line W1-W2 in FIG. 34A.

FIGS. 34A to 34C illustrate an example in which an inorganic semiconductor layer such as a silicon layer is used as the semiconductor layer 242 in the transistor 448. In FIGS. 34A to 34C, the electrode 224 is provided over the substrate 271, and the insulating layer 272 is provided over the electrode 224. In addition, the semiconductor layer 242 is formed over a projection of the insulating layer 272.

The semiconductor layer 242 includes a semiconductor layer 242i, two semiconductor layers 242t, and two semiconductor layers 242u. The semiconductor layer 242i is sandwiched between the two semiconductor layers 242t.

The semiconductor layer 242i and the two semiconductor layers 242t are sandwiched between the two semiconductor layers 242u. The electrode 243 is provided in a region overlapping with the semiconductor layer 242i.

A channel is formed in the semiconductor layer 242i when the transistor 448 is on. Therefore, the semiconductor layer 242i serves as a channel formation region. The semiconductor layers 242t serve as low concentration impurity regions (i.e., LDD). The semiconductor layers 242u serve as high concentration impurity regions. Note that one or both of the two semiconductor layers 242t are not necessarily provided. One of the two semiconductor layers 242u serves as a source region, and the other semiconductor layer 242u serves as a drain region.

The electrode 244a provided over the insulating layer 229 is electrically connected to one of the semiconductor layers 242u in an opening 247c formed in the insulating layers 226, 228, and 229. The electrode 244b provided over the insulating layer 229 is electrically connected to the other of the semiconductor layers 242u in an opening 247d formed in the insulating layers 226, 228, and 229.

The electrode 243 provided over the insulating layer 226 is electrically connected to the electrode 224 in the opening 247a and the opening 247b formed in the insulating layers 226 and 272. Accordingly, the same potential is supplied to the electrodes 243 and 224. Furthermore, either or both of the openings 247a and 247b may be omitted. In the case where neither the opening 247a nor the opening 247b is provided, different potentials can be applied to the electrode 243 and the electrode 224.

<Film Formation Method>

The conductive layer such as the electrode, the insulating layer, and the semiconductor layer in this specification and the like can be formed by a chemical vapor deposition (CVD) method, an evaporation method, a sputtering method, or the like. The CVD method generally includes a plasma enhanced CVD (PECVD) method using plasma, a thermal CVD (TCVD) method using heat, and the like. In addition, there is an atmospheric pressure CVD (APCVD) and the like for performing deposition under an atmospheric pressure. The CVD method can be further classified into a metal CVD (MCVD) method, a metal organic CVD (MOCVD) method, and the like according to a source gas to be used.

Furthermore, the evaporation method can be typically classified into a resistance heating evaporation method, an electron beam evaporation method, a molecular beam epitaxy (MBE) method, a pulsed laser deposition (PLD) method, an ion beam assisted deposition (IAD) method, an atomic layer deposition (ALD) method, and the like.

By using the PECVD method, a high-quality film can be formed at a relatively low temperature. By using a deposition method that does not use plasma for deposition, such as the MOCVD method or the evaporation method, a film can be formed with few defects because damage is not easily caused on a surface on which the film is deposited.

A sputtering method is typically classified into a DC sputtering method, a magnetron sputtering method, an RF sputtering method, an ion beam sputtering method, an electron cyclotron resonance (ECR) sputtering method, a facing-target sputtering method, and the like.

In the facing-target sputtering method, plasma is confined between the targets; thus, plasma damage to a substrate can be reduced. Further, step coverage can be improved because an incident angle of a sputtered particle to the substrate can be made smaller depending on the inclination of the target.

Different from a film formation method whereby particles released from a target or the like are deposited, a CVD method and an ALD method are film formation methods whereby a film is formed by a reaction at a surface of an object of the treatment. Thus, a CVD method and an ALD method enable favorable step coverage almost regardless of the shape of an object. In particular, an ALD method enables excellent step coverage and excellent thickness uniformity and can be favorably used for covering a surface of an opening portion with a high aspect ratio, for example. On the other hand, an ALD method has a relatively low deposition rate; thus, it is sometimes preferable to combine an ALD method with another deposition method with a high deposition rate such as a CVD method.

When a CVD method or an ALD method is used, composition of a film to be formed can be controlled with a flow rate ratio of the source gases. For example, by a CVD method or an ALD method, a film with a certain composition can be formed depending on a flow rate ratio of the source gases. Moreover, with a CVD method or an ALD method, by changing the flow rate ratio of the source gases while forming the film, a film whose composition is continuously changed can be formed. In the case where the film is formed while changing the flow rate ratio of the source gases, as compared to the case where the film is formed using a plurality of deposition chambers, time taken for the film formation can be reduced because time taken for transfer and pressure adjustment is skipped. Thus, transistors or semiconductor devices can be manufactured with improved productivity.

<Substrate>

There is no great limitation on a material used for the substrate 271. The material may be determined in accordance with the required characteristics; for example, whether it has light-transmitting property or not or heat resistance that can endure heat treatment or not is taken into consideration for the determination. For example, a glass substrate of barium borosilicate glass, aluminoborosilicate glass, or the like, a ceramic substrate, a quartz substrate, or a sapphire substrate can be used. Alternatively, a semiconductor substrate, a flexible substrate, an attachment film, a base film, or the like may be used as the substrate 271.

As the semiconductor substrate, a single material semiconductor substrate of silicon, germanium, or the like or a compound semiconductor substrate of silicon carbide, silicon germanium, gallium arsenide, indium phosphide, zinc oxide, or gallium oxide, or the like is used, for example. The semiconductor substrate may be a single-crystal semiconductor substrate or a polycrystalline semiconductor substrate.

As materials of the flexible substrate, the attachment film, the base material film, and the like, the following materials can be used: polyethylene terephthalate (PET), polyethylene naphthalate (PEN), polyether sulfone (PES), polytetrafluoroethylene (PTFE), polypropylene, polyester, polyvinyl fluoride, polyvinyl chloride, polyolefin, polyamide (e.g., nylon or aramid), polyimide, polycarbonate, aramid, an epoxy resin, an acrylic resin, and the like.

The flexible substrate used as the substrate 271 preferably has a lower coefficient of linear expansion because a lower coefficient of linear expansion suppresses deformation due to an environment. The flexible substrate used as the substrate 271 is formed using, for example, a material whose coefficient of linear expansion is lower than or equal to $1 \times 10^{-3}$/K, lower than or equal to $5 \times 10^{-5}$/K, or lower than or equal to 1×10⁻⁵/K. In particular, aramid is preferably used for the flexible substrate because of its low coefficient of linear expansion.

<Insulating Layer>

Each of the insulating layer 222, the insulating layer 226, the insulating layer 228, the insulating layer 229, the insulating layer 272, the insulating layer 273, the insulating layer 274, the insulating layer 275, the insulating layer 277, and the insulating layer 282 can be formed with a single layer or a stack of layers of one or more materials selected from aluminum nitride, aluminum oxide, aluminum nitride oxide, aluminum oxynitride, magnesium oxide, silicon nitride, silicon oxide, silicon nitride oxide, silicon oxynitride, gallium oxide, germanium oxide, yttrium oxide, zirconium oxide, lanthanum oxide, neodymium oxide, hafnium oxide, tantalum oxide, aluminum silicate, and the like. Alternatively, a material in which two or more materials selected from an oxide material, a nitride material, an oxynitride material, and a nitride oxide material are mixed may be used.

Note that in this specification, a nitride oxide refers to a compound that includes more nitrogen than oxygen. An oxynitride refers to a compound that includes more oxygen than nitrogen. The content of each element can be measured by Rutherford backscattering spectrometry (RBS), for example.

It is particularly preferable that the insulating layer 275 and the insulating layer 229 be formed using an insulating material that is relatively impermeable to impurities. The insulating layers 275 and 229 may each be formed to have, for example, a single-layer structure or a stacked-layer structure including an insulating material containing boron, carbon, nitrogen, oxygen, fluorine, magnesium, aluminum, silicon, phosphorus, chlorine, argon, gallium, germanium, yttrium, zirconium, lanthanum, neodymium, hafnium, or tantalum. Examples of such an insulating material that is relatively impermeable to impurities include aluminum oxide, aluminum nitride, aluminum oxynitride, aluminum nitride oxide, gallium oxide, germanium oxide, yttrium oxide, zirconium oxide, lanthanum oxide, neodymium oxide, hafnium oxide, tantalum oxide, and silicon nitride. The insulating layer 275 or 229 may be formed using indium tin zinc oxide (In—Sn—Zn oxide) having an excellent insulating property or the like.

When the insulating material that is relatively impermeable to impurities is used for the insulating layer 275, impurity diffusion from the substrate 271 side can be suppressed, and the reliability of the transistor can be improved. When the insulating material that is relatively impermeable to impurities is used for the insulating layer 229, impurity diffusion from the insulating layer 229 side can be suppressed, and the reliability of the transistor can be improved.

A plurality of insulating layers formed using any of the above-described materials may be stacked as each of the insulating layer 222, the insulating layer 226, the insulating layer 228, the insulating layer 229, the insulating layer 272, the insulating layer 273, the insulating layer 274, the insulating layer 277, and the insulating layer 282. The formation method of the insulating layers 222, 226, 228, 229, 272, 273, 274, 277, and 282 is not particularly limited, and a sputtering method, a CVD method, an MBE method, a PLD method, an ALD method, a spin coating method, or the like can be used.

For example, in the case where an aluminum oxide film is formed by a thermal CVD method, two kinds of gases, e.g., $H_2O$ as an oxidizer and a source material gas which is obtained by vaporizing a solvent and liquid containing an aluminum precursor compound (e.g., trimethylaluminum (TMA)) are used. Note that the chemical formula of trimethylaluminum is $Al(CH_3)_3$. Examples of another material liquid include tris(dimethylamide)aluminum, triisobutylaluminum, and aluminum tris(2,2,6,6-tetramethyl-3,5-heptanedionate).

In the case of forming a silicon oxide film or a silicon oxynitride film by a PECVD method, a deposition gas containing silicon and an oxidizing gas are preferably used as a source gas. Typical examples of the deposition gas containing silicon include silane, disilane, trisilane, and silane fluoride. Examples of the oxidizing gas include oxygen, ozone, dinitrogen monoxide, and nitrogen dioxide.

A silicon oxynitride film having few defects can be formed under the conditions that the flow rate of the oxidizing gas is greater than or equal to 20 times and less than 100 times, or greater than or equal to 40 times and less than or equal to 80 times the flow rate of the deposition gas and that the pressure in a treatment chamber is lower than or equal to 100 Pa or lower than or equal to 50 Pa.

A dense silicon oxide film or a dense silicon oxynitride film can be formed under the following conditions: the substrate placed in a treatment chamber is held at a temperature higher than or equal to 280° C. and lower than or equal to 400° C.; the pressure in the treatment chamber into which a source gas is introduced is set to be higher than or equal to 20 Pa and lower than or equal to 250 Pa, preferably higher than or equal to 100 Pa and lower than or equal to 250 Pa; and a high-frequency power is supplied to an electrode provided in the treatment chamber.

A silicon oxide film or a silicon oxynitride film can be formed by a CVD method using an organosilane gas. As the organosilane gas, any of the following silicon-containing compound can be used: tetraethyl orthosilicate (TEOS) (chemical formula: $Si(OC_2H_5)_4$); tetramethylsilane (TMS) (chemical formula: $Si(CH_3)_4$); tetramethylcyclotetrasiloxane (TMCTS); octamethylcyclotetrasiloxane (OMCTS); hexamethyldisilazane (HMDS); triethoxysilane (SiH($OC_2H_5$)$_3$); trisdimethylaminosilane (SiH(N(CH$_3$)$_2$)$_3$); or the like. By a CVD method using an organosilane gas, the insulating layer having high coverage can be formed.

The insulating layer may be formed by a plasma CVD method using a microwave. A microwave refers to a wave in the frequency range of 300 MHz to 300 GHz. In a microwave, electron temperature is low and electron energy is low. Furthermore, in supplied power, the proportion of power used for acceleration of electrons is low, and therefore, power can be used for dissociation and ionization of more molecules. Thus, plasma with high density (high-density plasma) can be excited. This method causes little plasma damage to the deposition surface or a deposit, so that the insulating layer having few defects can be formed.

When an oxide semiconductor is used for the semiconductor layer 242, the hydrogen concentration in the insulating layers is preferably lowered in order to prevent an increase in the hydrogen concentration in the semiconductor layer 242. It is particularly preferable to lower the hydrogen concentration of the insulating layer in contact with the semiconductor layer 242. Specifically, the hydrogen concentration in the insulating layer, which is measured by SIMS, is lower than or equal to $2\times10^{20}$ atoms/cm$^3$, preferably lower than or equal to $5\times10^{19}$ atoms/cm$^3$, further preferably lower than or equal to $1\times10^{19}$ atoms/cm$^3$, still further preferably lower than or equal to $5\times10^{18}$ atoms/cm$^3$. Furthermore, the nitrogen concentration in the insulating layers is preferably low in order to prevent an increase in the nitrogen concentration in the semiconductor layer 242. It is particularly preferable to lower the nitrogen concentration of the insulating layer in contact with the semiconductor layer

242. Specifically, the nitrogen concentration in the insulating layer, which is measured by SIMS, is lower than $5 \times 10^{19}$ atoms/cm$^3$, preferably lower than or equal to $5 \times 10^{18}$ atoms/cm$^3$, further preferably lower than or equal to $1 \times 10^{18}$ atoms/cm$^3$, still further preferably lower than or equal to $5 \times 10^{17}$ atoms/cm$^3$.

The concentration measured by SIMS analysis may include a variation within a range of ±40%.

When an oxide semiconductor is used for the semiconductor layer 242, the insulating layers are preferably formed with insulating layers from which oxygen is released by heating (also referred to as an "insulating layer containing excess oxygen").

It is particularly preferable that an insulating layer in contact with the semiconductor layer 242 be an insulating layer containing excess oxygen. For example, the insulating layer is preferably an insulating layer of which the amount of released oxygen converted into oxygen atoms is greater than or equal to $1.0 \times 10^{18}$ atoms/cm$^3$, preferably greater than or equal to $3.0 \times 10^{20}$ atoms/cm$^3$ in TDS analysis in which heat treatment is performed so that the surface temperature of the insulating layer is higher than or equal to 100° C. and lower than or equal to 700° C., preferably higher than or equal to 100° C. and lower than or equal to 500° C.

The insulating layer containing excess oxygen can be formed by performing treatment for adding oxygen to an insulating layer. The treatment for adding oxygen can be performed by heat treatment under an oxygen atmosphere or performed with an ion implantation apparatus, an ion doping apparatus, or a plasma treatment apparatus. As a gas for adding oxygen, an oxygen gas of $^{16}O_2$, $^{18}O_2$, or the like, a nitrous oxide gas, an ozone gas, or the like can be used. In the case where oxygen is added by plasma treatment in which oxygen is excited by a microwave to generate high-density oxygen plasma, the amount of oxygen added to the insulating layer can be increased. In this specification, the treatment for adding oxygen is also referred to as "oxygen doping treatment".

The formation of an insulating layer by sputtering in an atmosphere including oxygen allows introduction of oxygen into the insulating layer.

Generally, a capacitor has such a structure that a dielectric is sandwiched between two electrodes that face to each other, and as the thickness of the dielectric is smaller (as the distance between the two facing electrodes is shorter) or as the dielectric constant of the dielectric is higher, the capacitance becomes higher. However, if the thickness of the dielectric is reduced in order to increase the capacitance of the capacitor, because of a tunnel effect or the like, current unintentionally flowing between the two electrodes (leakage current) tends to increase and the withstand voltage of the capacitor tends to be lower.

A portion where a gate electrode, a gate insulating layer, and a semiconductor layer of a transistor overlap with each other functions as the capacitor (hereinafter also referred to as "gate capacitor"). A channel is formed in a region in the semiconductor layer, which overlaps with the gate electrode with the gate insulating layer provided therebetween. That is, the gate electrode and the channel formation region function as two electrodes of the capacitor. Furthermore, the gate insulating layer functions as a dielectric of the capacitor. Although it is preferable that the capacitance of the gate capacitor be as high as possible, a reduction in the thickness of the gate insulating layer for the purpose of increasing the capacitance increases the probability of occurrence of an increase in the leakage current or a reduction in the withstand voltage.

In the case where a high-k material such as hafnium silicate (HfSi$_x$O$_y$ (x>0, y>0)), hafnium silicate to which nitrogen is added (HfSixO$_y$N$_z$ (x>0, y>0, z>0)), hafnium aluminate to which nitrogen is added (HfAl$_x$O$_y$N$_z$ (x>0, y>0, z>0)), hafnium oxide, or yttrium oxide is used as a dielectric, even if the thickness of the dielectric is made thick, sufficient capacitance of the capacitor can be ensured.

For example, in the case where a high-k material with a high dielectric constant is used as the dielectric, even when the dielectric is made thick, a capacitance equivalent to that in the case of using silicon oxide as the dielectric can be obtained. This enables a reduction in leakage current between the two electrodes of the capacitor. The dielectric may have a stacked-layer structure of the high-k material and another insulating material.

The insulating layer 228 has a flat surface. As the insulating layer 228, an organic material having heat resistance, such as polyimide, an acrylic-based resin, a benzocyclobutene-based resin, polyamide, or an epoxy-based resin, can be used as well as the above-mentioned insulating materials. Other than such organic materials, it is possible to use a low-dielectric constant material (a low-k material), a siloxane-based resin, phosphosilicate glass (PSG), borophosphosilicate glass (BPSG), or the like. Note that a plurality of insulating layers formed of these materials may be stacked to form the insulating layer 228.

Note that the siloxane-based resin corresponds to a resin including an Si—O—Si bond formed using a siloxane-based material as a starting material. The siloxane-based resin may include as a substituent an organic group (e.g., an alkyl group or an aryl group) or a fluoro group. The organic group may include a fluoro group.

There is no particular limitation on the method for forming the insulating layer 228, and any of the following methods that depend on a material thereof can be used: a sputtering method; an SOG method; spin coating; dipping; spray coating; a droplet discharging method (e.g., an ink-jet method); a printing method (e.g., screen printing, or offset printing); or the like.

The sample surface may be subjected to CMP treatment. The CMP treatment can reduce unevenness of the surface, and coverage whereby an insulating layer or a conductive layer to be formed later can be increased.

<Semiconductor Layer>

A single-crystal semiconductor, a polycrystalline semiconductor, a microcrystalline semiconductor, an amorphous semiconductor, or the like may be used for the semiconductor layer 242. As a semiconductor material, silicon, germanium, or the like can be used. Alternatively, a compound semiconductor of silicon germanium, silicon carbide, gallium arsenide, oxide semiconductor, nitride semiconductor, or the like, an organic semiconductor, or the like may be used.

In the case of using an organic semiconductor for the semiconductor layer 242, a low molecular organic material having an aromatic ring, a π-electron conjugated conductive polymer, or the like can be used. For example, rubrene, tetracene, pentacene, perylenediimide, tetracyanoquinodimethane, polythiophene, polyacetylene, or polyparaphenylene vinylene can be used.

As described above, the band gap of an oxide semiconductor is 2 eV or wider; thus, when the oxide semiconductor is used for the semiconductor layer 242, a transistor with an extremely low off-state current can be provided. An OS transistor has high withstand voltage between its source and drain. Thus, a transistor with high reliability can be provided. Furthermore, a transistor with high output voltage and high withstand voltage can be provided. Furthermore, an electronic apparatus or the like including a transistor with high reliability can be provided. Furthermore, an electronic apparatus including a transistor with high output voltage and high withstand voltage can be provided.

Alternatively, for example, a transistor including silicon having crystallinity in a semiconductor layer in which a channel is formed (also referred to as a "crystalline Si transistor") tends to obtain relatively high mobility as compared to the OS transistor. On the other hand, the crystalline Si transistor has difficulty in obtaining extremely small off-state current unlike the OS transistor. Thus, it is important that the semiconductor material used for the semiconductor layer be selected depending on the purpose and the usage. For example, depending on the purpose and the usage, the OS transistor, the crystalline Si transistor, and the like may be used in combination.

In this embodiment, the case where an oxide semiconductor is used for the semiconductor layer 242 is described. For the oxide semiconductor used for the semiconductor layer 242, an oxide semiconductor containing, for example, indium (In) is preferably used. An oxide semiconductor can have a high carrier mobility (electron mobility) by containing indium, for example. An oxide semiconductor preferably contains an element M.

The element M is preferably aluminum, gallium, yttrium, tin, or the like. Other elements which can be used as the element M are boron, silicon, titanium, iron, nickel, germanium, zirconium, molybdenum, lanthanum, cerium, neodymium, hafnium, tantalum, tungsten, magnesium, and the like. Note that two or more of the above elements may be used in combination as the element M. The element M is an element having a high bonding energy with oxygen, for example. The element M increases the energy gap of the oxide semiconductor, for example. Further, the oxide semiconductor preferably contains zinc. When the oxide semiconductor contains zinc, the oxide semiconductor is easily crystallized in some cases.

Note that the oxide semiconductor used for the semiconductor layer 242 is not limited to the oxide containing indium. The oxide semiconductor may be, for example, an oxide semiconductor which does not contain indium and contains zinc, an oxide semiconductor which does not contain indium and contains gallium, or an oxide semiconductor which does not contain indium and contains tin, e.g., a zinc tin oxide, a gallium tin oxide, or gallium oxide.

For example, in the case where an InGaZnO$_X$ (X>0) film is formed by a thermal CVD method as the semiconductor layer 242, trimethylindium (In(CH$_3$)$_3$), trimethylgallium (Ga(CH$_3$)$_3$), and dimethylzinc (Zn(CH$_3$)$_2$) are used. Without limitation to the above combination, triethylgallium (Ga(C$_2$H$_5$)$_3$) can be used instead of trimethylgallium, and diethylzinc (Zn(C$_2$H$_5$)$_2$) can be used instead of dimethylzinc.

For example, in the case where an InGaZnO$_X$ film (X>0) is formed as the semiconductor layer 242 by the ALD method, an In(CH$_3$)$_3$ gas and an O$_3$ gas are sequentially introduced a plurality of times to form an InO$_2$ layer, subsequently a Ga(CH$_3$)$_3$ gas and an O$_3$ gas are sequentially introduced a plurality of times to form a GaO layer, and then a Zn(CH$_3$)$_2$ gas and an O$_3$ gas are sequentially introduced a plurality of times to form a ZnO layer. Note that the order of these layers is not limited to this example. A mixed compound layer such as an InGaO$_2$ layer, an InZnO$_2$ layer, a GaInO layer, a ZnInO layer, or a GaZnO layer may be formed by using these gases. Note that although an H$_2$O gas which is obtained by bubbling water with an inert gas such as Ar may be used instead of an O$_3$ gas, it is preferable to use an O$_3$ gas, which does not contain H. Further, instead of an In(CH$_3$)$_3$ gas, an In(C$_2$H$_5$)$_3$ gas or tris(acetylacetonato)indium may be used. Note that tris(acetylacetonato)indium is also referred to as In (acac)$_3$. In addition, instead of a Ga(CH$_3$)$_3$ gas, a Ga(C$_2$H$_5$)$_3$ gas or tris(acetylacetonato) gallium may be used. Note that tris(acetylacetonato)gallium is also referred to as Ga(acac)$_3$. Furthermore, a Zn(CH$_3$)$_2$ gas or zinc acetate may be used. However, the deposition gas is not limited to these.

In the case where the oxide semiconductor is formed by a sputtering method, a target containing indium is preferably used in order to reduce the number of particles. In addition, if an oxide target having a high atomic ratio of the element M is used, the conductivity of the target may be decreased. Particularly in the case where a target containing indium is used, the conductivity of the target can be increased and DC discharge or AC discharge is facilitated; thus, deposition over a large substrate can be easily performed. Thus, electronic apparatuses can be manufactured with improved productivity.

As described above, in the case where the oxide semiconductor is formed by a sputtering method, the atomic ratio of In to M and Zn contained in the target may be 3:1:1, 3:1:2, 3:1:4, 1:1:0.5, 1:1:1, 1:1:2, 1:4:4, 5:1:7, 4:2:4.1, or a ratio close to these ratios for example.

In the case where an oxide semiconductor is formed by a sputtering method, the oxide semiconductor is deposited at a substrate temperature higher than or equal to 150° C. and lower than or equal to 750° C., higher than or equal to 150° C. and lower than or equal to 450° C., or higher than or equal to 200° C. and lower than or equal to 350° C., whereby the crystallinity of the oxide semiconductor can be increased.

When the oxide semiconductor is formed by a sputtering method, an oxide semiconductor having an atomic ratio different from the atomic ratio of the target may be deposited. Especially for zinc, the atomic ratio of zinc in the deposited film is smaller than the atomic ratio of the target in some cases. Specifically, the film has an atomic ratio of zinc of 40 atomic % to 90 atomic % of the atomic ratio of zinc in the target.

Each of the semiconductor layer 242a, the semiconductor layer 242b, and the semiconductor layer 242c is preferably formed using a material containing either In or Ga or both of them. Typical examples are an In—Ga oxide (an oxide containing In and Ga), an In—Zn oxide (an oxide containing In and Zn), and an In-M-Zn oxide (an oxide containing In, an element M, and Zn: the element M is one or more kinds of elements selected from Al, Ti, Ga, Y, Zr, La, Ce, Nd, and Hf and has a higher strength of bonding with oxygen than In has).

The semiconductor layer 242a and the semiconductor layer 242c are preferably formed using a material containing one or more kinds of metal elements contained in the semiconductor layer 242b. With the use of such a material, interface states at interfaces between the semiconductor layer 242a and the semiconductor layer 242b and between the semiconductor layer 242c and the semiconductor layer 242b are less likely to be generated. Accordingly, carriers are not likely to be scattered or captured at the interfaces, which results in an improvement in field-effect mobility of the transistor. Further, threshold-voltage variation of the transistor can be reduced. Therefore, an electronic apparatus including a transistor with favorable electrical characteristics can be provided.

In the case where the semiconductor layer 242b is an In-M-Zn oxide and the semiconductor layers 242a and 242c are each an In-M-Zn oxide, the semiconductor layers 242a and 242c each have the atomic ratio where In:M:Zn=$x_1$:$y_1$:$z_1$, and the semiconductor layer 242b has an atomic ratio where In:M:Zn=$x_2$:$y_2$:$z_2$, for example. In that case, the compositions of the semiconductor layers 242a, 242c, and 242b can be determined so that $y_1/x_1$ is larger than $y_2/x_2$. It is preferable that the compositions of the semiconductor layer 242a, the semiconductor layer 242c, and the semiconductor layer 242b are determined so that $y_1/x_1$ is 1.5 times or more as large as $y_2/x_2$. It is further preferable that the compositions of the semiconductor layer 242a, the semiconductor layer 242c, and the semiconductor layer 242b are determined so that $y_1/x_1$ is twice or more as large as $y_2/x_2$. It is still further preferable that the compositions of the semiconductor layer 242a, the semiconductor layer 242c, and the semiconductor layer 242b are determined so that $y_1/x_1$ is three times or more as large as $y_2/x_2$. It is preferred that $y_1$ be larger than or equal to $x_1$ because the transistor can have stable electrical characteristics. However, when $y_1$ is three times or more as large as $x_1$, the field-effect mobility of the transistor is reduced; accordingly, $y_1$ is preferably smaller than three times $x_1$. When the semiconductor layer 242a and the semiconductor layer 242c have the above compositions, the semiconductor layer 242a and the semiconductor layer 242c can each be a layer in which oxygen vacancies are less likely to be generated than in the semiconductor layer 242b.

In the case where the semiconductor layers 242a and 242c are each an In-M-Zn oxide, when the summation of In and the element M is assumed to be 100 atomic % and Zn and O are not taken into consideration, the atomic percentages of In and an element M are preferably as follows: the percentage of In is lower than 50 atomic % and the percentage of M is higher than or equal to 50 atomic %. The percentages of In and M are more preferably as follows: the percentage of In is lower than 25 atomic % and the percentage of M is higher than or equal to 75 atomic %. In the case where the semiconductor layer 242b is an In-M-Zn oxide, when the summation of In and M is assumed to be 100 atomic % and Zn and O are not taken into consideration, the atomic percentages of In and the element M are preferably more than or equal to 25 atomic % and less than 75 atomic %, respectively, further preferably more than or equal to 34 atomic % and less than 66 atomic %, respectively.

For example, an In—Ga—Zn oxide which is formed using a target having an atomic ratio of In:Ga:Zn=1:3:2, 1:3:4, 1:3:6, 1:4:5, 1:6:4, 1:9:6, or the atomic ratio close to these ratios, an In—Ga oxide which is formed using a target having an atomic ratio of In:Ga=1:9, or gallium oxide can be used for each of the semiconductor layer 242a and the semiconductor layer 242c containing In or Ga. Furthermore, an In—Ga—Zn oxide which is formed using a target having an atomic ratio of In:Ga:Zn=3:1:2, 1:1:1, 5:5:6, 5:1:7, 4:2:4.1, or an atomic ratio close to these ratios can be used for the semiconductor layer 242b. Note that the atomic ratio of each of the semiconductor layer 242a, the semiconductor layer 242b, and the semiconductor layer 242c may vary within a range of ±20% of any of the above-described atomic ratios as an error.

The state in which impurity concentration is low and density of defect states is low (the number of oxygen vacancies is small) is referred to as a "highly purified intrinsic" or "substantially intrinsic" state. In order to give stable electrical characteristics to the OS transistor, it is preferable that impurities and oxygen vacancies in the oxide semiconductor layer be reduced to highly purify the oxide semiconductor layer so that the semiconductor layer 242 can be regarded as an intrinsic or substantially intrinsic oxide semiconductor layer. Furthermore, it is preferable that at least the channel formation region of the semiconductor layer 242 can be regarded as an intrinsic or substantially intrinsic oxide semiconductor layer.

It is preferable that impurities and oxygen vacancies in the semiconductor layer 242b be reduced to obtain a highly purified oxide semiconductor layer; accordingly, the semiconductor layer 242b can be regarded as an intrinsic or substantially intrinsic oxide semiconductor layer. Furthermore, it is preferable that at least the channel formation region of the semiconductor layer 242b be regarded as an intrinsic or substantially intrinsic semiconductor layer.

Note that the substantially intrinsic oxide semiconductor layer refers to an oxide semiconductor layer in which the carrier density is higher than or equal to $1\times10^{-9}$ /cm$^3$ and lower than $8\times10^{11}$ /cm$^3$, preferably lower than $1\times10^{11}$ /cm$^3$, further preferably lower than $1\times10^{10}$ /cm$^3$.

When an oxide semiconductor is used for the semiconductor layer 242, the layer preferably includes c-axis aligned crystalline oxide semiconductor (CAAC-OS). A CAAC-OS is an oxide semiconductor having a plurality of c-axis aligned crystal parts.

The CAAC-OS has dielectric anisotropy. Specifically, the CAAC-OS has a larger dielectric constant in the c-axis direction than in the a-axis direction and the b-axis direction. In a transistor in which a CAAC-OS is used for a semiconductor layer where a channel is formed and a gate electrode is positioned in the c-axis direction, the dielectric constant in the c-axis direction is large; thus, the electric field generated from the gate electrode easily reaches the entire CAAC-OS. The subthreshold swing value (S value) can be made small. In addition, in the transistor in which a CAAC-OS is used for the semiconductor layer, an increase in S value due to miniaturization is less likely to occur.

Moreover, since the dielectric constant in the a-axis direction and the b-axis direction of a CAAC-OS is small, an influence of the electric field generated between a source and a drain is reduced. Thus, a channel length modulation effect, a short-channel effect, or the like is less likely to occur, whereby the reliability of the transistor can be increased.

Here, the channel length modulation effect is a phenomenon in which, when the drain voltage is higher than the threshold voltage, a depletion layer expands from the drain side, so that the effective channel length is decreased. The short-channel effect is a phenomenon in which a channel length is reduced, so that a deterioration in electrical characteristics such as a decrease in threshold voltage is caused. The more transistor is miniaturized, the more deterioration in electrical characteristics caused by the phenomena is likely to occur.

Note that after the oxide semiconductor layer is formed, oxygen doping treatment may be performed. In order to further decrease impurities such as water or hydrogen in the oxide semiconductor layer to highly purify the oxide semiconductor layer, heat treatment is preferably performed.

For example, the oxide semiconductor layer is subjected to heat treatment in a reduced-pressure atmosphere, an inert gas atmosphere of nitrogen, a rare gas, or the like, an oxidation atmosphere, or an ultra dry air atmosphere (the moisture amount is 20 ppm (−55° C. by conversion into a dew point) or less, preferably 1 ppm or less, further preferably 10 ppb or less, in the case where the measurement is performed by a dew point meter in a cavity ring down laser spectroscopy (CRDS) system). Note that the oxidation atmosphere refers to an atmosphere including an oxidation gas such as oxygen, ozone, or nitrogen oxide at 10 ppm or higher. The inert gas atmosphere refers to an atmosphere including the oxidation gas at lower than 10 ppm and is filled with nitrogen or a rare gas.

By the heat treatment, at the same time as the release of the impurities, oxygen contained in the insulating layer 226 is diffused to the oxide semiconductor layer and oxygen vacancies in the oxide semiconductor layer can be reduced. Note that the heat treatment may be performed in such a manner that heat treatment is performed in an inert gas atmosphere, and then another heat treatment is performed in an atmosphere containing an oxidation gas at 10 ppm or more, 1% or more, or 10% or more in order to compensate for desorbed oxygen. The heat treatment may be performed at any time after the oxide semiconductor layer is formed.

There is no particular limitation on a heat treatment apparatus used for the heat treatment, and the apparatus may be provided with a device for heating an object to be processed by heat conduction or heat radiation from a heating element such as a resistance heating element. For example, an electric furnace, or a rapid thermal annealing (RTA) apparatus such as a lamp rapid thermal annealing (LRTA) apparatus or a gas rapid thermal annealing (GRTA) apparatus can be used. The LRTA apparatus is an apparatus for heating an object to be processed by radiation of light (an electromagnetic wave) emitted from a lamp such as a halogen lamp, a metal halide lamp, a xenon arc lamp, a carbon arc lamp, a high pressure sodium lamp, or a high pressure mercury lamp. The GRTA apparatus is an apparatus for heat treatment using a high-temperature gas.

The heat treatment may be performed at a temperature higher than or equal to 250° C. and lower than or equal to 650° C., preferably higher than or equal to 300° C. and lower than or equal to 500° C. The treatment time is shorter than or equal to 24 hours. Heat treatment for over 24 hours is not preferable because the productivity is reduced.

<Electrode>

As a conductive material for forming each of the electrode 243, the electrode 224, the electrode 244a, the electrode 244b, the electrode 225a, and the electrode 225b, a material containing one or more metal elements selected from aluminum, chromium, copper, silver, gold, platinum, tantalum, nickel, titanium, molybdenum, tungsten, hafnium, vanadium, niobium, manganese, magnesium, zirconium, beryllium, and the like can be used. Alternatively, a semiconductor having a high electric conductivity typified by polycrystalline silicon including an impurity element such as phosphorus, or silicide such as nickel silicide may be used. A plurality of stacked conductive layers formed with these materials may be used as the electrode.

As the conductive material for forming the electrodes 243, 224, 244a, 244b, 225a, and 225b, a conductive material containing oxygen, such as indium tin oxide (ITO), indium oxide containing tungsten oxide, indium zinc oxide containing tungsten oxide, indium oxide containing titanium oxide, indium tin oxide containing titanium oxide, indium zinc oxide, or indium tin oxide to which silicon is added, or a conductive material containing nitrogen, such as titanium nitride or tantalum nitride can be used. It is also possible to use a stacked-layer structure formed using a material containing the above metal element and conductive material containing oxygen. It is also possible to use a stacked-layer structure formed using a material containing the above metal element and conductive material containing nitrogen. It is also possible to use a stacked-layer structure formed using a material containing the above metal element, conductive material containing oxygen, and conductive material containing nitrogen. There is no particular limitation on the formation method of the conductive material, and any of a variety of formation methods such as an evaporation method, a CVD method, and a sputtering method can be employed.

<Contact Plug>

As the contact plug, a conductive material with high embeddability such as tungsten or polysilicon can be used. A side surface and a bottom surface of the material may be covered with a barrier layer (a diffusion prevention layer) of a titanium layer, a titanium nitride layer, or a stacked layer of these layers. In this case, the barrier layer is regarded as part of the contact plug in some cases.

This embodiment can be implemented in appropriate combination with any of the structures described in the other embodiments and the like.

Embodiment 4

With use of any of the transistors described in the above embodiments, some or all of driver circuits which include shift registers can be formed over a substrate where a pixel portion is formed, whereby a system-on-panel can be obtained. Structure examples of a display device to which any of the transistors described in the above embodiments can be used are described with reference to FIGS. 36A to 36C and FIGS. 37A and 37B.

[Liquid Crystal Display Device and EL Display Device]

Figure 36A:
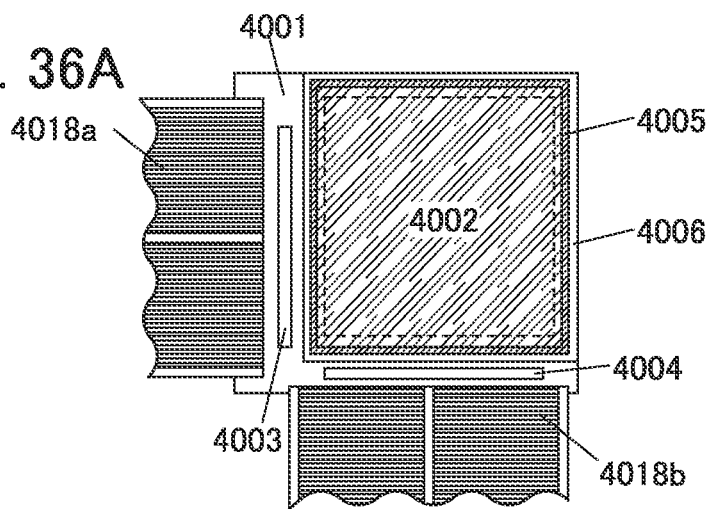
FIGS. 36A to 36C each illustrate an example of a display device.

A display device including a liquid crystal element and a display device including an EL element are described below as examples of the display device. In FIG. 36A, a sealant 4005 is provided so as to surround a pixel portion 4002 provided over a first substrate 4001, and the pixel portion 4002 is sealed with a second substrate 4006. In FIG. 36A, a signal line driver circuit 4003 and a scan line driver circuit 4004 each are formed using a single crystal semiconductor or a polycrystalline semiconductor over another substrate, and mounted in a region different from the region surrounded by the sealant 4005 over the first substrate 4001. Various signals and potentials are supplied to the signal line driver circuit 4003, the scan line driver circuit 4004, and the pixel portion 4002 from flexible printed circuits (FPCs) 4018a and 4018b.

Figure 36B:
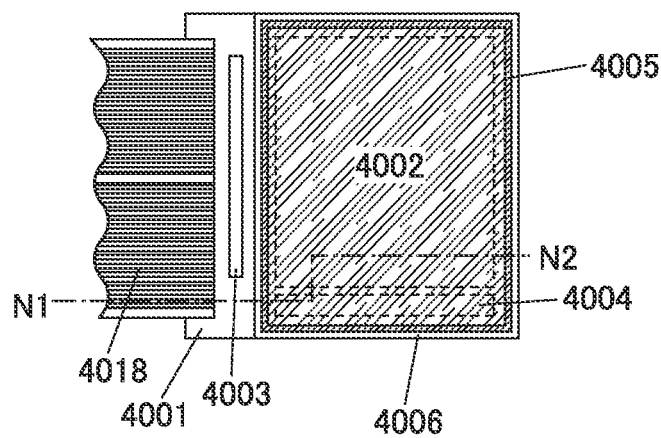
Figure 36C:
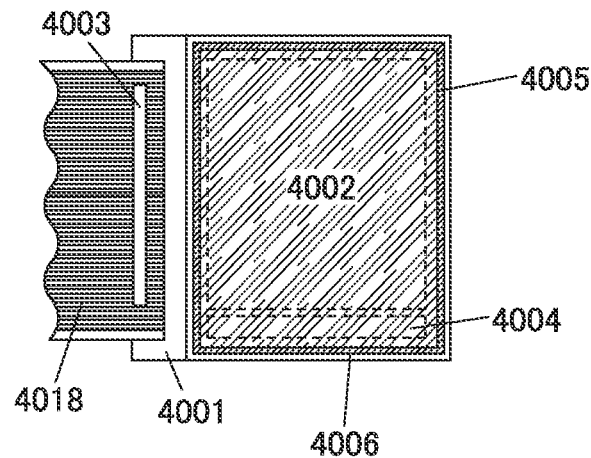

In FIGS. 36B and 36C, the sealant 4005 is provided so as to surround the pixel portion 4002 and the scan line driver circuit 4004 that are provided over the first substrate 4001. The second substrate 4006 is provided over the pixel portion 4002 and the scan line driver circuit 4004. Consequently, the pixel portion 4002 and the scan line driver circuit 4004 are sealed together with the display element, by the first substrate 4001, the sealant 4005, and the second substrate 4006. Furthermore, in FIGS. 36B and 36C, the signal line driver circuit 4003 that is formed using a single crystal semiconductor or a polycrystalline semiconductor over another substrate is mounted in a region that is different from the region surrounded by the sealant 4005 over the first substrate 4001. In FIGS. 36B and 36C, various signals and potentials are supplied to the signal line driver circuit 4003, the scan line driver circuit 4004, and the pixel portion 4002 through an FPC 4018.

Although FIGS. 36B and 36C each illustrate an example in which the signal line driver circuit 4003 is formed separately and mounted on the first substrate 4001, an embodiment of the present invention is not limited to this structure. The scan line driver circuit may be separately formed and then mounted, or only part of the signal line driver circuit or part of the scan line driver circuit may be separately formed and then mounted.

The connection method of a separately formed driver circuit is not particularly limited; wire bonding, a chip on glass (COG), a tape carrier package (TCP), a chip on film (COF), or the like can be used. FIG. 36A illustrate an example in which the signal line driver circuit 4003 and the scan line driver circuit 4004 are mounted by a COG. FIG. 36B illustrates an example in which the signal line driver circuit 4003 is mounted by a COG. FIG. 36C illustrates an example in which the signal line driver circuit 4003 is mounted by a TCP.

In some cases, the display device encompasses a panel in which a display element is sealed, and a module in which an IC or the like including a controller is mounted on the panel.

The pixel portion and the scan line driver circuit provided over the first substrate include a plurality of transistors and any of the transistors which are described in the above embodiments can be applied thereto.

FIGS. 37A and 37B correspond to cross-sectional views taken along chain line N1-N2 in FIG. 36B. As shown in FIGS. 37A and 37B, the display device has an electrode 4015, and the electrode 4015 is electrically connected to a terminal included in the FPC 4018 through an anisotropic conductive layer 4019. The electrode 4015 is electrically connected to a wiring 4014 in an opening formed in insulating layers 4112, 4111, and 4110.

The electrode 4015 is formed using the same conductive layer as a first electrode layer 4030, and the wiring 4014 is formed using the same conductive layer as source and drain electrodes of transistors 4010 and 4011.

The pixel portion 4002 and the scan line driver circuit 4004 provided over the first substrate 4001 include a plurality of transistors. In FIGS. 37A and 37B, the transistor 4010 included in the pixel portion 4002 and the transistor 4011 included in the scan line driver circuit 4004 are shown as an example. The insulating layers 4112, 4111, and 4110 are provided over the transistors 4010 and 4011 in FIG. 37A, and a bank 4510 is further provided over the insulating layer 4112 in FIG. 37B.

The transistors 4010 and 4011 are provided over an insulating layer 4102. The transistors 4010 and 4011 each include an electrode 4017 over the insulating layer 4102. An insulating layer 4103 is formed over the electrode 4017. The electrode 4017 can serve as a back gate electrode.

The transistor described in the above embodiment can be applied to the transistors 4010 and 4011. A change in the electric characteristics of any of the transistors described in the above embodiment is suppressed and thus the transistors are electrically stable. Accordingly, the display devices of this embodiment illustrated in FIGS. 37A and 37B can be highly reliable display devices.

FIGS. 37A and 37B illustrate the case where a transistor having a structure similar to that of the transistor 452 described in the above embodiment is used as each of the transistors 4010 and 4011.

The display devices illustrated in FIGS. 37A and 37B each include a capacitor 4020. The capacitor 4020 includes a region where part of the source electrode or part of the drain electrode of the transistor 4010 overlaps with an electrode 4021 with the insulating layer 4103 interposed therebetween. The electrode 4021 is formed using the same conductive layer as the electrode 4017.

In general, the capacitance of a capacitor provided in a display device is set in consideration of leakage current or the like of transistors provided in a pixel portion so that charge can be held for a predetermined period. The capacitance of the capacitor may be set considering off-state current of the transistor or the like.

For example, when an OS transistor is used in a pixel portion of a liquid crystal display device, the capacitance of the capacitor can be one-third or less, or one-fifth or less, of the capacitance of a liquid crystal. Using an OS transistor can omit the formation of a capacitor.

The transistor 4010 included in the pixel portion 4002 is electrically connected to the display element. An example of a liquid crystal display device using a liquid crystal element as a display element is illustrated in FIG. 37A. In FIG. 37A, a liquid crystal element 4013 that is the display element includes the first electrode layer 4030, a second electrode layer 4031, and a liquid crystal layer 4008. Note that an insulating layer 4032 and an insulating layer 4033 functioning as alignment films are provided so that the liquid crystal layer 4008 is provided therebetween. The second electrode layer 4031 is provided on the second substrate 4006 side, and the first electrode layer 4030 and the second electrode layer 4031 overlap with each other with the liquid crystal layer 4008 positioned therebetween.

A spacer 4035 is a columnar spacer obtained by selective etching of an insulating layer and is provided in order to control the distance between the first electrode layer 4030 and the second electrode layer 4031 (a cell gap). Alternatively, a spherical spacer may be used.

OS transistors are preferably used as the transistors 4010 and 4011. In the OS transistor used, the current in an off state (the off-state current) can be made small. Accordingly, an electrical signal such as an image signal can be held for a longer period, and a writing interval can be set longer in an on state. Accordingly, frequency of refresh operation can be reduced, which leads to an effect of suppressing power consumption.

In the OS transistor, relatively high field-effect mobility can be obtained, whereby high-speed operation is possible. Consequently, when the above transistor is used in a driver circuit portion or a pixel portion of a display device, high-quality images can be obtained. Since the driver circuit portion and the pixel portion can be formed over one substrate with use of the above transistor, the number of components of the display device can be reduced.

In the display device, a black matrix (a light-blocking layer), an optical member (an optical substrate) such as a polarizing member, a retardation member, or an anti-reflection member, and the like may be provided as appropriate. For example, circular polarization may be employed by using a polarizing substrate and a retardation substrate. In addition, a backlight, a sidelight, or the like may be used as a light source.

As the display element included in the display device, a light-emitting element utilizing electroluminescence (also referred to as an "EL element") can be used. An EL element includes a layer containing a light-emitting compound (also referred to as an "EL layer") between a pair of electrodes. By generating a potential difference between the pair of electrodes that is greater than the threshold voltage of the EL element, holes are injected to the EL layer from the anode side and electrons are injected to the EL layer from the cathode side. The injected electrons and holes are recombined in the EL layer, so that a light-emitting substance contained in the EL layer emits light.

EL elements are classified depending on whether a light-emitting material is an organic compound or an inorganic compound. In general, the former is referred to as an organic EL element, and the latter is referred to as an inorganic EL element.

In an organic EL element, by voltage application, electrons are injected from one electrode to the EL layer and holes are injected from the other electrode to the EL layer. The electrons and holes (i.e., carriers) are recombined; thus, the light-emitting organic compound becomes in an excited state. The light-emitting organic compound returns to a ground state from the excited state, thereby emitting light. Based on such a mechanism, such a light-emitting element is referred to as a current-excitation type light-emitting element.

In addition to the light-emitting compound, the EL layer may further include any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

The EL layer can be formed by an evaporation method (including a vacuum evaporation method), a transfer method, a printing method, an inkjet method, a coating method, or the like.

Inorganic EL elements are classified as a dispersed inorganic EL element and a thin-film inorganic EL element depending on their element structures. A dispersion-type inorganic EL element has a light-emitting layer where particles of a light-emitting material are dispersed in a binder, and its light emission mechanism is donor-acceptor recombination type light emission that utilizes a donor level and an acceptor level. A thin-film inorganic EL element has a structure where a light-emitting layer is sandwiched between dielectric layers, which are further sandwiched between electrodes, and its light emission mechanism is localized type light emission that utilizes inner-shell electron transition of metal ions. Note that description is given here using an organic EL element as a light-emitting element.

In order to extract light emitted from the light-emitting element, it is acceptable as long as at least one of a pair of electrodes is transparent. The light-emitting element can have a top emission structure in which light emission is extracted from the side opposite to the substrate; a bottom emission structure in which light emission is extracted from the substrate side; or a dual emission structure in which light emission is extracted from both the side opposite to the substrate and the substrate side.

FIG. 37B illustrates an example of a light-emitting display device (also referred to as an "EL display device") using a light-emitting element as a display element. A light-emitting element 4513 which is the display element is electrically connected to the transistor 4010 provided in the pixel portion 4002. The structure of the light-emitting element 4513 is the stacked-layer structure including the first electrode layer 4030, a light-emitting layer 4511, and the second electrode layer 4031; however, this embodiment is not limited to this structure. The structure of the light-emitting element 4513 can be changed as appropriate depending on a direction in which light is extracted from the light-emitting element 4513, or the like.

The bank 4510 is formed using an organic insulating material or an inorganic insulating material. It is particularly preferable that the bank 4510 be formed using a photosensitive resin material to have an opening over the first electrode layer 4030 so that a side surface of the opening slopes with continuous curvature.

The light-emitting layer 4511 may be formed using a single layer or a plurality of layers stacked.

A protective layer may be formed over the second electrode layer 4031 and the bank 4510 in order to prevent entry of oxygen, hydrogen, moisture, carbon dioxide, or the like into the light-emitting element 4513. For the protective layer, silicon nitride, silicon nitride oxide, aluminum oxide, aluminum nitride, aluminum oxynitride, aluminum nitride oxide, diamond like carbon (DLC), or the like can be used. In addition, in a space which is enclosed by the first substrate 4001, the second substrate 4006, and the sealant 4005, a filler 4514 is provided for sealing. It is preferable that, in this manner, the display device be packaged (sealed) with a protective film (such as a laminate film or an ultraviolet curable resin film) or a cover member with high air-tightness and little degasification so that the display device is not exposed to the outside air.

As the filler 4514, an ultraviolet curable resin or a thermosetting resin can be used as well as an inert gas such as nitrogen or argon; for example, polyvinyl chloride (PVC), an acrylic resin, polyimide, an epoxy resin, a silicone resin, polyvinyl butyral (PVB), ethylene vinyl acetate (EVA), or the like can be used. A drying agent may be contained in the filler 4514.

A glass material such as a glass frit, or a resin that is curable at room temperature such as a two-component-mixture-type resin, a light curable resin, a thermosetting resin, and the like can be used for the sealant 4005. A drying agent may be contained in the sealant 4005.

In addition, if needed, an optical film, such as a polarizing plate, a circularly polarizing plate (including an elliptically polarizing plate), a retardation plate (a quarter-wave plate or a half-wave plate), or a color filter, may be provided as appropriate on a light-emitting surface of the light-emitting element. Further, the polarizing plate or the circularly polarizing plate may be provided with an anti-reflection film. For example, anti-glare treatment by which reflected light can be diffused by projections and depressions on the surface so as to reduce the glare can be performed.

When the light-emitting element has a microcavity structure, light with high color purity can be extracted. Furthermore, when a microcavity structure and a color filter are used in combination, the glare can be reduced and visibility of a display image can be increased.

The first electrode layer and the second electrode layer (also called pixel electrode layer, common electrode layer, counter electrode layer, or the like) for applying voltage to the display element may have light-transmitting properties or light-reflecting properties, which depends on the direction in which light is extracted, the position where the electrode layer is provided, the pattern structure of the electrode layer, and the like.

The first electrode layer 4030 and the second electrode layer 4031 can be formed using a light-transmitting conductive material such as indium oxide containing tungsten oxide, indium zinc oxide containing tungsten oxide, indium oxide containing titanium oxide, indium tin oxide, indium tin oxide containing titanium oxide, indium zinc oxide, or indium tin oxide to which silicon oxide is added.

The first electrode layer 4030 and the second electrode layer 4031 each can also be formed using one or more kinds selected from a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy thereof and a nitride thereof.

A conductive composition containing a conductive high molecule (also called conductive polymer) can be used for the first electrode layer 4030 and the second electrode layer 4031. As the conductive high molecule, a so-called π-electron conjugated conductive high molecule can be used. For example, polyaniline or a derivative thereof, polypyrrole or a derivative thereof, polythiophene or a derivative thereof, a copolymer of two or more of aniline, pyrrole, and thiophene or a derivative thereof can be given.

Since the transistor is easily broken due to static electricity or the like, a protection circuit for protecting the driver circuit is preferably provided. The protection circuit is preferably formed using a nonlinear element.

With use of the shift registers described in the above embodiment, a highly reliable display device can be provided. With use of any of the transistors described in the above embodiments, a highly reliable display device can be provided. With use of any of the transistors described in the above embodiments, a display device that has a high resolution, a large size, and high display quality can be provided. Furthermore, a display device with low power consumption can be provided.

[Display Module]

Figure 38:
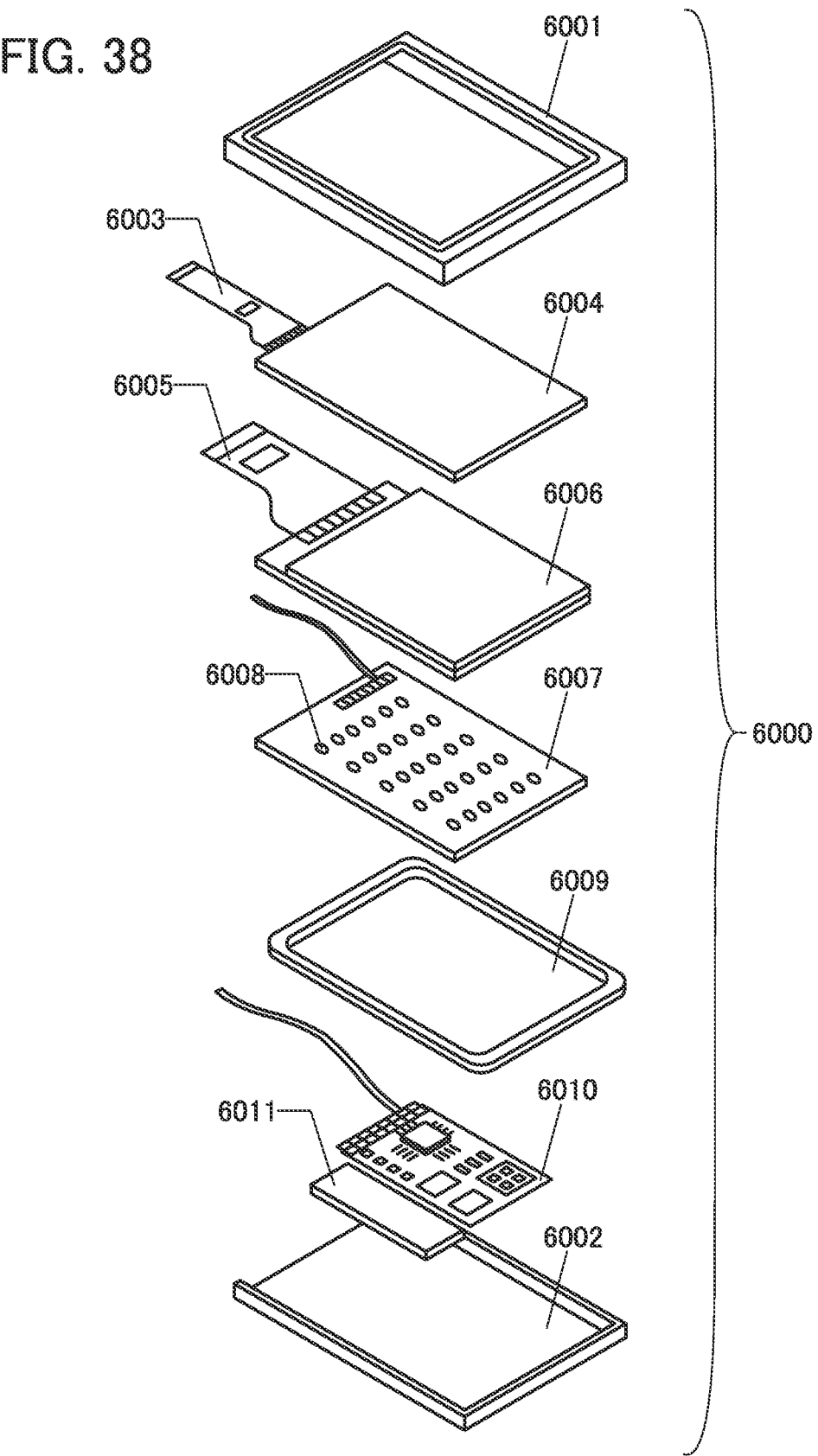
FIG. 38 illustrates an example of a display module.

A display module using any of the above-described shift registers or transistors is described. In a display module 6000 in FIG. 38, a touch sensor 6004 connected to an FPC 6003, a display panel 6006 connected to an FPC 6005, a backlight unit 6007, a frame 6009, a printed circuit board 6010, and a battery 6011 are provided between an upper cover 6001 and a lower cover 6002. Note that the backlight unit 6007, the battery 6011, the touch sensor 6004, and the like are not provided in some cases.

The electronic apparatus of one embodiment of the present invention can use, for example, the touch sensor 6004, the display panel 6006, an integrated circuit mounted on a printed circuit board 6010, and the like. For example, the above-described display device can be used in the display panel 6006.

The shapes and sizes of the upper cover 6001 and the lower cover 6002 can be changed as appropriate in accordance with the sizes of the touch sensor 6004, the display panel 6006, and the like.

The touch sensor 6004 can be a resistive touch sensor or a capacitive touch sensor and may be formed to overlap with the display panel 6006. The display panel 6006 can have a touch sensor function. For example, an electrode for a touch sensor may be provided in each pixel of the display panel 6006 so that a capacitive touch panel function is added. Alternatively, for example, a photosensor may be provided in each pixel of the display panel 6006 so that an optical touch sensor function is added. In the case where the touch sensor 6004 is not necessarily provided, the touch sensor 6004 can be omitted.

The backlight unit 6007 includes a light source 6008. The light source 6008 may be provided at an end portion of the backlight unit 6007 and a light diffusing plate may be used. When a light-emitting display device or the like is used for the display panel 6006, the backlight unit 6007 can be omitted.

The frame 6009 protects the display panel 6006 and also functions as an electromagnetic shield for blocking electromagnetic waves generated from the printed circuit board 6010 side. The frame 6009 may function as a radiator plate.

The printed circuit board 6010 has a power supply circuit, a signal processing circuit for outputting a video signal and a clock signal, and the like. As a power source for supplying power to the power supply circuit, the battery 6011 or a commercial power source may be used. Note that the battery 6011 can be omitted in the case where a commercial power source is used as the power source.

The display module 6000 can be additionally provided with a member such as a polarizing plate, a retardation plate, or a prism sheet.

This embodiment can be implemented in appropriate combination with any of the structures described in the other embodiments and the like.

Embodiment 5

The electronic apparatus of one embodiment of the present invention can be used for an electronic apparatus other than an HMD. In this embodiment, examples of an electronic apparatus other than the HMD will be described.

Examples of the electronic apparatus of one embodiment of the present invention include display devices such as televisions and monitors, desktop personal computers and notebook personal computers, word processors, image reproduction devices which reproduce still images or moving images stored in recording media such as digital versatile discs (DVDs), portable information terminals, tablet terminals, portable game consoles, stationary game machines such as pin-ball machines, calculators, electronic notebooks, e-book readers, video cameras, and digital still cameras.

Figure 39A:
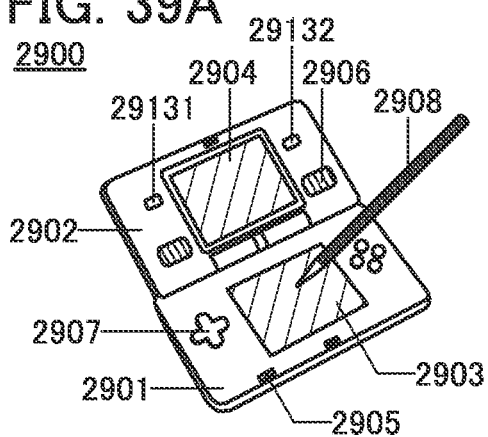
FIGS. 39A to 39F each illustrate an example of an electronic apparatus.

A portable game machine 2900 illustrated in FIG. 39A includes a housing 2901, a housing 2902, a display portion 2903, a display portion 2904, a microphone 2905, a speaker 2906, an operation switch 2907, a light source 29131 for a sensor, a sensor 29132, and the like. In addition, the portable game machine 2900 includes an antenna, a battery, and the like inside the housing 2901. Although the portable game machine in FIG. 39A has the two display portions 2903 and 2904, the number of display portions included in a portable game machine is not limited to this. The display portion 2903 is provided with a touch sensor as an input device, which can be handled with a stylus 2908 or the like.

Figure 39B:
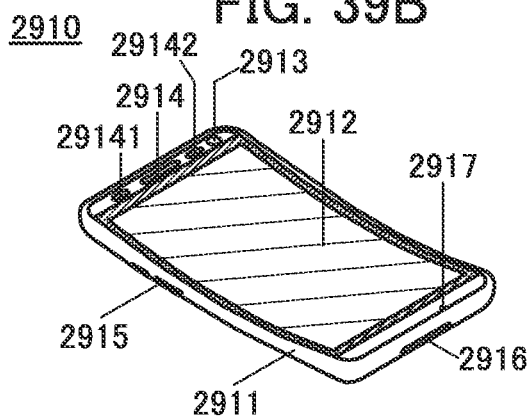

An information terminal 2910 illustrated in FIG. 39B includes a housing 2911, a display portion 2912, a microphone 2917, a speaker portion 2914, a camera 2913, an external connection portion 2916, an operation switch 2915, a light source 29141 for a sensor, a sensor 29142, and the like. A display panel and a touch sensor formed using a flexible substrate are provided in the display portion 2912. In addition, the information terminal 2910 includes an antenna, a battery, and the like inside the housing 2911. The information terminal 2910 can be used as, for example, a smartphone, a mobile phone, a tablet information terminal, a tablet personal computer, or an e-book reader.

Figure 39C:
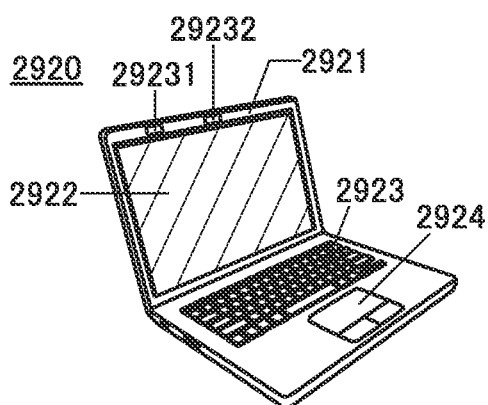

A notebook personal computer 2920 illustrated in FIG. 39C includes a housing 2921, a display portion 2922, a keyboard 2923, a pointing device 2924, a light source 29231 for a sensor, a sensor 29232, and the like. In addition, the notebook personal computer 2920 includes an antenna, a battery, and the like inside the housing 2921.

Figure 39D:
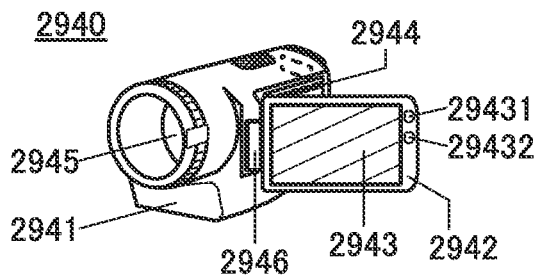

A video camera 2940 in FIG. 39D includes a housing 2941, a housing 2942, a display portion 2943, operation switches 2944, a lens 2945, a joint 2946, and the like. The operation switches 2944 and the lens 2945 are provided in the housing 2941, the display portion 2943, a light source 29431 for a sensor, and a sensor 29432 are provided in the housing 2942. In addition, the video camera 2940 includes an antenna, a battery, and the like inside the housing 2941. The housing 2941 and the housing 2942 are connected to each other with the joint 2946, and the angle between the housing 2941 and the housing 2942 can be changed with the joint 2946. The orientation of an image on the display portion 2943 may be changed and display and non-display of an image may be switched depending on the angle between the housings 2941 and 2942.

Figure 39E:
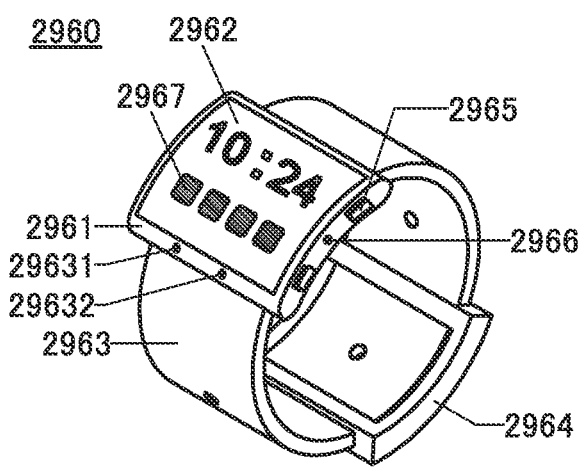

FIG. 39E illustrates an example of a watch-type information terminal. An information terminal 2960 includes a housing 2961, a display portion 2962, a band 2963, a buckle 2964, an operation switch 2965, an input/output terminal 2966, a light source 29631 for a sensor, a sensor 29632, and the like. In addition, the information terminal 2960 includes an antenna, a battery, and the like inside the housing 2961. The information terminal 2960 is capable of executing a variety of applications such as mobile phone calls, e-mailing, text viewing and editing, music reproduction, Internet communication, and computer games.

The display surface of the display portion 2962 is bent, and images can be displayed on the bent display surface. Furthermore, the display portion 2962 includes a touch sensor, and operation can be performed by touching the screen with a finger, a stylus, or the like. For example, an application can be started by touching an icon 2967 displayed on the display portion 2962. With the operation switch 2965, a variety of functions such as time setting, ON/OFF of the power, ON/OFF of wireless communication, setting and cancellation of a silent mode, and setting and cancellation of a power saving mode can be performed. For example, the functions of the operation switch 2965 can be set by setting the operating system incorporated in the information terminal 2960.

The information terminal 2960 can employ near field communication that is a communication method based on an existing communication standard. In that case, for example, mutual communication between the information terminal 2960 and a headset capable of wireless communication can be performed, and thus hands-free calling is possible. Moreover, the information terminal 2960 includes the input/output terminal 2966, and data can be directly transmitted to and received from another information terminal via a connector. Power charging through the input/output terminal 2966 is possible. Note that the charging operation may be performed by wireless power feeding without using the input/output terminal 2966.

Figure 39F:
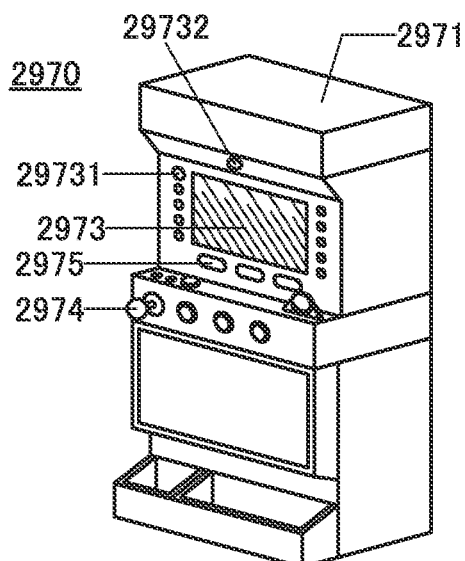

FIG. 39F shows an example of a slot machine 2970 which is a stationary game machine. In the slot machine 2970, a display portion 2973 is incorporated in a housing 2971. In addition, the slot machine 2970 includes an operation means such as a start lever 2974 or a stop switch 2975, a coin slot, a speaker, a light source 29731 for a sensor, a sensor 29732, and the like.

This embodiment can be implemented in appropriate combinations with the structures described in the other embodiments.

This application is based on Japanese Patent Application serial no. 2016-008371 filed with Japan Patent Office on Jan. 20, 2016, the entire contents of which are hereby incorporated by reference.

What is claimed is:

1. A head mounted display comprising:
   a housing having a first surface and a second surface provided in a direction crossing the first surface in a top view of the housing;
   an imaging device configured to take an image of eyes;
   a detection device configured to detect a change of the shape of the eyes based on the image obtained by the imaging device;
   an arithmetic device configured to generate display data based on the change of the shape of the eyes detected by the detection device; and
   a display device configured to perform display of the display data,
   wherein the display device includes a region on a first surface side of the housing and on a second surface side of the housing, and
   wherein a display region of the display device is enlarged when the eyes are opened widely and the display region of the display device is narrowed when the eyes are half-closed.

2. The head mounted display according to claim 1, wherein the display device comprises a light emitting element.

3. The head mounted display according to claim 1, wherein the display device comprises a liquid crystal element.

4. The head mounted display according to claim 1,
   wherein the arithmetic device is on the first surface side of the housing, and
   wherein the imaging device and the detection device are on the second surface side of the housing.

5. The head mounted display according to claim 1, wherein the display device includes a curved surface.

6. A head mounted display comprising:
   a housing having a first surface and a second surface provided in a direction crossing the first surface in a top view of the housing;
   an imaging device configured to take an image of eyes;
   a detection device configured to detect a change of the shape of the eyes based on the image obtained by the imaging device;
   an arithmetic device configured to generate display data based on the change of the shape of the eyes detected by the detection device; and
   a display device configured to perform display of the display data,
   wherein the display device includes a region on a first surface side of the housing and on a second surface side of the housing, and
   wherein a display region of the display device is enlarged when the eyes are opened widely, the display region of the display device is narrowed when the eyes are half-closed, and the display device stops performing display when the eyes are closed.

7. The head mounted display according to claim 6, wherein the display device comprises a light emitting element.

8. The head mounted display according to claim 6, wherein the display device comprises a liquid crystal element.

9. The head mounted display according to claim 6,
   wherein the arithmetic device is on the first surface side of the housing, and
   wherein the imaging device and the detection device are on the second surface side of the housing.

10. The head mounted display according to claim 6, wherein the display device includes a curved surface.

* * * * *